US007771271B2

(12) United States Patent
Walker et al.

(10) Patent No.: US 7,771,271 B2
(45) Date of Patent: Aug. 10, 2010

(54) METHOD AND APPARATUS FOR DERIVING INFORMATION FROM A GAMING DEVICE

(75) Inventors: Jay S. Walker, Ridgefield, CT (US); James A. Jorasch, Stamford, CT (US); Geoffrey M. Gelman, Stamford, CT (US); Russell P. Sammon, San Francisco, CA (US); Magdalena M. Fincham, Norwalk, CT (US)

(73) Assignee: IGT, Reno, NV (US)

( * ) Notice: Subject to any disclaimer, the term of this patent is extended or adjusted under 35 U.S.C. 154(b) by 7 days.

(21) Appl. No.: 10/681,075

(22) Filed: Oct. 8, 2003

(65) Prior Publication Data

US 2004/0106449 A1 Jun. 3, 2004

Related U.S. Application Data

(60) Provisional application No. 60/417,687, filed on Oct. 10, 2002.

(51) Int. Cl.

*A63F 9/24* (2006.01)
*A63F 13/00* (2006.01)
*G06F 17/00* (2006.01)
*G06F 19/00* (2006.01)

(52) U.S. Cl. ............................ 463/25; 463/16; 463/30; 463/31; 463/35; 463/37; 463/40; 463/42; 463/43

(58) Field of Classification Search .................. 463/42, 463/16, 25, 30, 31, 35, 37, 40, 43
See application file for complete search history.

(56) References Cited

U.S. PATENT DOCUMENTS 1,978,395 A 10/1934 Groetchen
3,420,525 A 1/1969 Waders
3,642,287 A 2/1972 Lally et al.
3,735,987 A 5/1973 Ohki
4,326,351 A 4/1982 Heywood et al.
4,410,178 A 10/1983 Partridge
4,448,419 A 5/1984 Telnaes
4,467,424 A 8/1984 Hedges et al. ................ 463/26
4,531,187 A 7/1985 Uhland ....................... 364/412
4,636,951 A 1/1987 Harlick ........................ 463/25
4,755,941 A 7/1988 Bacchi ....................... 364/412

(Continued)

FOREIGN PATENT DOCUMENTS

AU 199716432 9/1997

(Continued)

OTHER PUBLICATIONS

Brochure, “Flying Bet Roulette” DEQ Casinos Ltd., undated.

(Continued)

*Primary Examiner*—John M Hotaling, II
*Assistant Examiner*—Adetokunbo Torimiro
(74) *Attorney, Agent, or Firm*—K&L Gates LLP

(57) ABSTRACT

In accordance with one or more embodiments, an information deriving device is associated with at least one gaming device. The information deriving device is operable to derive information about occurrences (e.g., payouts obtained, wagers placed, reactions of player, balance of credit meter, etc.) at the gaming device, without cooperation of the gaming device.

24 Claims, 20 Drawing Sheets

U.S. PATENT DOCUMENTS

| | | | | |
|---|---|---|---|---|
| 4,756,531 | A | 7/1988 | DiRe et al. | |
| 4,764,666 | A | 8/1988 | Bergeron | 463/25 |
| 4,826,169 | A | 5/1989 | Bessho et al. | |
| 4,871,171 | A | 10/1989 | Rivero | |
| 4,880,237 | A | 11/1989 | Kishishita | 463/25 |
| 5,152,529 | A | 10/1992 | Okada | |
| 5,178,390 | A | 1/1993 | Okada | |
| 5,259,616 | A | 11/1993 | Bergmann | |
| 5,342,049 | A | 8/1994 | Wichinsky et al. | |
| 5,364,100 | A | 11/1994 | Ludlow et al. | |
| 5,393,057 | A | 2/1995 | Marnell, II | |
| 5,393,061 | A | 2/1995 | Manship et al. | |
| 5,395,111 | A | 3/1995 | Inoue | |
| 5,401,024 | A | 3/1995 | Simunek | 463/18 |
| 5,413,357 | A * | 5/1995 | Schulze et al. | 463/5 |
| 5,429,361 | A | 7/1995 | Raven et al. | 463/25 |
| 5,524,888 | A | 6/1996 | Heidel | |
| 5,551,692 | A | 9/1996 | Pettit et al. | 463/16 |
| 5,570,885 | A | 11/1996 | Ornstein | 463/27 |
| 5,584,764 | A | 12/1996 | Inoue | |
| 5,586,936 | A | 12/1996 | Bennett et al. | 463/25 |
| 5,613,912 | A | 3/1997 | Slater | 463/25 |
| 5,647,798 | A | 7/1997 | Falciglia | |
| 5,651,548 | A | 7/1997 | French et al. | 273/309 |
| 5,704,835 | A | 1/1998 | Dietz, II | |
| 5,727,786 | A | 3/1998 | Weingardt | |
| 5,735,742 | A | 4/1998 | French | 463/25 |
| 5,741,183 | A * | 4/1998 | Acres et al. | 463/42 |
| 5,752,881 | A | 5/1998 | Inoue | |
| 5,758,875 | A | 6/1998 | Giacalone, Jr. | 273/143 R |
| 5,766,075 | A * | 6/1998 | Cook et al. | 463/25 |
| 5,770,533 | A | 6/1998 | Franchi | 463/42 |
| 5,772,509 | A | 6/1998 | Weiss | 463/16 |
| 5,775,692 | A | 7/1998 | Watts et al. | |
| 5,781,647 | A | 7/1998 | Fishbine et al. | 382/1 |
| 5,800,268 | A * | 9/1998 | Molnick | 463/40 |
| 5,803,808 | A | 9/1998 | Strisower | 463/11 |
| 5,816,917 | A | 10/1998 | Kelmer et al. | 463/16 |
| 5,816,918 | A | 10/1998 | Kelly et al. | |
| 5,830,067 | A | 11/1998 | Graves et al. | 463/40 |
| 5,851,148 | A | 12/1998 | Brune et al. | |
| 5,882,261 | A | 3/1999 | Adams | |
| 5,919,088 | A | 7/1999 | Weiss | |
| 5,919,090 | A | 7/1999 | Mothwurf | 463/25 |
| 5,935,002 | A | 8/1999 | Falciglia | |
| 5,954,335 | A | 9/1999 | Moody | |
| 5,984,782 | A | 11/1999 | Inoue | |
| 6,001,016 | A | 12/1999 | Walker et al. | 463/42 |
| 6,003,867 | A | 12/1999 | Rodesch et al. | |
| 6,012,983 | A | 1/2000 | Walker et al. | 463/20 |
| 6,033,307 | A | 3/2000 | Vancura | |
| 6,059,289 | A | 5/2000 | Vancura | |
| 6,062,980 | A | 5/2000 | Luciano | |
| 6,086,066 | A | 7/2000 | Takeuchi et al. | |
| 6,089,976 | A | 7/2000 | Schneider et al. | |
| 6,093,102 | A | 7/2000 | Bennett | |
| 6,102,400 | A | 8/2000 | Scott et al. | |
| 6,102,798 | A | 8/2000 | Bennett | |
| 6,210,279 | B1 | 4/2001 | Dickinson | |
| 6,213,876 | B1 | 4/2001 | Moore, Jr. | |
| 6,224,483 | B1 | 5/2001 | Mayeroff | |
| 6,234,900 | B1 * | 5/2001 | Cumbers | 463/29 |
| 6,244,957 | B1 | 6/2001 | Walker et al. | 463/20 |
| 6,270,412 | B1 | 8/2001 | Crawford et al. | |
| 6,299,533 | B1 | 10/2001 | Parra et al. | 463/17 |
| 6,302,790 | B1 | 10/2001 | Brossard | |
| 6,306,038 | B1 | 10/2001 | Graves et al. | 463/40 |
| 6,319,124 | B1 | 11/2001 | Baerlocher et al. | |
| 6,328,649 | B1 | 12/2001 | Randall et al. | |
| 6,347,996 | B1 | 2/2002 | Gilmore et al. | |
| 6,398,218 | B1 | 6/2002 | Vancura | |
| 6,398,220 | B1 | 6/2002 | Inoue | |
| 6,435,511 | B1 | 8/2002 | Vancura et al. | |
| 6,439,995 | B1 | 8/2002 | Hughs-Baird et al. | |
| 6,461,241 | B1 | 10/2002 | Webb et al. | |
| 6,471,208 | B2 | 10/2002 | Yoseloff et al. | |
| 6,508,709 | B1 * | 1/2003 | Karmarkar | 463/42 |
| 6,537,150 | B1 | 3/2003 | Luciano et al. | |
| 6,569,015 | B1 | 5/2003 | Baerlocher et al. | |
| 6,575,830 | B2 | 6/2003 | Baerlocher et al. | |
| 6,585,588 | B2 | 7/2003 | Hartl | |
| 6,589,114 | B2 | 7/2003 | Rose | |
| 6,595,854 | B2 | 7/2003 | Hughs-Baird et al. | |
| 6,641,477 | B1 | 11/2003 | Dietz, II | |
| 6,641,484 | B2 * | 11/2003 | Oles et al. | 463/47 |
| 6,659,864 | B2 | 12/2003 | McGahn et al. | |
| 6,676,512 | B2 | 1/2004 | Fong et al. | |
| 6,679,497 | B2 | 1/2004 | Walker et al. | |
| 6,726,204 | B2 | 4/2004 | Inoue | |
| 6,755,741 | B1 * | 6/2004 | Rafaeli | 463/25 |
| D504,473 | S | 4/2005 | Baerlocher | |
| 6,875,106 | B2 | 4/2005 | Weiss et al. | |
| 6,926,605 | B2 | 8/2005 | Nguyen et al. | |
| 7,007,953 | B1 | 3/2006 | Cabot | |
| 7,329,182 | B2 | 2/2008 | Adams et al. | |
| 2001/0031654 | A1 | 10/2001 | Walker et al. | |
| 2002/0022512 | A1 * | 2/2002 | Higurashi | 463/20 |
| 2002/0082775 | A1 * | 6/2002 | Meadows et al. | 701/214 |
| 2002/0107061 | A1 * | 8/2002 | Klitsner et al. | 463/9 |
| 2002/0125641 | A1 | 9/2002 | Moody | |
| 2002/0143875 | A1 * | 10/2002 | Ratcliff, III | 709/205 |
| 2003/0008698 | A1 | 1/2003 | Stone | |
| 2003/0028480 | A1 * | 2/2003 | Rowe | 705/39 |
| 2003/0040355 | A1 | 2/2003 | Baerlocher | |
| 2003/0114217 | A1 | 6/2003 | Walker et al. | |
| 2003/0216165 | A1 | 11/2003 | Singer et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0018866 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0048644 | A1 | 3/2004 | Gerrard et al. | |
| 2004/0068406 | A1 * | 4/2004 | Maekawa et al. | 704/235 |
| 2004/0106449 | A1 | 6/2004 | Walker et al. | |
| 2004/0224769 | A1 * | 11/2004 | Hansen et al. | 463/40 |
| 2005/0054420 | A1 * | 3/2005 | Cregan et al. | 463/20 |
| 2005/0101376 | A1 | 5/2005 | Walker et al. | |
| 2005/0277460 | A1 | 12/2005 | Inoue | |

FOREIGN PATENT DOCUMENTS

| | | |
|---|---|---|
| AU | 199650327 | 10/1997 |
| AU | 199863716 | 11/1998 |
| AU | 199878853 | 2/1999 |
| AU | 199887937 | 3/1999 |
| DE | 3105266 | 9/1982 |
| DE | 3700861 | 7/1988 |
| EP | 0159898 | 10/1985 |
| EP | 0375190 | 6/1990 |
| EP | 0798676 | 10/1997 |
| EP | 0875870 | 4/1998 |
| EP | 0919965 | 6/1999 |
| EP | 0926645 | 6/1999 |
| EP | 0944030 | 9/1999 |
| EP | 0945837 | 9/1999 |
| EP | 1184822 | 3/2002 |
| GB | 1464896 | 2/1977 |
| GB | 2083936 | 3/1982 |
| GB | 2090690 | 7/1982 |
| GB | 2096376 | 10/1982 |
| GB | 2097160 | 10/1982 |
| GB | 2100905 | 1/1983 |

| | | |
|---|---|---|
| GB | 2105891 | 3/1983 |
| GB | 2106292 | 4/1983 |
| GB | 2117155 | 10/1983 |
| GB | 2137392 | 10/1984 |
| GB | 2161008 | 1/1986 |
| GB | 2170636 | 8/1986 |
| GB | 2180087 | 3/1987 |
| GB | 2181589 | 4/1987 |
| GB | 2183882 | 6/1987 |
| GB | 2191030 | 12/1987 |
| GB | 2201821 | 9/1988 |
| GB | 2222712 | 3/1990 |
| GB | 2225889 | 6/1990 |
| GB | 2226436 | 6/1990 |
| GB | 2242300 | 9/1991 |
| GB | 2262642 | 6/1993 |
| GB | 2328311 | 2/1999 |
| GB | 2335524 | 9/1999 |
| JP | 11009761 | 1/1999 |
| JP | 11114137 | 4/1999 |
| WO | WO9910849 | 3/1999 |
| WO | WO0032286 | 6/2000 |

OTHER PUBLICATIONS

Ritchie, Lauren "Orange Man Sought In Betting Probe", Orlando Sentinel Tribune, May 30, 1990 at p. B2.
Mayo, Michael, "Win-Or-Lose-Cruise, You Can Bet Sports Legally Around Here—Just Wait Till The Boat Is 3 Miles Out", Sun-Sentinel, Dec. 28, 1994 at p. 1C.
Cave, Kathy, "The Lake Effect", Milwaukee Journal Sentinel, Mar. 27, 1996 at p. 8.
Pending U.S. Patent Application entitled: "Methods and Apparatus for Providing Communications Services at a Gaming Machine", Walker et al., U.S. Appl. No. 10/420,118, filed Apr. 21, 2003.
Murray, Raphel, "Casinos gamble on direct mail; Atlantic City casinos; Retail; Industry Overview", Direct Marketing Magazine, Feb. 1992, vol. 54, No. 10, p. 32, ISSN: 0012-3188.
Busch, Melanie, "Tulsa Firm Explores Internet Gaming", Tulsa World, Aug. 1, 1996, Section: Business, p. E1.
"Electronic Bingo System", [online], Network Gaming International Corporation, [retrieved on Nov. 13, 1996], Retrieved from the Internet: <URL: http://network-bingo.com/bingo.htm>.
Parets, Robyn Taylor, "The newer DEAL", International Gaming and Wagering Business, Apr. 1997, Section, p. 27, ISSN: 8750-8222.
"TLC: The Secret World of Gambling: Casino Surveillance,", [online], Copyright 2000, The Discovery Channel, <http://tlc.discover.com/tlcpages/gambling/eyesky.html>.
"MGAM Signs Agreement With Lac Vieux Desert Chippewa Tribe", Business Wire, May 18, 2001.
"DEQ Casino—Flying Bet Roulette", [online], [retrieved on Nov. 24, 2002], Retrieved from the Internet:: <http://www.deq.com/ang/flying html>.
"GameCast Live—Home", [online], [retrieved on Nov. 24, 2002], Retrieved from the Internet: <http://www.gamecastlive.com/>.
"GameCast Live—About the Product", [online], [retrieved on Nov. 24, 2002], Retrieved from the Internet: <http://www.gamecastlive.com/about_the product.html>.
"GameCast Live—PowerPoint Presentation", [online], [retrieved on Nov. 24, 2002], Retrieved from the Internet: <http://www.gamecastlive.com/presentation/toronto2_files/frame.htm>.
"GameCast Live—Press Release", [online], [retrieved on Nov. 24, 2002], Retrieved from the Internet: <http://www.gamecastlive.com/press_june_6.html>.
"Welcome—i2corp.com", [online], [retrieved on Nov. 24, 2002], Retrieved from the Internet: <http://www.i2corp.com/>.
"Games—i2corp.com", [online], [retrieved on Nov. 24, 2002], Retrieved from the Internet: <http://www.i2corp.com/games/index.cfm>.
"The Home Gambling Network—Welcome", [online], [retrieved on Nov. 24, 2002], Retrieved from the Internet: <http://www.homegamblingnetwork.com>.
"The Home Gambling Network—Players", [online], [retrieved on Nov. 24, 2002], Retrieved from the Internet: <http://www.homegamblingnetwork.com/player.php3>.
"Multimedia Games, Inc.—Home", [online], [retrieved on Nov. 24, 2002], Retrieved from the Internet: <http://www.betnet.com/>.
"Mimio turns a dry erase board into an electronic whiteboard", [online], Dukane Corporation, Audio Visual Division, [retrieved in 2002], no URL available.
"Say Goodbye to Light Bulbs: New Materials Developed by Opsys" [online], Isis Innovation News [retrieved on Jan. 5, 2006], Retrieved from the Internet: <http://www.isis-innovation.com/about/news/opsys-lightbulbs.html>.
Goosens, Michael, "Laser beam and transparent sensors" [online], Isis Innovation News [retrieved on Jan. 5, 2006], Retrieved from the Internet: <http://atlas.web.cern.ch/Atlas/TP/NEW/HTML/tp9new/node253.html>.
Fleishman, Glenn, "Wireless networks let you finally cut the cord", [online] The Seattle Times, [retrieved on Jan. 5, 2006], Retrieved from the Internet: <http://archives.seattletimes.nwsource.com/cgi-bin/texis.cgi/web/vortex...>.
"Firm Develops Flexible, Transparent Displays for Military Use", [online], Photonics.com, [retrieved on Jan. 5, 2006], Retrieved from the Internet: <http:www.photonics.com/spectra/business/XQ/ASP/businessid.719/QX/read.htm>.
Arcade History website, http://www.arcade-history.com/history_database.php..., 2000-2006.
Aztec Temple MultiWay Article by Strictly Slots, published Aug. 2005.
Barn Yard Article in Strictly Slots, published in Mar. 2002.
Bonus Times Article written by Strictly Slots, published in Jul. 2000.
Easy Street Advertisements and Articles written by Casino Data Systems, published in 2000.
Gold Fever Advertisement written by Atronic Casino Technology, Ltd., published 1999.
Gold Fever Atronic Web Page written by Atronic Casino Technology, Ltd., dated Mar. 2002.
Jewel in the Crown Advertisement written by Barcrest Ltd., published 1999.
Marshall Fey, Slot Machines a pictorial History of the First 100 Years, 1983, Liberty Belle Books, pp. 79, 150, 171, 231.
On the Money Advertisement written by Strictly Slots, published in Dec. 2000.
Take Your Pick Advertisement written by IGT/Anchor Gaming, published in 1999, on or before December thereof.
Take Your Pick Article, Strictly Slots, published Mar. 2001.
Vision Series™/Good Times™ Brochure written by IGT, published in 1999, on or before December thereof.
X Factor Brochure and Website Page written by WMG Gaming, Inc., published in 1998, on or before December thereof.

* cited by examiner

700

| IMAGE IDENTIFIER 710 | IMAGE DATA FILE 720 | DESCRIPTION 730 |
|---|---|---|
| I001 | <IMAGE DATA> | CHERRY |
| I002 | <IMAGE DATA> | BELL |
| I003 | <IMAGE DATA> | BAR |
| I100 | <IMAGE DATA> | 9 |

FIG. 7

800

| AUDIO DATA IDENTIFIER 810 | AUDIO DATA FILE 820 | DESCRIPTION 830 |
|---|---|---|
| A001 | <AUDIO DATA> | COIN DROPPING |
| A002 | <AUDIO DATA> | REEL STOPPING |
| A093 | <AUDIO DATA> | BELLS FOR THE JACKPOT |
| A109 | <AUDIO DATA> | BILL BEING INSERTED |

FIG. 8

900

| OUTCOME 910 | NUMBER OF COINS AWARDED 920 |
|---|---|
| CHERRY / ANY / ANY | 2 |
| ANY / ANY / CHERRY | 2 |
| CHERRY / CHERRY / ANY | 5 |
| ANY / CHERRY / CHERRY | 5 |
| CHERRY / ANY / CHERRY | 5 |
| CHERRY / CHERRY / CHERRY | 20 |
| BAR / ORANGE / ORANGE | 10 |
| ORANGE / ORANGE / BAR | 10 |
| ORANGE / ORANGE / ORANGE | 20 |
| BAR / PLUM / PLUM | 14 |
| PLUM / PLUM / BAR | 14 |
| PLUM / PLUM / PLUM | 20 |
| BAR / BELL / BELL | 18 |
| BELL / BELL / BAR | 18 |
| BELL / BELL / BELL | 20 |
| BAR / BAR / BAR | 50 |
| 7 / 7 / 7 | 100 |
| OTHER | 0 |

FIG. 9

PRIOR ART

1000

| SESSION IDENTIFIER: S1122 1005 | | | | |
|---|---|---|---|---|
| TIME STARTED: 12:14 1010 | | | | |
| GAME PLAY 1015 | TIME OF GAME PLAY 1020 | AMOUNT WAGERED 1025 | OUTCOME 1030 | PAYOUT 1035 |
| 1 | 12:14:34 | $1 | BAR-7-BELL | 0 |
| 2 | 12:14:40 | $1 | CHERRY-BAR-BAR | 2 |
| 3 | 12:14:46 | $1 | ORANGE-ORANGE-ORANGE | 10 |
| N | 12:47:21 | $3 | PLUM-7-BAR | 0 |

FIG. 10

1100

| GAMING DEVICE IDENTIFIER 1105 | GAME 1110 | DENOMINATION 1115 | LOCATION 1120 |
|---|---|---|---|
| G10001 | WILD TURKEY SHOOTOUT | DOLLAR | 1ST FLOOR 105N 209E |
| G98765 | KIT AND CABOODLE | NICKLE | 2ND FLOOR 30N 70E |
| G33445 | END OF THE RAINBOW | QUARTER | 1ST FLOOR 25S 50W |
| G22449 | KEY TO THE CASTLE | FIVE-DOLLAR | 3RD FLOOR 50N 70W |

FIG. 11

1200

| PLAYER IDENTIFIER 1205 | NAME 1210 | FINANCIAL ACCOUNT IDENTIFIER 1215 | HOME ADDRESS 1220 | E-MAIL ADDRESS 1225 | THEORETICAL WIN 1230 | PLAYER DEVICE ADDRESS 1235 |
|---|---|---|---|---|---|---|
| P111222 | JOHN DOE | 1111-1111-1111-1111 | ANYWHERE, USA | JDOE@ANYWHERE.COM | $2345 | N/A |
| P222333 | JANE BROWN | 2222-2222-2222-2222 | SOMEWHERE, USA | (123) 456-7890, JBROWN@SOMEWHERE.COM | $765 | 0003C92DB48F |
| P333444 | BILL GREEN | 3333-3333-3333-3333 | ANYPLACE, USA | (111) 222-3333 | $6100 | 66.6.77.101 |

FIG. 12

1300

| INFORMATION DERIVING DEVICE IDENTIFIER 1305 | ASSOCIATED GAMING DEVICE IDENTIFIER 1310 | SENSORS | | | | |
|---|---|---|---|---|---|---|
| | | CAMERA FOCUSED ON DISPLAY SCREEN? 1315 | CAMERA FOCUSED ON CREDIT METER? 1320 | MICROPHONE IN COIN TRAY? 1325 | TOUCH SENSORS ON PHYSICAL BUTTONS? 1330 | TOUCH SENSORS ON DISPLAY SCREEN? 1335 |
| S10001 | G20008; G72134 | YES - G 20008 | YES - G200008 | NO | YES | NO |
| S10002 | G12345 | YES | YES | NO | NO | NO |
| S24429 | G86522 | NO | YES | YES | NO | YES |
| S34567 | G11223 | YES | NO | YES | NO | YES |

FIG. 13

1400

| MESSAGE CONDITION 1405 | MESSAGE IDENTIFIER 1410 |
|---|---|
| SHOW PLAYING TONIGHT AT 7:00PM, CURRENT TIME 6:45PM, RATE OF PLAY BELOW 300 PULLS/HR | M1111 |
| SESSION LOSSES > $20, PLAYER HAS NOT PREVIOUSLY RECEIVED THIS MESSAGE | M2222 |
| PLAYER STAYED IN HOTEL THE PREVIOUS NIGHT | M3333 |
| SESSION HAS LASTED CONTINUOUSLY FOR 3 HOURS | M4444 |
| SESSION LOSSES EQUAL $30 | M5555 |

FIG. 14

1500

| MESSAGE IDENTIFIER 1505 | MESSAGE TYPE 1510 | MESSAGE 1515 | RESPONSE 1520 |
|---|---|---|---|
| M1111 | ADVERTISEMENT | "ATTEND THE MOST AMAZING MAGIC SHOW ON EARTH! TONIGHT AT 7:00PM IN THE CASINO THEATER." | NO |
| M2222 | PROMOTION | "ASK ANY ATTENDANT FOR A COUPON GOOD FOR $5 OFF A STEAK DINNER AT OUR CATTLE RANCH STEAKHOUSE." | NO |
| M3333 | SURVEY | "ARE YOU PLEASED WITH YOUR HOTEL ROOM? IF SO, PLEASE PRESS THE "BET 1" BUTTON." | YES |
| M4444 | GENERAL INFORMATION | "IF YOU NEED THEM, RESTROOMS ARE LOCATED ON THE OTHER SIDE OF THE FOUNTAIN." | NO |
| M5555 | OFFER | "GET $30 BACK BY AGREEING TO SWITCH LONG DISTANCE PHONE COMPANIES! IF INTERESTED, PRESS "YES" AND A CASINO ATTENDANT WILL BE OVER SHORTLY." | YES |

FIG. 15

1600

| OUTPUT MESSAGE IDENTIFIER 1605 | MESSAGE IDENTIFIER 1610 | PLAYER IDENTIFIER 1615 | RESPONSE TO MESSAGE 1620 |
|---|---|---|---|
| OM112233 | M1234 | P122112 | N/A |
| OM223344 | M2345 | P233223 | WAS PLEASED |
| OM334455 | M3456 | P34434 | OFFER DECLINED |
| OM445566 | M3456 | P544554 | NO RESPONSE YET |

FIG. 16

METHOD AND APPARATUS FOR DERIVING INFORMATION FROM A GAMING DEVICE

PRIORITY CLAIM TO CO-PENDING APPLICATIONS

This application:

claims the benefit of priority of U.S. Provisional Patent Application No. 60/417,687, entitled "METHOD AND APPARATUS FOR DERIVING INFORMATION FROM A GAMING DEVICE," filed on Oct. 10, 2002.

This Application is related to co-pending, commonly-owned U.S. application Ser. No. 10/420,118, entitled METHODS AND APPARATUS FOR PROVIDING COMMUNICATIONS SERVICES AT A GAMING DEVICE, which was filed Apr. 21, 2003 and which claims the benefit of priority from U.S. Provisional Application No. 60/374,436, filed on Apr. 19, 2002.

This Application also is related to co-pending commonly-owned U.S. application Ser. No. 10/635,986, entitled "SYSTEM AND METHOD FOR REMOTE AUTOMATED PLAY OF A GAMING DEVICE" and filed on Aug. 7, 2003, which:

(i) is a continuation-in-part application of U.S. patent application Ser. No. 10/159,722, entitled "SYSTEM AND METHOD FOR AUTOMATED PLAY OF MULTIPLE GAMING DEVICES," filed on May 30, 2002; which is a continuation application of U.S. patent application Ser. No. 09/879,299, entitled "SYSTEM AND METHOD FOR AUTOMATED PLAY OF MULTIPLE GAMING DEVICES," filed on Jun. 12, 2001; which is a continuation-in-part application of U.S. patent application Ser. No. 09/437,204 entitled "AUTOMATED PLAY GAMING DEVICE," filed on Nov. 9, 1999, and issued on Jun. 12, 2001, as U.S. Pat. No. 6,244,957; which is a continuation application of U.S. patent application Ser. No. 08/774,487, "AUTOMATED PLAY GAMING DEVICE." filed on Dec. 30, 1996, and issued on Jan. 11, 2000, as U.S. Pat. No. 6,012,983; and (ii) claims the benefit of priority of U.S. Provisional Patent Application No. 60/401,853, "SYSTEM AND METHOD FOR REMOTE AUTOMATED PLAY OF GAMING DEVICES," filed Aug. 7, 2002

Each of the above applications is incorporated herein by reference in its entirety.

BACKGROUND

Gaming devices such as slot machines generate more than $15 billion in revenue per year for U.S. casinos. In fact, most casinos generate more than half of their gaming revenue from gaming devices such as slot machines. To take advantage of the popularity of slot machines and other gaming devices, some casinos offer three or four thousand slot machines in a single location.

Players of gaming devices can be important customers for casinos and other merchants in many respects. For instance, a person at a slot machine may not only provide a casino with gambling revenue, but may later pay to eat at the casinos restaurant, stay at the casinos hotel, or see a show at the casino. Furthermore, players of slot machines tend to represent a large cross section of the population, and therefore may be potential customers for phone companies, life insurance companies, car companies, and various other types of merchants.

Further value may be realized from players of gaming devices. For example, events occurring at a gaming device, such as events associated with a player of the gaming device, can provide the casino and other merchants with valuable indications as to what types of promotions and marketing offers would be most effective with that player. However, many gaming devices are not programmed or equipped to detect, transmit indications of, and/or record all events that may be of interest for such purposes. And manufacturers of new gaming devices or proprietors of networks on which the gaming devices are located may not necessarily have the interest or resources available to make the new gaming devices operable to detect, transmit indications of, and/or record such events. Additionally, regulators of gaming devices may be reluctant to allow significant changes or intrusive access to the information of a gaming device. Accordingly, a need exists for a manner of deriving various valuable information from a gaming device without requiring significant cooperation of a gaming device manufacturer, a proprietor of a network on which the gaming device is located, and/or regulators of the gaming device.

BRIEF DESCRIPTION OF THE DRAWINGS

FIG. 7 is a table illustrating an exemplary data structure of an image file data database, for use in at least one embodiment of the present invention;

FIG. 8 is a table illustrating an exemplary data structure of an audio file data database, for use in one or more embodiments of the present invention;

FIG. 9 is a table illustrating an exemplary data structure of a prior art payout database;

FIG. 10 is a table illustrating an exemplary data structure of a player session database, for use in one or more embodiments of the present invention;

FIG. 11 is a table illustrating an exemplary data structure of a gaming device database, for use in one or more embodiments of the present invention;

FIG. 12 is a table illustrating an exemplary data structure of a player database, for use in one or more embodiments of the present invention;

FIG. 13 is a table illustrating an exemplary data structure of an information deriving device database, for use in one or more embodiments of the present invention;

FIG. 14 is a table illustrating an exemplary data structure of a message determination database, for use in one or more embodiments of the present invention;

FIG. 15 is a table illustrating an exemplary data structure of a message details database, for use in one or more embodiments of the present invention;

FIG. 16 is a table illustrating an exemplary data structure of a message tracking database, for use in one or more embodiments of the present invention;

DETAILED DESCRIPTION OF EMBODIMENTS OF THE INVENTION

Figure 1:
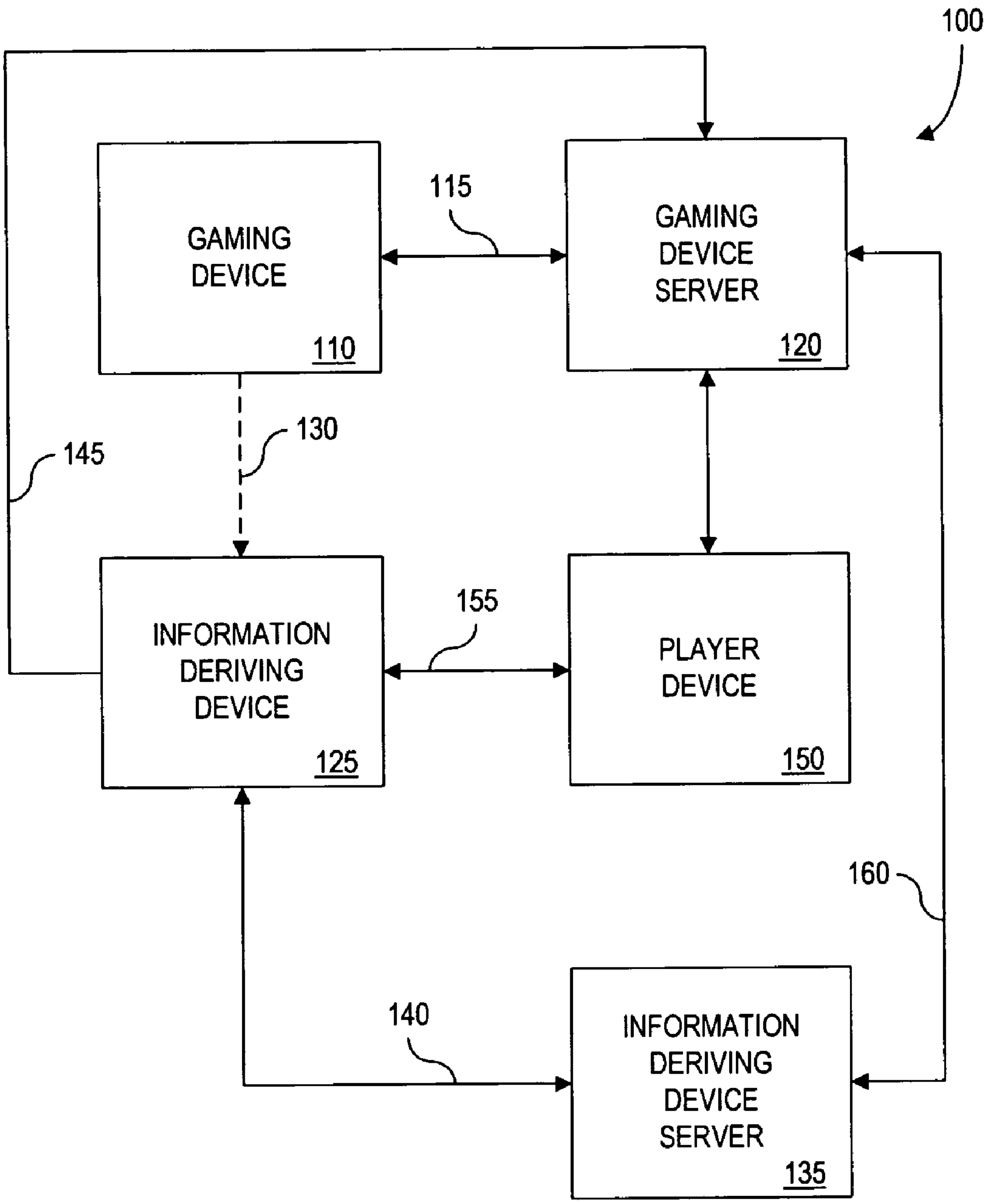
FIG. 1 is a block diagram of a system consistent with at least one embodiment of the present invention.

Applicants have recognized that it is desirable to obtain different kinds of information from a gaming device that the gaming device itself may not be programmed or operable to detect, store, and/or communicate to another device. For example, Applicants have recognized that it may be desirable to determine when an outcome obtained by a player of a gaming device is a "near miss" such that it almost, but not quite, qualifies for a large payout. However, gaming devices are not programmed to detect, much less store and/or communicate, the occurrence of such an event. At most, gaming devices are programmed to detect when an actual payout has occurred at the gaming device.

Applicants have further recognized that certain information that is not currently detected and/or tracked from a gaming device may lead to a valuable new source of revenue for the casino and/or other entities such as marketers. For example, if one were able to detect that a player of a gaming device has obtained a "near miss" outcome (e.g., the symbols "7-7-other" appear across a payline of the gaming device, which set of symbols do not qualify for any payout, whereas the set of symbols "7-7-7" would have qualified the player for a one hundred coin payout), one may conclude that a player at this point is feeling disappointed and may be willing to perform an activity in order to obtain a benefit and thus offset that disappointment. For example, a player that has just obtained a "near miss" outcome may be willing to (i) answer some marketing questions and agree to try a new product or service, and/or (ii) commit to playing the gaming device at a minimum rate for a minimum amount of time, in exchange for one hundred coins (the payout that the player would have received had the player obtained the "7-7-7" payout). However, since (as discussed above) gaming device are not currently programmed to detect, store, and/or communicate such information as may be found valuable, such opportunities cannot currently be taken advantage of.

Applicants have further recognized that many casinos currently have thousands of gaming devices on the casino floor in which the casinos have invested millions of dollars. A typical gaming device costs between $5,000 and $15,000. Once a gaming device is purchased, a casino is typically reluctant to replace it for many years and will do so only once the gaming device is no longer operating correctly or the game played thereon is no longer considered profitable enough. Thus, Applicants have recognized that the casinos are not financially prepared to replace all or a significant number of such gaming devices with newly programmed gaming devices that are able to detect, store, and/or communicate certain information that may be found desirable by the casino and/or another operator.

Applicants have further recognized that substantially and/or intrusively retrofitting existing gaming devices with functionality that allows certain new types of information to be detected, stored and/or communicated is not a viable option for most casino operators. First, most casino operators do not have sufficient access to the inner workings of a gaming device such that they would be capable of reprogramming the gaming device to detect, store, and/or communicate the desired information. For example, regulators typically have steadfast rules prohibiting a gaming device operator from changing the programming of a gaming device except for certain very limited circumstances (to ensure the integrity of the gaming device). Further, most casino operators do not have the personnel or resources to be able to reprogram or retrofit a gaming device in any significant manner.

Applicants have further recognized that gaming device manufacturers may not be prepared to work with casino operators to retrofit gaming devices such that they are operable to detect, store, and/or communicate new types of information. Manufacturers may also not be willing to develop new gaming devices that are operable to detect, store and/or communicate new types of information. This is because most gaming device manufacturers have the majority of their resources devoted to developing new games and platforms. Further, the gaming device manufacturers and designers may not be sufficiently motivated to redesign or retrofit gaming devices in order to help other entities such as marketers realize revenue from players playing the gaming devices. It may also be prohibitively difficult to coordinate the various gaming device manufacturers and designers such that any new functionality that allows new types of information to be detected, stored and/or communicated from the gaming device is applicable to all or most of the gaming devices of the various manufacturers.

In light of the above recognitions by Applicants, Applicants have further recognized that, in order to detect, store, and/or communicate the many new types of information from a gaming device that may be used to generate revenue, a need exists for a system and method that does not require the cooperation of the gaming device manufacturer or designer and/or that does not require the operator of the gaming device to intrusively or significantly retrofit the gaming device.

In accordance with one or more embodiments, a method comprises (i) determining, based on information derived from a gaming device, an occurrence of a predetermined event at the gaming device (wherein the information is derived without the cooperation of the gaming device); and (ii) causing, based on the occurrence of the event, a message to be output to a player of the gaming device.

In accordance with one or more embodiments, an apparatus may comprise: (i) a processor, and (ii) a storage device that stores a program for directing the processor; the processor being operative with the program to: (i) derive information from a gaming device, without cooperation of the gaming device; (ii) determine, based on the derived information, the occurrence of a predetermined event at the gaming device; and (iii) cause, based on the determination of the occurrence of the predetermined event, a message to be output to a player of the gaming device.

For example, it may be determined that a player is preparing to cash out from the gaming device. This determination may be performed by, for example, a mechanism comprising a camera and a processor that is attached to the gaming device. The mechanism may be, for example, programmed to detect motions of the player and, in particular, to detect when a players hand is approaching the "cash out" button of the gaming device. The mechanism may further comprise a display screen and be programmed to output messages to the player of the gaming device. For example, the message may inform that player that if the player agrees to play for an additional hour at the gaming device, the player will be provided with twenty-five credits in the credit meter with which to gamble.

In accordance with one or more embodiments, a method comprises (i) determining graphical data displayed on a display component of a gaming device; (ii) comparing the graphical data to data stored in memory; (iii) determining, based on the comparing, whether a predetermined event has occurred at the gaming device; (iv) determining, if the predetermined event has occurred, a corresponding message to be output to a player of the gaming device; and (v) causing the message to be output on a player device associated with the player.

For example, it may be determined that a "near miss" outcome has been obtained by a player of a gaming device. This determination may be performed by, for example, a mechanism comprising a camera and a processor that is attached to the gaming device. The mechanism may be, for example, programmed to detect the symbols depicted on a screen of the gaming device and use character recognition technology and a database of pre-stored outcomes to determine whether the symbols displayed along a payline of the gaming device match an outcome labeled as a "near miss" in a memory associated with the processor. The mechanism may be operable to determine the e-mail address of a personal digital assistant (PDA) held by the player playing the gaming device and may output the message to the player via this PDA. For example, the message output to the players PDA may inform that player that if the player agrees to a free trial of a particular service, the player will be provided with the payout that the player would have qualified for had the player obtained the outcome that the player "nearly missed."

In accordance with one or more embodiments, a system comprises: (i) a first device comprising a gaming device, the gaming device being operable to output a first set of data to a second device via a computer network, and the gaming device being further operable to output a second set of data to an operator of the gaming device via an interface; (ii) a third device, the third device being operable to receive a third set of data from the gaming device, wherein the third device is not operable to communicate with the gaming device via a computer network, and wherein the third device is further operable to cause a message to be output to a player of the gaming device, the message being determined based on the gathered data.

In accordance with one or more embodiments, an apparatus may comprise: (i) a processor; and (ii) a storage device that stores a program for directing the processor, the processor being operative with the program to: (i) derive a first set of data from a gaming device, wherein the first set of data is derived without communicating with the gaming device through a computer network, and further wherein the gaming device is operable to (i) output via a computer network a second set of data to a computing device, and (ii) output a third set of data to an operator of the gaming device via an interface of the gaming device.

For example, a gaming device may be programmed to output a first set of data such as coin in and coin out to a network server. A gaming device may further be programmed to output a second set of data, such as diagnostic data about the mechanics of the gaming device, to personnel servicing the gaming device. However, a marketer or casino may be interested in obtaining additional data that the gaming device is not otherwise operable to detect, store, and/or communicate. Accordingly, in embodiments of the present invention, a device (e.g., a camera equipped with a microphone for receiving audio data and a processor) that is operable to receive a third set of data, such as outcomes occurring at the gaming device and a players strategy in playing a game at the gaming device, may be placed in proximity to the gaming device. For example, the camera component of the device may be mounted across an aisle from the gaming device and the microphone may be placed near the coin tray of the gaming device. This additional device may, for example, be programmed to derive whatever additional data the marketer and/or the casino may be interested in, without directly communicating with the gaming device via a computer network, and may cause a message to be output to the player based on this data.

The scope of the present invention and embodiments thereof may be understood more fully with reference to the following figures. It should be noted that the embodiments described with reference to the following figures are presented for illustrative purposes only and are not meant to be limiting in any sense. It should also be noted that, as used herein, the terms "an embodiment", "embodiment", "embodiments", "the embodiment", "the embodiments", "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Regarding reference numerals used in the following figures, it should be noted that the left most digit(s) of a reference numeral identifies the figure in which the reference numeral first appears.

Embodiments of the present invention will first be introduced by means of a block diagram of an exemplary system infrastructure, followed by a description of block diagrams of exemplary devices that may be utilized by an entity practicing the present invention. Exemplary data structures illustrating tables that may be used when practicing embodiments of the present invention will then be described, followed by a flowchart that illustrates a method of the present invention.

Referring now to FIG. 1, a block diagram of a system 100 in accordance with at least one embodiment includes a gaming device 110 (e.g., a slot machine or video poker machine) that is in communication, via a communications network 115, with a gaming device server 120 (e.g., a slot server of a casino). The gaming device 110 may communicate with the gaming device server 120 directly or indirectly, via a wired or wireless medium such as the Internet, LAN, WAN or Ethernet, Token Ring, or via any appropriate communications means or combination of communications means. The gaming device 110 and/or the gaming device server 120 may comprise a computer, such as one based on the INTEL PENTIUM processor, that are adapted to communicate with one another. Any number and type of gaming devices 110 may be in communication with the gaming device server 120.

Communication between the gaming device 110 and the gaming device server 120, and among a plurality of gaming devices 110, may be direct or indirect, such as over the Internet through a Web site maintained by gaming device server 120 on a remote server or over an on-line data network including commercial on-line service providers, bulletin board systems and the like. In yet other embodiments, the gaming device 110 may communicate with another gaming device and/or gaming device server 120 over RF, cable TV, satellite links and the like.

Some, but not all, possible communication networks that may comprise network 115 or be otherwise part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, BLUETOOTH, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the gaming device server 120 may not be necessary and/or preferred. For example, the present invention may, in one or more embodiments, be practiced on a stand-alone gaming device 110 and/or a gaming device 110 in communication only with one or more other gaming devices 110. In such an embodiment, any functions described as performed by the gaming device server 120 or data described as stored on the gaming device server 120 may instead be performed by or stored on one or more gaming devices 110.

Also part of system 100 is an information deriving device 125. The information deriving device 125 may comprise, for example, a device operable to derive information from a gaming device 110 without cooperation of the gaming device 110. For example, an information deriving device 125 may comprise a camera directed at one or more display screens of the gaming device 110, a microphone directed at a coin tray of the gaming device 110, and/or a detector of electro, electromagnetic, RF and/or IR signals given off by the gaming device 110. It should be noted that an information deriving device 125 may be located outside the housing of a gaming device 110 or inside the housing of the gaming device 110. Further, information deriving device 125 may be attached to gaming device 110 in some manner (e.g., bolted on or screwed into the housing of gaming device 110) or not attached to gaming device 110 (e.g., placed on a surface of gaming device 110 or located several inches to several feet from the gaming device 110). Information deriving device 125 may comprise one or more components operable to communicate with one another but not necessarily physically adjacent to one another or located within the same housing. For example, information deriving device 125 may comprise a camera component, a display device component, a processor and a microphone component.

In one or more embodiments, a single information deriving device 125 may be associated with more than one gaming device 110. For example, a camera comprising an information deriving device 125 may be located such that it can detect data depicted on a display device of three different gaming devices. An operator of the information deriving device 125 may determine which of the gaming devices the information deriving device is to be focused on at any one time. Alternatively, the information deriving device may be programmed to alternate among the plurality of gaming devices with which it is associated (e.g., based on a time interval and/or based on activity at the gaming devices).

The information deriving device 125 derives information from gaming device 110, as illustrated by dashed communication line 130. It should be noted that, in FIG. 1, solid lines indicate network connections while dashed lines indicate communication of information that may be performed without benefit of a network or other direct link, with the arrows indicating the direction of information flow among the devices. The communication of information indicated by the dashed lines may be carried out, for example, without cooperation of one of the devices involved in the data transfer. For example, communication line 130 indicates that information output by a gaming device 110 may be received by an information deriving device 125. However, as indicated by the presence of the dashed line, there may not be any network or other direct communication link among the gaming device 110 and the information deriving device 125. For example, the gaming device 110 may simply output information for the benefit of a player playing the gaming device (e.g., outcomes displayed on a display screen of the gaming device) and the information deriving device 125 may simply be operable to capture this data, without the cooperation of the gaming device 110 and without the information being output directly or for the benefit of the information deriving device 125.

Note that, although a network connection may be indicated among two or more devices via a solid line, such an indication is provided as an illustration of one or more embodiments and should not be interpreted as limiting the communication among the devices in question to always require a network or other direct connection.

The information deriving device 125 may be operable to communicate, via a communications network 140, with an information deriving device server 135. The information deriving device 125 may communicate with the information deriving device server 135 directly or indirectly, via a wired or wireless medium such as the Internet, LAN, WAN or Ethernet, Token Ring, or via any appropriate communications means or combination of communications means. The information deriving device 125 and/or the information deriving device server 135 may comprise a computer, such as one based on the Intel® Pentium® processor, that are adapted to communicate with one another. Any number and type of information deriving devices 125 may be in communication with the information deriving device server 135.

Communication between the information deriving device 125 and the information deriving device server 135, and among a plurality of information deriving devices 125, may be direct or indirect, such as over the Internet through a Web site maintained or accessed by information deriving device server 135 on a remote server or over an on-line data network including commercial on-line service providers, bulletin board systems and the like. In yet other embodiments, the information deriving device 125 may communicate with another information deriving device and/or information deriving device server 135 over RF, cable TV, satellite links and the like.

Some, but not all, possible communication networks that may comprise network 140 or be otherwise part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, BLUETOOTH, and TCP/IP. Communication may be encrypted to ensure privacy and prevent fraud in any of a variety of ways well known in the art. Communication network 140 may be part of communication network 115 or may be a separate network.

In an embodiment, the information deriving device server 135 may not be necessary and/or preferred. For example, the present invention may, in one or more embodiments, be practiced on a stand-alone information deriving device 125 and/or a information deriving device 125 in communication only with one or more other information deriving devices. In such an embodiment, any functions described as performed by the information deriving device server 135 or data described as stored on the information deriving device server 135 may instead be performed by or stored on one or more information deriving devices 125.

In one or more embodiments, an information deriving device 125 may be operable to communicate with gaming device server 120 (as indicated by communication line 145). For example, in one or more embodiments an information deriving device server 135 may not be necessary and the gaming device server 120 may be programmed to carry out some or all of the functions of the information deriving device server 135. Further, some or all of the data that has been described herein as being stored in the information deriving device server 135 may instead or in addition be stored in the gaming device server 120. Some embodiments include both a gaming device server 120 and an information deriving device server 135. In such embodiments an information deriving device 125 may still communicate with the gaming device server 120 to transmit and/or receive certain information. For example, a database of player information (such as player database 1200, described below with respect to FIG. 12) may be stored in the memory of the gaming device server 120 and the information deriving device 125 may request certain information from such a database in order to more effectively output messages to a player (e.g., a players name and/or financial account identifier for crediting a monetary benefit to the player).

The above description of what communication network 115 may comprise applies equally to communication network 145. Further, communication network 145 may, in some embodiments, be a part of communication network 115 or another communication network described herein. In some embodiments, communication network 145 is a separate and proprietary network that ties into the network 115.

The information deriving device server 135 may, in some embodiments, be operable to communicate, via communication network 160, with gaming device server 120. Communication network 160 may be a part of communication network 115 or another communication network described herein or may be a separate communication network. The description of what communication network 115 may comprise applies equally to communication network 160. In some embodiments, communication network 160 is a separate and distinct communication network that ties into the communication network 115 or another communication network described herein.

Information deriving device server 135 may be operable to request information from, receive information from, and/or transmit information to the gaming device server 120. For example, information deriving device server 135 may request information about a particular player or a particular gaming device from gaming device server 120. In another example, information deriving device server 135 may transmit information regarding a player session (described in detail below) and/or a message output to a player to gaming device server 120.

Also part of system 100 is a player device 150. A player device 150 may comprise, for example, a portable device operable to receive and/or transmit information. For example, a player device 150 may comprise, for example, a cellular telephone, a Personal Digital Assistant (PDA), a pager, a handheld video game a portable computers (e.g., a laptop computer, wearable computer, palm-top computer, or handheld computer), a wrist watch, and/or a smart card.

A player device 150 may be operable, via communication network 155, to communicate with an information deriving device 125. In other embodiments, a player device 150 may be operable to communicate with an information deriving device server 135. The description of what communication network 115 may comprise applies equally to communication network 155. For example, communication network 155 may comprise a wire or wireless network. In one embodiment, a player device 150 comprises a BLUETOOTH device that is operable to communicate wirelessly with other devices.

A player device 150 may be operable, for example, to receive a message from an information deriving device 125, an information deriving device server 135, and/or a gaming device server 120. For example, a player device 150 that comprises a PDA and/or a cellular telephone may be contacted when it is determined, based on information derived from a gaming device being played by the player associated with the player device, that a message should be output to the player. The message may be transmitted to the player device 150 using, for example, an address (e.g., BLUETOOTH address, IP address, or telephone number) of the player device as stored in a memory of the information deriving device 125, information deriving device server 135, and/or gaming device server 120. A display and/or and/or speaker of the player device may then output the message to the player. The player device 150 may further be operable to receive input from the player (e.g., a response to the message) and transmit the input to another device (e.g., the device that transmitted the message to the player device 150).

In one or more embodiments, a player that owns or operates a player device 150 may register the player device (e.g., provide the address of the player device and permission to be contacted via the player device) with the entity practicing aspects of the present invention. For example, a player may provide to a casino the BLUETOOTH address of his PDA or the telephone number of his cellular telephone. In other embodiments, an entity may provide a player device 150 to a player, in order to be able to output messages to the player. For example, when a player checks into a casino as a guest or comes up to a customer service area of a casino, the player may be provided a player device 150 for a period of time (e.g., the day, the duration of the players visit to the casino, etc.). The entity providing the player device 150 may store in a memory the players identifier (or other information identifying the player) in association with the address of the player device 150 (or in association with another identifier of the player device 150).

Figure 2:
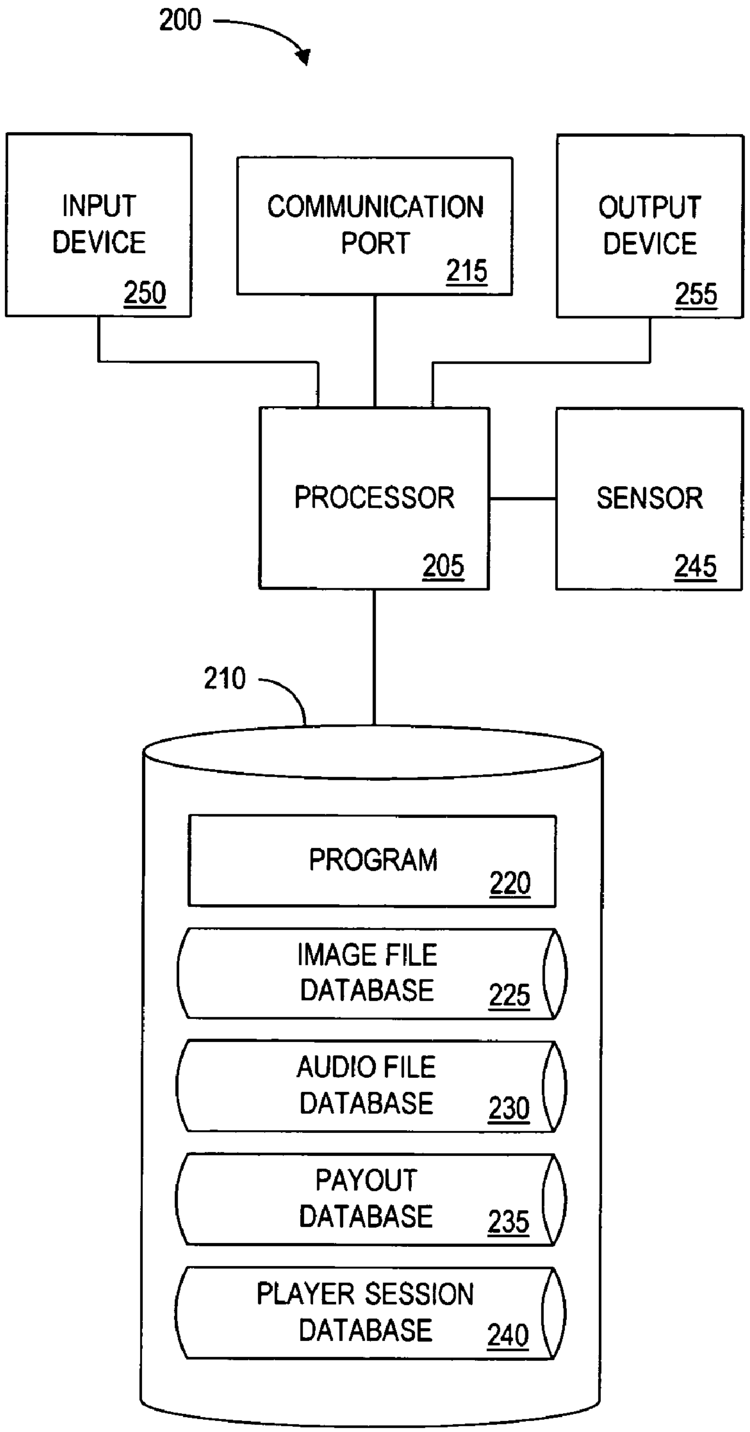
FIG. 2 is a block diagram of an information derivation device that may be part of the system of FIG. 1, consistent with at least one embodiment of the present invention.

Referring now to FIG. 2, illustrated therein is a block diagram of an embodiment 200 of an information deriving device. The embodiment 200 may comprise an embodiment of an information deriving device 125. The information deriving device 200 may be implemented as a system controller, a dedicated hardware circuit, an appropriately programmed general-purpose computer, or any other equivalent electronic, mechanical or electromechanical device.

The information deriving device 200 comprises a processor 205, such as one or more INTEL PENTIUM processors. The processor 205 is in communication with a memory 210 and a communications port 215 (e.g., for communicating with one or more other devices). The memory 210 may comprise an appropriate combination of magnetic, optical and/or semiconductor memory, and may include, for example, Random Access Memory (RAM), Read-Only Memory (ROM), a compact disc and/or a hard disk. The memory 210 may comprise or include any type of computer-readable medium. The processor 205 and the memory 210 may each be, for example: (i) located entirely within a single computer or other device; or (ii) connected to each other by a remote communication medium, such as a serial port cable, telephone line or radio frequency transceiver. In one embodiment, the information deriving device 200 may comprise one or more devices that are connected to a remote server computer for maintaining databases.

The memory 210 stores a program 220 for controlling the processor 205. The processor 205 performs instructions of the program 220, and thereby operates in accordance with the present invention, and particularly in accordance with the methods described in detail herein. The program 220 may be stored in a compressed, uncompiled and/or encrypted format. The program 220 furthermore includes program elements that may be necessary, such as an operating system, a database management system and "device drivers" for allowing the processor 205 to interface with computer peripheral devices. Appropriate program elements are known to those skilled in the art, and need not be described in detail herein.

The term "computer-readable medium" as used herein refers to any medium that participates in providing instructions to processor 205 (or any other processor of a device described herein) for execution. Such a medium may take many forms, including but not limited to, non-volatile media, volatile media, and transmission media. Non-volatile media include, for example, optical or magnetic disks, such as memory 210. Volatile media include dynamic random access memory (DRAM), which typically constitutes the main memory. Transmission media include coaxial cables, copper wire and fiber optics, including the wires that comprise a system bus coupled to the processor 205. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 205 (or any other processor of a device described herein) for execution. For example, the instructions may initially be borne on a magnetic disk of a remote computer. The remote computer can load the instructions into its dynamic memory and send the instructions over a telephone line using a modem. A modem local to an information deriving device 200 can receive the data on the telephone line and use an infrared transmitter to convert the data to an infrared signal. An infrared detector can receive the data carried in the infrared signal and place the data on a system bus for processor 205. The system bus carries the data to main memory, from which processor 205 retrieves and executes the instructions. The instructions received by main memory may optionally be stored in memory 210 either before or after execution by processor 205. In addition, instructions may be received via communication port 215 as electrical, electromagnetic or optical signals, which are exemplary forms of carrier waves that carry data streams representing various types of information. Thus, the information deriving device 200 may obtain instructions in the form of a carrier wave.

According to an embodiment of the present invention, the instructions of the program 220 may be read into a main memory from another computer-readable medium, such from a ROM to RAM. Execution of sequences of the instructions in program 220 causes processor 205 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 210 also stores a plurality of databases, including an image file database 225, an audio file database 230, a payout database 235, and a player session database 240. Each of these databases is described in detail below.

Note that, although these databases are described as being stored in an information deriving device, in other embodiments of the present invention some or all of these databases may be partially or wholly stored in another device, such as the gaming device server 120 and/or the information deriving device 135. Further, some or all of the data described as being stored in the databases 225 through 240 may be partially or wholly stored (in addition to or in lieu of being stored in the memory 210 of the information deriving device 200) in a memory of one or more other devices, such as gaming device server 120 and/or the information deriving device server 135.

The databases 225 through 240 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four separate databases are illustrated, the invention could be practiced effectively using one, two, three, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

The memory 210 may also store other information such as archives of information derived from one or more information deriving devices (e.g., information derived within a predetermined period of time (such as one hour or one day), information derived for a particular players consecutive game plays, information that satisfies at least one predetermined condition, etc.).

The processor 205 may further be operable to communicate with one or more sensors 245 (e.g., working together to derive information from a gaming device). The one or more sensors 245 may comprise, for example, at least one camera (operable to obtain still pictures and/or video), one or more microphones, one or more electromagnetic sensors, one or more pressure sensors, one or more IR signal sensors and/or one or more RF signal sensors.

The processor 205 may further be operable to communicate with one or more input devices 250. An "input device", as used herein unless indicated otherwise, may refer to a device that is used to receive an input. An input device may communicate with or be part of another device (e.g. a point of sale terminal, a point of display terminal, a user terminal, a server, a player device, a gaming device, a controller, etc.). In the present example, the input device 250 is a part of an information deriving device 200. Some examples of input devices include: a bar-code scanner, a magnetic stripe reader, a computer keyboard, a point-of-sale terminal keypad, a touchscreen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale. The input device 205 may be utilized, for example, by an employee of an entity practicing aspects of the present invention to program or direct the information deriving device 200.

The processor 205 may further be operable to communicate with an output device 255. The term output device, as used herein unless indicated otherwise, may refer to a device that is used to output information. An output device may communicate with or be part of another device (e.g. a gaming device, a point of sale terminal, a point of display terminal, a player device, a casino device, a controller, etc.). In the present example, the output device 255 is a part of information deriving device 200. Possible output devices include: a cathode ray tube (CRT) monitor, liquid crystal display (LCD) screen, light emitting diode (LED) screen, a printer, an audio speaker, an infra-red transmitter, a radio transmitter.

In addition to the components illustrated in FIG. 2, an information deriving device 200 may include other and/or different components. For example, the information deriving device may include a power source, such as a battery, for operating its various components. In one or more embodiments, the information deriving device may include fasteners, for attaching itself to a gaming device, to a ceiling, or to any other structure.

In embodiments of the present invention, an information deriving device is designed to derive information from a gaming device. Deriving information from a gaming device may comprise, for example, determining whether one or more of the following events has occurred at the gaming device associated with the information deriving device:

(i) an outcome being displayed along a payline of the gaming device (the outcome may include a final outcome or a preliminary outcome (e.g., such as a first hand of video poker));

(ii) a player qualifying for or being provided with a payout;

(iii) a wager being placed at the gaming device;

(iv) a reel configuration being displayed on a display screen of the gaming device (a reel configuration may include not only the outcome that was displayed across the pay line, but also other symbols that appeared above and below the pay line);

(v) a particular path or strategy being used by a player to arrive at an outcome (e.g., the information deriving device may detect which cards a player has held in a game of video poker in order to arrive at a final outcome);

(vi) a cash-out event where, for example, a player has pressed the cash-out button and received electronic credits in the form of coins, bills, and/or a cashless gaming receipt;

(vii) the occurrence of a bonus round on the gaming device;

(viii) that a players credit balance has reached a particular level (e.g., that the players credit balance has reached zero or an amount insufficient for a subsequent wager at the gaming device);

(ix) that the player has actuated a button, such as a "spin" button (e.g., including a detection of an amount of pressure with which the player has actuated the button);

(x) that the player has accessed a "help" feature of the gaming device;

(xi) whether the player has a drink;

(xii) the number of players present in a predetermined location, e.g., at the gaming device, or within a predetermined distance of the gaming device;

(xiii) that a player is facing a gaming device; and (xiv) that a player appears unhappy (e.g., about an outcome obtained by the player at the gaming device).

An information deriving device 200 may, for example, be programmed with one or more predetermined events and with instructions on how the information deriving device is to determine whether the one or more predetermined events has occurred. For example, assuming an information deriving device 200 includes a camera sensor for capturing images of the front of an associated gaming device, the information deriving device 200 may be programmed with information regarding the various locations in the captured image that correspond to various relevant information necessary for determining whether a predetermined event has occurred. For example, the information deriving device may be programmed to evaluate a first portion of a captured image (the portion being defined, for example, by particular pixels of the image to be evaluated or a quadrant of the image to be evaluated) that includes the credit meter to determine whether a particular credit meter balance has occurred and a second portion of the captured image that includes a display screen for displaying outcomes to determine the outcome obtained by a player.

As described herein, in one or more embodiments an information deriving device may be programmed to derive information from a gaming device even though the gaming device is not designed to communicate information to the information deriving device or to recognize the information deriving device. For example, the gaming device does not transmit signals to the information deriving device using a pre-arranged communications protocol. Also, the gaming device may not have any communications ports designed specifically to link with the information deriving device.

In one or more embodiments, the information deriving device relies on signals from the gaming device that are meant for a players perception. For instance, the information deriving device reads information directly from the credit meter to determine the size of the most recent payout, or the information deriving device reads information directly from the reels of the gaming device to determine the most recent outcome. The information deriving device may also rely upon signals provided by the player. For example, a hand motion made by the player may indicate that the player is placing a wager, or initiating a handle pull. It should be noted that the term "signals" as used herein is not limited to electrical, electromagnetic signals but encompasses any manner of conveying information or output from which information may be derived.

The following is a list of exemplary ways in which the information deriving device may derive information from a gaming device (note that deriving information from a gaming device includes deriving information from the area within the vicinity of the gaming device, including actions and/or expressions of the player playing the gaming device):

(i) the information deriving device may monitor a display screen of a gaming device (a display screen may be an area where a gaming device displays outcomes, credits won, a credit balance, the events of a bonus round, help features, and so on; the display screen may be a cathode ray tube (CRT) display, liquid crystal display (LCD), or any other display);

(ii) the information deriving device may monitor a more simple display, such as a dot matrix display located beneath a player tracking card reader, or a dedicated LCD display for showing a credit balance or a payout won;

(iii) the information deriving device may monitor mechanical displays, such as a mechanical train that moves around, or a mechanical wheel that spins (e.g., both of which may be located within the housing of the gaming device, along with at least a component of the information deriving device);

(iv) the information deriving device may monitor various buttons on the gaming device, to determine for example, when they are actuated (buttons may include, e.g., "spin," "bet 1 credit," "bet three lines," "cash out," "hold this card," etc.);

(v) the information deriving device may monitor the handle of the gaming device to determine for example, when the handle has been pulled;

(vi) the information deriving device may monitor a coin slot and/or a bill acceptor of the gaming device to determine, for example, when a player has inserted coins and/or bills into the gaming device;

(vii) the information deriving device may monitor cashless gaming receipt printers and acceptors of the gaming device;

(viii) the information deriving device may monitor the player tracking card reader to determine, for example, when a player has inserted a tracking card into the gaming device;

(ix) the information deriving device may monitor a coin tray of the gaming device to determine, for example, when coins have fallen into the tray and/or how many coins have fallen into the coin tray;

(x) the information deriving device may monitor any sound effects output by the gaming device (sound effects may include a real or simulated sound of coins dropping, celebratory sound effects associated with a payout, prerecorded or synthesized verbal announcements of a bonus round, etc.);

(xi) the information deriving device may monitor sounds from the player, such as sighs, exclamations, and conversation;

(xii) the information deriving device may monitor vibrations from the gaming device (vibrations may be associated, for example, with the motion of physical reels, or with the dropping of coins; additionally, some gaming devices may vibrate on purpose so as, for example, to herald the coming of a bonus round; vibrations may also be associated with a player hitting a button, or hitting the machine in frustration);

(xiii) the information deriving device may monitor exposed surfaces of the gaming device to determine, for example, whether a player has placed a drink, coin bucket, or other object on the gaming device or hit or kicked the gaming device; and (xiv) the information deriving device may monitor, either from inside or outside the housing of the gaming device, any electrical, electromagnetic, RF, and IR signals output by the gaming device (e.g., may monitor electrical signals output by the processor of the gaming device, signals from a video card of the gaming device, and/or the breaking of a light beam given off by a source within the gaming device).

It should be noted that monitoring the gaming device includes monitoring a component of the gaming device, a peripheral device of the gaming device, and/or monitoring a network connection to the gaming device for any signals being transmitted to and/or from the gaming device.

In one or more embodiments, the information deriving device is also operable to communicate with a player at the gaming device being monitored by the information deriving device. Just as a gaming device itself may not be designed to transmit certain types of information to another device (e.g., what symbols a player obtained as an outcome), a gaming device may also not be designed to transmit certain types of information to a player (e.g., offers of benefits in return for work performed) and/or to respond to commands to present particular messages to a player. Accordingly, in one or more embodiments an information deriving device may comprise one or more components for outputting information to a player. For example, an information deriving device may include one or more display screen for displaying text or graphical information to a player, one or more speakers for outputting audio messages to a player, and/or one or more lights capable of lighting, flashing, or blinking in order to attract a players attention or to direct the players attention to a certain location. For example, a flashing light might direct a player to point his PDA to a certain location corresponding to an infrared port of the information deriving device.

In some embodiments an information deriving device may be operable to output information to a player via a player device (e.g., a personal digital assistant or "PDA") associated with (e.g., carried on the person of) a player. A player device is described in more detail below with reference to FIG. 6. For example, an information deriving device may be operable to contact a player device and cause an graphical and/or audio message to be output to the player via the player device. The information deriving device may be operable to, for example, transmit messages to a players PDA, and the PDA might then display or broadcast the messages to the player.

As described briefly above, an information deriving device may comprise other input devices besides a touch screen. For example, the information deriving device may contain buttons with various markings, such as "yes", "no", "call attendant", "I accept", "1", "2", etc. The player may use the buttons to, for example, accept offers communicated by the information deriving device, or to key in a financial account identifier. In some embodiments, the information deriving device may include other types of input devices for use by a player to input information, such as a microphone for listening to the player, a tracking card reader, a credit card reader, a finger print reader, and/or a retinal scanner.

As briefly described above, an information deriving device 200 may comprise one or more sensors for receiving information from a gaming device. Such sensors may include, for example:

(i) cameras (for still photos and/or video), for capturing images;

(ii) microphones, for picking up sounds;

(iii) vibration detectors that may be operable to detect, for example, vibrations from the motor that spins the reels, vibrations from coins falling, vibrations from a player hitting a gaming device, or vibrations generated by a gaming device to indicate a period of heightened payouts;

(iv) touch sensors: in one embodiment, touch sensors may comprise thin, transparent films stretched over areas a player would normally touch (e.g., buttons), so as to detect a players touch; touch sensors may also detect contact from other objects, such as a players drink, coin bucket, or cigarettes);

(v) motion sensors, for detecting, e.g., the motion of a players hand, the motion of buttons, or the motion of reels;

(vi) beam sensors: beam sensors may detect, for example, the actuation of a button, as an electromagnetic beam may only travel unimpeded between two sensor points on opposite sides of the button when the button is depressed;

(vii) infrared detectors: infrared detectors may detect the proximity of a players hand as it presses a button, touches an area of the touch screen, inserts a bill, inserts a player tracking card, inserts a coin, or performs some other activity; the proximity of a hand may be detected via the body heat radiated from the hand; infrared detectors may also detect the proximity of a players face as he reads instructions off a display screen;

(viii) sonar transceivers: sonar transceivers may emit and receive sound waves so as to detect the presence of players hands, buckets of coins, or any other objects of interest;

(ix) radar transceiver: radar transceivers may emit and receive radio waves so as to detect the presence of any object of interest; and (x) electrical signal or electromagnetic signal sensors.

Note that the components of an information deriving device may or may not each be contained within a single housing. For example, in one or more embodiments, the components may be connected, e.g., with wires, but may be distributed over a relatively large area, such as the surface of a gaming device. In another alternative, the components of an information deriving device may be disembodied from one another. For example, sensors may not be in physical contact or wired communication with the processor of the information deriving device. Instead, sensors may communicate wirelessly with the processor via electromagnetic signals.

In one example, an information deriving device includes four distributed sensors and a display screen for communicating messages to a player. The first sensor comprises a camera that is situated at the lower left hand corner of the display screen and facing the display screen. The camera may thereby monitor any images that appear on the screen, and also any instances where the player touches the screen. A second sensor comprises a beam sensor that is positioned with a portion on either side of the player tracking card reader. When a player inserts or withdraws a card, the beam of light traveling from the source to the detector is temporarily broken, and the players action can thereby be detected. A third sensor comprises a transparent, flexible touch sensor that is stretched over the "bet 3" button (which is the maximum bet button in this example). When the player presses "bet 3", this sensor may detect the players touch. A fourth sensor comprises a microphone that is situated between two of the reel display windows. The microphone may detect, for example, the whirring of the reels as they spin, or the click of the reels as they come to a stop. The display screen of the information deriving device is situated below the display screen of the gaming device, and may be used for communicating messages to the player. The display screen may comprise a touch screen, and may therefore receive input from the player as well.

In one or more embodiments, a sensor that is a component of an information deriving device (such as a camera) may be mobile. For example the camera may be attached to a robotic arm capable of motion in one or more dimensions. The camera may additionally have the capability of pivoting or rotating along one or more axes. The camera may also have the capability of changing its focus from a proximate focal point to a distant focal point, and vice versa. Furthermore, the camera may be able to change the direction of its focus without motion of the entire camera. The ability of the camera to move or to be moved, as well as to change its focus, allows a single camera to alternately monitor different gaming devices, or to monitor multiple gaming devices at once. An information deriving device server may, for example, provide the information deriving device of the camera instructions to focus the camera on a gaming device that is currently generating outcomes (e.g., at which a player is currently actively playing).

The processor of the information deriving device may be situated in a location different from the locations of the various sensors or other components of the information deriving device, or it may be situated within the same housing as one of the sensors or other components. In one or more embodiments, the information deriving device has no processor. Rather the sensors of the information deriving device communicate directly with the information deriving device server 135 or gaming device server 120, and the processor of one of these servers may perform the functions of the processor of the information deriving device. Each of the sensors may be in wireless or wired communication with the processor of the information deriving device (or a processor of another device).

A power source for the information deriving device may also be located in a separate location, or may be situated at the same location and/or within the same housing as one of the sensors. The power source may be connected to one or more of the sensors or other components of the information deriving device, for example, via wires. In one or more embodiments, one or more of the sensors may include its own distinct power source.

A sensor 245 may be attached to or otherwise associated with a gaming device via a number of mechanisms. For example, a sensor 245 may be glued, taped, bolted, welded, clipped, tied, threaded, wedged, hung, or otherwise attached to a gaming device. It may be that a gaming device will not have been constructed so as to allow the easy attachment of an information deriving device. Accordingly, in one or more embodiments attaching an information deriving device with screws may first necessitate drilling holes through the housing of the gaming device so that the screws may enter the holes.

In one or more embodiments, a processor of an information deriving device attached to a first gaming device may communicate with sensors that are attached to or otherwise associated with multiple different gaming devices. In one embodiment, the multiple gaming devices may be in close proximity to one another. For example, the multiple gaming devices may be three adjacent gaming devices. In these and other embodiments, a single information deriving device may monitor multiple gaming devices.

In one or more embodiments, an information deriving device may not be attached to a gaming device but may be otherwise associated with or focused on a particular gaming device. For example, an information deriving device may be mounted on the ceiling of a casino, with a camera focused on the screens of one or more gaming devices. Additionally, devices not originally or not solely designed as information deriving devices may be used for any of the purposes for which an information deriving device is used in embodiments of the present invention. For example, security cameras may double as information deriving devices by allowing special software programs to analyze feeds from security cameras and interpret outcome information, payout information, or other information from gaming devices in view of the security cameras.

In one or more embodiments, an information deriving device may further include a benefit dispensing device (not shown), for outputting a benefit to a player. Benefits are described in more detail below. For example, an information deriving device may include a printer, and may therefore provide printed benefits to a player such as: (i) printed coupons, (ii) cashless gaming receipts, (iii) show tickets; (iv) meal vouchers; (v) gift certificates; (vi) lottery tickets; (vii) Keno tickets; (viii) amusement park tickets; and/or (ix) entries into a sweepstakes.

Figure 3A:
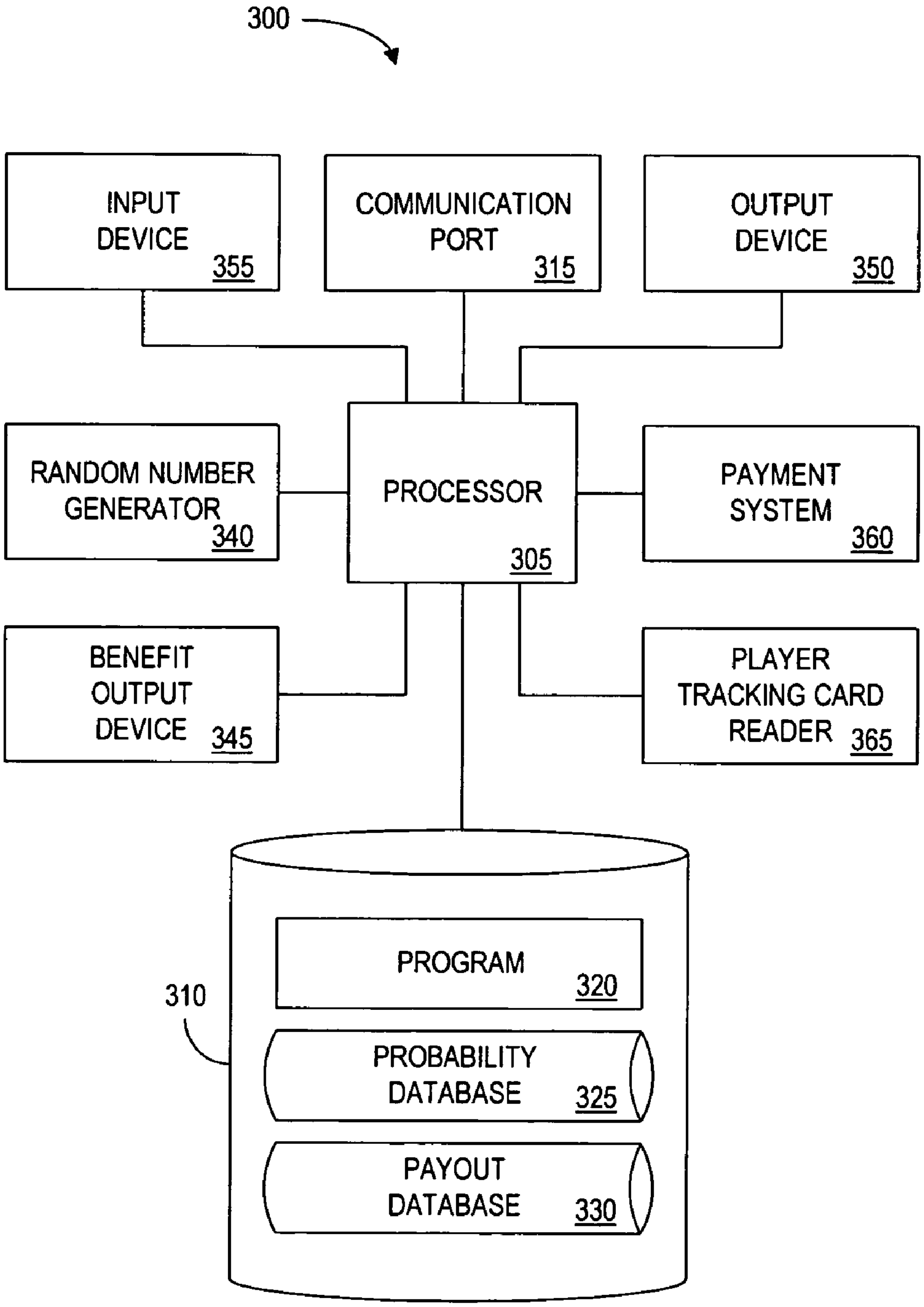
FIG. 3A is a block diagram of a gaming device that may be part of the system of FIG. 1, consistent with at least one embodiment of the present invention.

Referring now to FIG. 3A, illustrated therein is a block diagram of an embodiment 300 of a gaming device. The gaming device 300 may be implemented as a system controller, a dedicated hardware circuit, an appropriately programmed general-purpose computer, or any other equivalent electronic, mechanical or electro-mechanical device. The gaming device 300 may comprise, for example, a slot machine, a video poker terminal, a video blackjack terminal, a video keno terminal, a video lottery terminal, a pachinko machine, or a tabletop game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a personal digital assistant). The gaming device 300 may comprise the gaming device 110 of system 100 (FIG. 1). In some embodiments, a user device such as a PDA or cell phone may be used in place of, or in addition to, some or all of the gaming device 300 components depicted in FIG. 3A. Further, a gaming device may comprise a personal computer or other device operable to communicate with an online casino and facilitate game play at the online casino. In one or more embodiments, the gaming device 300 may comprise a computing device operable to execute software that simulates play of a reeled slot machine game, video poker game, video blackjack game, video keno game, video roulette game, or lottery game.

The gaming device 300 comprises a processor 305, such as one or more INTEL PENTIUM processors. The processor 305 is in communication with a memory 310 and a communications port 315 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc and/or a hard disk. The memory 310 may comprise or include any type of computer-readable medium. The processor 305 and the memory 310 may each be, for example: (i) located entirely within a single computer or other device; or (ii) connected to each other by a remote communication medium, such as a serial port cable, telephone line or radio frequency transceiver. In one embodiment, the gaming device 300 may comprise one or more devices that are connected to a remote server computer for maintaining databases.

The memory 310 stores a program 320 for controlling the processor 305. The processor 305 performs instructions of the program 320, and thereby operates in accordance with the present invention, and particularly in accordance with the methods described in detail herein. The program 320 may be stored in a compressed, uncompiled and/or encrypted format. The program 320 furthermore includes program elements that may be necessary, such as an operating system, a database management system and "device drivers" for allowing the processor 305 to interface with computer peripheral devices. Appropriate program elements are known to those skilled in the art, and need not be described in detail herein.

The term "computer-readable medium" as used herein refers to any medium that participates in providing instructions to processor 305 (or any other processor of a device described herein) for execution. Such a medium may take many forms, including but not limited to, non-volatile media, volatile media, and transmission media. Non-volatile media include, for example, optical or magnetic disks, such as memory 310. Volatile media include dynamic random access memory (DRAM), which typically constitutes the main memory. Transmission media include coaxial cables, copper wire and fiber optics, including the wires that comprise a system bus coupled to the processor 305. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 305 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 300 (or, e.g., a computer 210) can receive the data on the telephone line and use an infrared transmitter to convert the data to an infrared signal. An infrared detector can receive the data carried in the infrared signal and place the data on a system bus for processor 305. The system bus carries the data to main memory, from which processor 305 retrieves and executes the instructions. The instructions received by main memory may optionally be stored in memory 310 either before or after execution by processor 305. In addition, instructions may be received via communication port 315 as electrical, electromagnetic or optical signals, which are exemplary forms of carrier waves that carry data streams representing various types of information. Thus, the gaming device 300 may obtain instructions in the form of a carrier wave.

According to an embodiment of the present invention, the instructions of the program 320 may be read into a main memory from another computer-readable medium, such from a ROM to RAM. Execution of sequences of the instructions in program 320 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 310 also stores a plurality of databases, including a probability database 325 and a payout database 330. The probability database stores a list of outcomes that may be obtained on the gaming device. Each of the outcomes is associated with at least one random number. When the random number generator of the gaming device generates a number, the generated number is compared to the numbers stored in the probability database. The outcome corresponding to the generated random number is then displayed as the result of the game play for which the random number was generated. The payout database is described in detail below. In one or more embodiments, the payout database 330 may store the same data as the payout database 230 that is stored in an information deriving device 125 associated with the gaming device in which the payout database 330 is stored.

Note that, although these databases are described as being stored in a gaming device, in other embodiments of the present invention some or all of these databases may be partially or wholly stored in another device, such as the gaming device server 120. Further, some or all of the data described as being stored in the databases 325 and 330 may be partially or wholly stored (in addition to or in lieu of being stored in the memory 310 of the gaming device 300) in a memory of one or more other devices, such as gaming device server 120.

The databases 325 and 330 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though two separate databases are illustrated, the invention could be practiced effectively using one, two, three, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

The memory 310 may also store other information such as a credit meter balance and an amount of coins currently available in a hopper of the gaming device 300.

The processor 305 is also operable to communicate with a random number generator 340, which may be a component of gaming device 300. The random number generator 340, in accordance with at least one embodiment of the present invention, may generate data representing random or pseudo-random values (referred to as "random numbers" herein). The random number generator 340 may generate a random number, for example, every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A random number generator, as used herein, may be embodied as a processor separate from but working in cooperation with processor 305. Alternatively, random number generator may be embodied as an algorithm, program component, or software stored in the memory of gaming device 300 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HOTBITS, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 305 is also operable to communicate with a benefit output device 345, which may be a component of gaming device 300. The benefit output device 345 may comprise one or more devices for outputting a benefit to a player of the gaming device 300.

For example, in one embodiment the gaming device 300 may provide coins and/or tokens as a benefit. In such an embodiment the benefit output device 345 may comprise a hopper and hopper controller, for dispensing coins and/or tokens into a coin tray of the gaming device 300.

In another example, the gaming device 300 may provide a receipt or other document on which there is printed an indication of a benefit (e.g., a cashless gaming receipt that has printed thereon a monetary value, which is redeemable for cash in the amount of the monetary value). In such an embodiment the benefit output device 345 may comprise a printing and document dispensing mechanism.

In yet another example, the gaming device 300 may provide electronic credits as a benefit (which, e.g., may be subsequently converted to coins and/or tokens and dispensed from a hopper into a coin tray). In such an embodiment the benefit output device 345 may comprise a credit meter balance and/or a processor that manages the amount of electronic credits that is indicated on a display of a credit meter balance. The processor may be the processor 305 or another processor.

In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device 345 may comprise a device for communicating with a server on which the financial account is maintained.

Note that, in one or more embodiments, the gaming device 300 may include more than one benefit output device 345 even though only one benefit output device is illustrated in FIG. 3A. For example, the gaming device 300 may include both a hopper and hopper controller combination and a credit meter balance. Such a gaming device may be operable to provide more than one type of benefit to a player of the gaming device.

A single benefit output device 345 may be operable to output more than one type of benefit. For example, a benefit output device 345 may be operable to increase the balance of credits in a credit meter and communicate with a remote device in order to increase the balance of a financial account associated with a player.

The processor 305 is also operable to communicate with a display device 350, which may be a component of gaming device 300. The display device 350 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, a gaming device may comprise more than one display device. For example, a gaming device may comprise an LCD display for displaying electronic reels and a display area that displays rotating mechanical reels.

The processor 305 may also be in communication with one or more other devices besides the display device 350, for outputting information (e.g., to a player or another device). Such other one or more output devices may also be components of gaming device 300. Such other one or more output devices may comprise, for example, an audio speaker (e.g., for outputting an actual and/or apparent outcome or information related thereto, in addition to or in lieu of such information being output via a display device 350), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a players credit balance on a gaming device, an LCD display of a personal digital assistant (PDA) for displaying keno numbers.

The display device 350 may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). In yet another of the display areas, a credit meter balance of the player may be displayed. In yet another of the display areas, marketing messages may be displayed to the player (e.g., offers for benefits in exchange for activities or commitments to be performed by the player). In one or more embodiments, the gaming device 300 may include more than one display device, one or more other output devices, or a combination thereof (e.g., two display devices and two audio speakers).

The processor 305 is also in communication with an input device 355, which is a device that is capable of receiving an input (e.g., from a player or another device) and which may be a component of gaming device 300. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 305 may also be operable to communicate with a payment system 360, which may be a component of gaming device 300. The payment system 360 is a device capable of accepting payment from a player (e.g., a bet or initiation of a balance) and/or providing payment to a player (e.g., a payout). Payment is not limited to currency, but may also include other types of consideration, including products, services, and alternate currencies.

Exemplary methods of accepting payment by the payment system 360 include (i) receiving hard currency (i.e., coins or bills), and accordingly the payment system 360 may comprise a coin or bill acceptor; (ii) receiving an alternate currency (e.g., a paper cashless gaming voucher, a coupon, a non-negotiable token), and accordingly the payment system 360 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

The processor 305 is also operable to communicate with a player tracking card reader 365, which may be a component of gaming device 300. Player tracking card reader 365 may be a device that may be capable of identifying and/or storing information about a player of gaming device 300. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device.

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

Figure 3B:
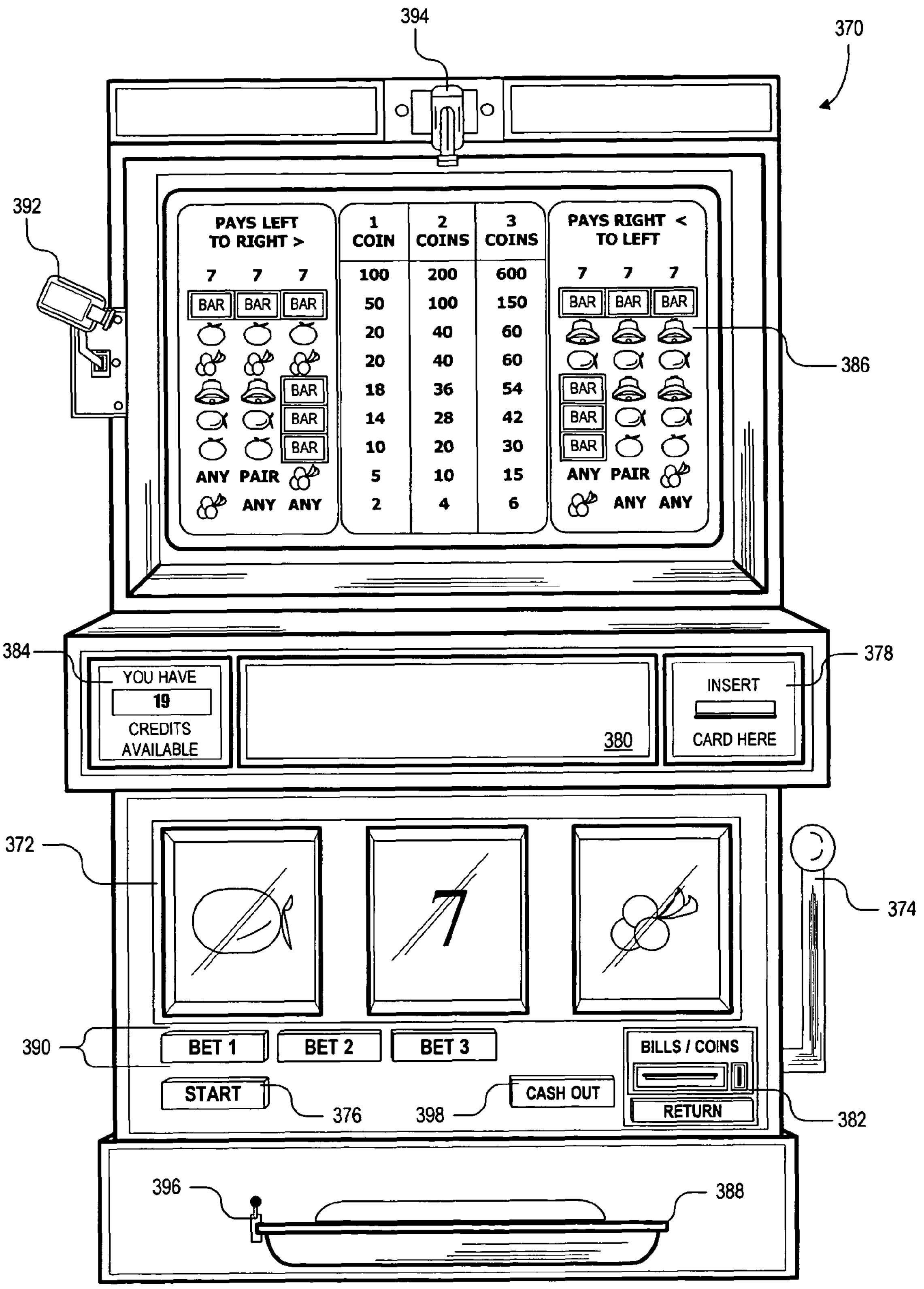
FIG. 3B is a plan view of a gaming device that has attached thereto information derivation devices and that may be a part of the system of FIG. 1, consistent with at least one embodiment of the present invention.

Referring now to FIG. 3B, an embodiment 370 of a plan view of an exemplary gaming device 110 with an exemplary associated information deriving device 125 is illustrated. In the embodiment 370, the gaming device 110 comprises a three reel slot machine. The slot machine comprises a display area 372 in which an outcome for a game of the slot machine is displayed to the player. The display area 372 may, for example, be a video display that displays simulations of reels. The display area 372 may, in another example, be glass behind which are located mechanical reels. Display area 372 is an exemplary embodiment of the display device 350, described with respect to FIG. 3A.

The slot machine of embodiment 600 further comprises a handle 374. A player may initiate the movement of the reels in display area 372 by pulling on the handle 374. Alternatively, a player may initiate the movement of the reels in display area 372 by actuating the start button 376. Either or both of handle 374 and start button 376 are exemplary embodiments of the input device 355, described with respect to FIG. 3A.

The slot machine of embodiment 600 also comprises a player tracking card reader 378, which is an example of the player tracking card reader 365 that was described with respect to FIG. 3A. The player tracking reader 378 may comprise a player tracking card reader and a display (e.g., an LED display) for outputting information related to the player identifier (e.g., players name and number of comp points associated with players account).

Also a component of the slot machine of embodiment 600 is another display area 380, for outputting information to a player. The display area 380 may be utilized, for example, to inform a player that he has qualified for a bonus.

The slot machine of embodiment 600 also comprises a payment system 382, an exemplary embodiment of payment system 360, described with respect to FIG. 3A. Payment system 382 comprises a coin acceptor. A player may utilize payment system 382 to provide a wager for playing a game.

The slot machine of embodiment 600 further comprises a credit meter balance 384, which is an exemplary embodiment of a benefit output device 345 that was described with respect to FIG. 3A. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player.

The slot machine of embodiment 600 includes yet another display area, display area 386, which displays a payout schedule of the slot machine. The payout schedule displays payouts that correspond to various outcomes obtainable on the slot machine. In one or more embodiments, if an outcome is displayed in display area 372 that, as indicated in display area 386, corresponds to a payout, the credit meter balance 384 may be increased by an amount of electronic credits corresponding to the payout.

The slot machine of embodiment 600 further comprises a coin tray 388. Payment to the player may be rendered by dispensing coins into the coin tray 388. Such coins may be dispensed based on, for example, a players indication that the player would like to cash out his credit meter balance and/or a payout obtained by a player as a result of playing a game on the slot machine of embodiment 600. The coin tray 388 is an exemplary embodiment of the benefit output device 345, described with respect to FIG. 3A.

The slot machine of embodiment 600 further comprises a plurality of "bet" buttons 390, each button being associated with a different wager amount. To input a particular wager amount for a game play, the player actuates one of the plurality of bet buttons 390. For example, to indicate a wager of three coins, a player actuates the "bet 3" button. In response to such an indication, the wager amount is deducted from the amount of electronic credits available to a player (e.g., if the player actuates the "bet 3" button, three electronic credits are deducted from the players credit meter balance). The plurality of bet buttons 390 may comprise an input device 355, as described with respect to FIG. 3A.

Attached to the slot machine of embodiment 600 are a plurality of information deriving devices 125. The information devices 125 are embodied as a first camera 392 that is focused on the display area 372 of the slot machine, a second camera 394 that is focused on the front view of the slot machine (e.g., viewing the actions of a player playing at the slot machine), and a microphone 396 that is directed at detecting sounds emanating from the coin tray 388 (e.g., to detect the sounds of coins falling into the coin tray 388 from an internal hopper of the slot machine).

Thus, for example, the information deriving devices 125 of embodiment 600 could be programmed to derive (i) the symbols depicted on the display area 372 (e.g., to determine whether the player has obtained an outcome that corresponds to a payout or an outcome that almost qualified for a payout); (ii) the actions and/or expressions of a player playing the slot machine (e.g., to determine which "bet" button the player is typically actuating, to determine whether the player is reaching for the "cash out" button of the slot machine, and/or to determine whether the players expression depicts a particularly frustrated or unhappy individual); and (iii) how many coins are being dropped into the coin tray 388 of the slot machine, thereby determining the amount of a payout that a player has won or a duration of time since the most recent payout obtained by the player. Such derived information may be useful, for example, in embodiments where a message is to be output to a player who (i) has obtained a payout that is one symbol off from being a payout that qualifies for a payout of at least twenty coins, and (ii) exhibits an expression of frustration or unhappiness when the outcome is displayed. For example, such a player may be particularly likely to agree to try a new service in exchange for a payment (e.g., a payment equivalent to the payout the player almost qualified for). For example, the following message may be output to the player "Ouch! That was a tough break. You almost won 20 coins! Since youve been such a long-term casino guest, heres an exciting offer for you: if you promise to try a beauty treatment at the casino spa during your visit here with us, well have a casino host provide you with the 20 coins you should have won, to use right now! Just say "yes" to accept this offer."

The slot machine of embodiment 600 further comprises a "cash out" button 398 that, when actuated by the player, causes the amount of electronic credits available to the player to be dispensed into the coin tray 388 in the form of coins. The cash out button 398 may comprise an input device 355, as described with respect to FIG. 3A.

Note that the slot machine of embodiment 600 may include different and/or additional components besides those illustrated in FIG. 3B and may not necessarily include each of the components illustrated in FIG. 3B.

Figure 4:
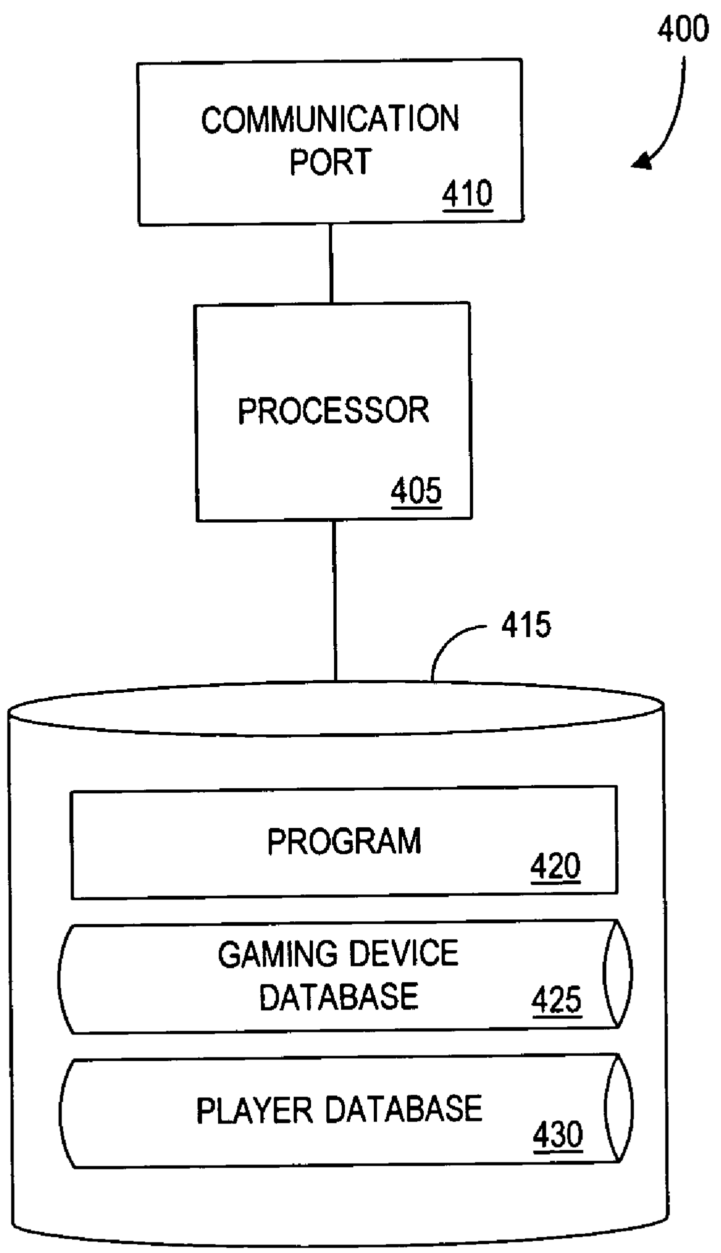
FIG. 4 is a block diagram of a gaming device server that may be part of the system of FIG. 1, consistent with at least one embodiment of the present invention.

Referring now to FIG. 4, illustrated therein is a block diagram of an embodiment 400 of gaming device server 120. The gaming device server 400 may be implemented as a system controller, a dedicated hardware circuit, an appropriately programmed general-purpose computer, or any other equivalent electronic, mechanical or electromechanical device. The gaming device server 400 may comprise, for example, a server computer operable to communicate with one or more client devices, such as a gaming device 110. The gaming device server 400 is operative to manage portions of the system 100 and, in some embodiments, to execute at least some methods of the present invention.

In operation, the gaming device server 400 may function under the control of a casino, a merchant, or other entity that may also control use of one or more gaming devices 110 and/or information deriving device server 135. For example, the gaming device server 400 may be a slot server in a casino or a server that manages a specified set of gaming devices. In some embodiments, the computer 400 and a slot server may be different devices. In some embodiments, the gaming device server 400 may comprise more than one computer operating together. In some embodiments, the gaming device server 400 and the information deriving device server 135 may be the same device.

The gaming device server 400 comprises a processor 405, such as one or more INTEL PENTIUM processors. The processor 405 is in communication with a communications port 410 (e.g., for communicating with one or more other devices) and a memory 415. The memory 415 may comprise an appropriate combination of magnetic, optical and/or semiconductor memory, and may include, for example, Random Access Memory (RAM), Read-Only Memory (ROM), a compact disc and/or a hard disk. The processor 405 and the memory 415 may each be, for example: (i) located entirely within a single computer or other device; or (ii) connected to each other by a remote communication medium, such as a serial port cable, telephone line or radio frequency transceiver. In one embodiment, the gaming device server 400 may comprise one or more devices that are connected to a remote server computer for maintaining databases.

The memory 415 stores a program 420 for controlling the processor 405. The processor 405 performs instructions of the program 420, and thereby operates in accordance with the present invention, and particularly in accordance with the methods described in detail herein. The program 420 may be stored in a compressed, uncompiled and/or encrypted format. The program 420 furthermore includes program elements that may be necessary, such as an operating system, a database management system and "device drivers" for allowing the processor 405 to interface with computer peripheral devices. Appropriate program elements are known to those skilled in the art, and need not be described in detail herein.

According to an embodiment of the present invention, the instructions of the program 420 may be read into a main memory from another computer-readable medium, such from a ROM to RAM. Execution of sequences of the instructions in program 420 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 415 also stores a plurality of databases, including a gaming device database 425 and a player database 430. Each of these databases is described in detail below. Note that, although these databases are described as being stored in a gaming device server 400, in other embodiments of the present invention some or all of these databases may be partially or wholly stored in another device, such as in one or more gaming devices 110, one or more information deriving devices 125, information deriving device server 135, another device, or a combination thereof. Further, some or all of the data described as being stored in the databases 425 and 430 may be partially or wholly stored (in addition to or in lieu of being stored in the memory 415 of the gaming device server 400) in a memory of one or more other devices, such as one or more gaming devices 110, one or more information deriving devices 125, the information deriving device server 135, another device and/or a combination thereof.

Figure 5:
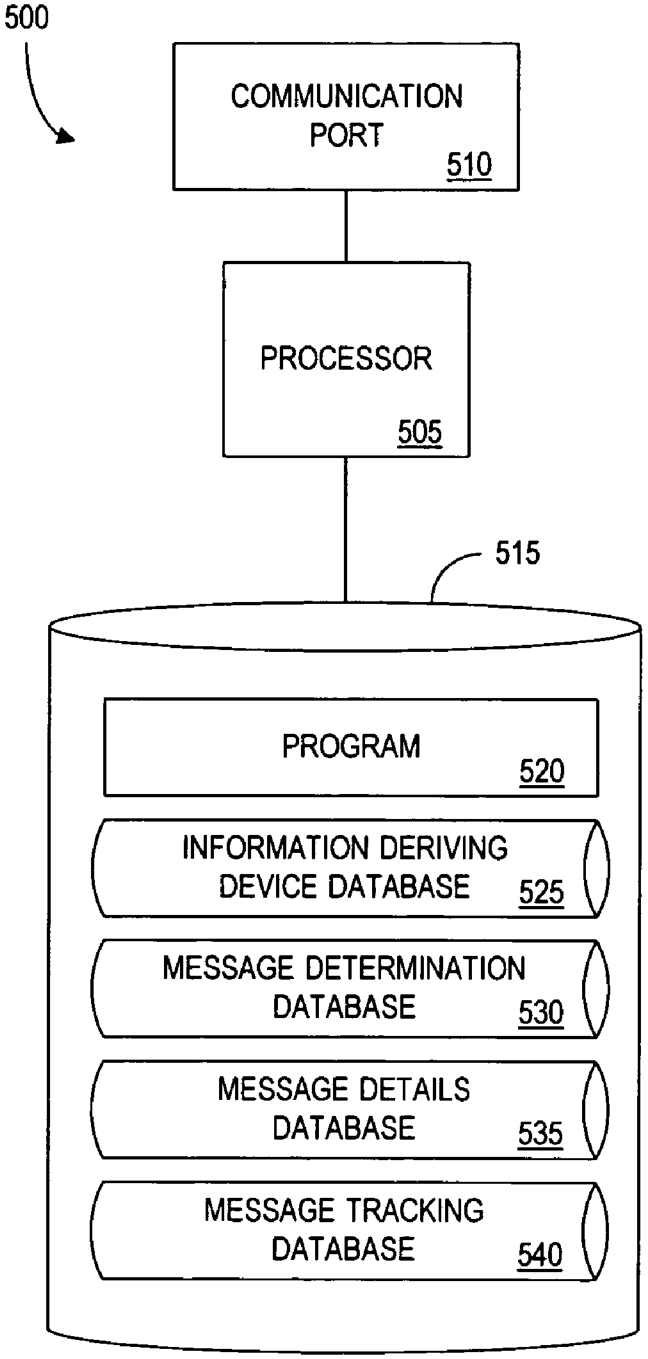
FIG. 5 is a block diagram of a derivation server that may be part of the system of FIG. 1, consistent with at least one embodiment of the present invention.

Referring now to FIG. 5, illustrated therein is a block diagram of an embodiment 500 of information deriving device server 135. The information deriving device server 500 may be implemented as a system controller, a dedicated hardware circuit, an appropriately programmed general-purpose computer, or any other equivalent electronic, mechanical or electromechanical device. The information deriving device server 500 may comprise, for example, a server computer operable to communicate with one or more client devices, such as an information deriving device 125. The information deriving device server 500 is operative to manage portions of the system 100 and, in some embodiments, to execute at least some methods of the present invention.

In operation, the information deriving device server 500 may function under the control of a casino, a merchant, marketer or other entity that may also control use of one or more information deriving devices 125 and/or gaming device server 120. In some embodiments, the information deriving device server 500 may comprise more than one computer operating together. In some embodiments, the information deriving device server 500 and the gaming device server 120 may be the same device.

The information deriving device server 500 comprises a processor 505, such as one or more INTEL PENTIUM processors. The processor 505 is in communication with a communications port 510 (e.g., for communicating with one or more other devices) and a memory 515. The memory 515 may comprise an appropriate combination of magnetic, optical and/or semiconductor memory, and may include, for example, Random Access Memory (RAM), Read-Only Memory (ROM), a compact disc and/or a hard disk. The processor 505 and the memory 515 may each be, for example: (i) located entirely within a single computer or other device; or (ii) connected to each other by a remote communication medium, such as a serial port cable, telephone line or radio frequency transceiver. In one embodiment, the information deriving device server 500 may comprise one or more devices that are connected to a remote server computer for maintaining databases.

The memory 515 stores a program 520 for controlling the processor 505. The processor 505 performs instructions of the program 520, and thereby operates in accordance with the present invention, and particularly in accordance with the methods described in detail herein. The program 520 may be stored in a compressed, uncompiled and/or encrypted format. The program 520 furthermore includes program elements that may be necessary, such as an operating system, a database management system and "device drivers" for allowing the processor 505 to interface with computer peripheral devices. Appropriate program elements are known to those skilled in the art, and need not be described in detail herein.

According to an embodiment of the present invention, the instructions of the program 520 may be read into a main memory from another computer-readable medium, such from a ROM to RAM. Execution of sequences of the instructions in program 520 causes processor 505 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 515 also stores a plurality of databases, including an information deriving device database 525, a message determination database 530, a message details database 535, and a message tracking database 540. Each of these databases is described in detail below. Note that, although these databases are described as being stored in the information deriving device server 500, in other embodiments of the present invention some or all of these databases may be partially or wholly stored in another device, such as in one or more information deriving devices 125, one or more gaming devices 110, gaming device server 120, another device, or a combination thereof. Further, some or all of the data described as being stored in the databases 525 through 540 may be partially or wholly stored (in addition to or in lieu of being stored in the memory 515 of the information deriving device server 500) in a memory of one or more other devices, such as one or more gaming devices 110, one or more information deriving devices 125, the gaming device server 120, another device and/or a combination thereof.

For example, in one or more embodiments, the information deriving device 125 that derives information from a gaming device 110 is programmed to (i) determine whether a message is to be output to a player of the gaming device, (ii) determine the details of the message to be output, and/or (ii) track the players response to the message or another status of the message. In such embodiments, the information deriving device 125 may store the message determination database 530, the message details database 535 and/or the message tracking database 540 (in lieu of or in addition to these databases being stored in information deriving device server 500).

Figure 6:
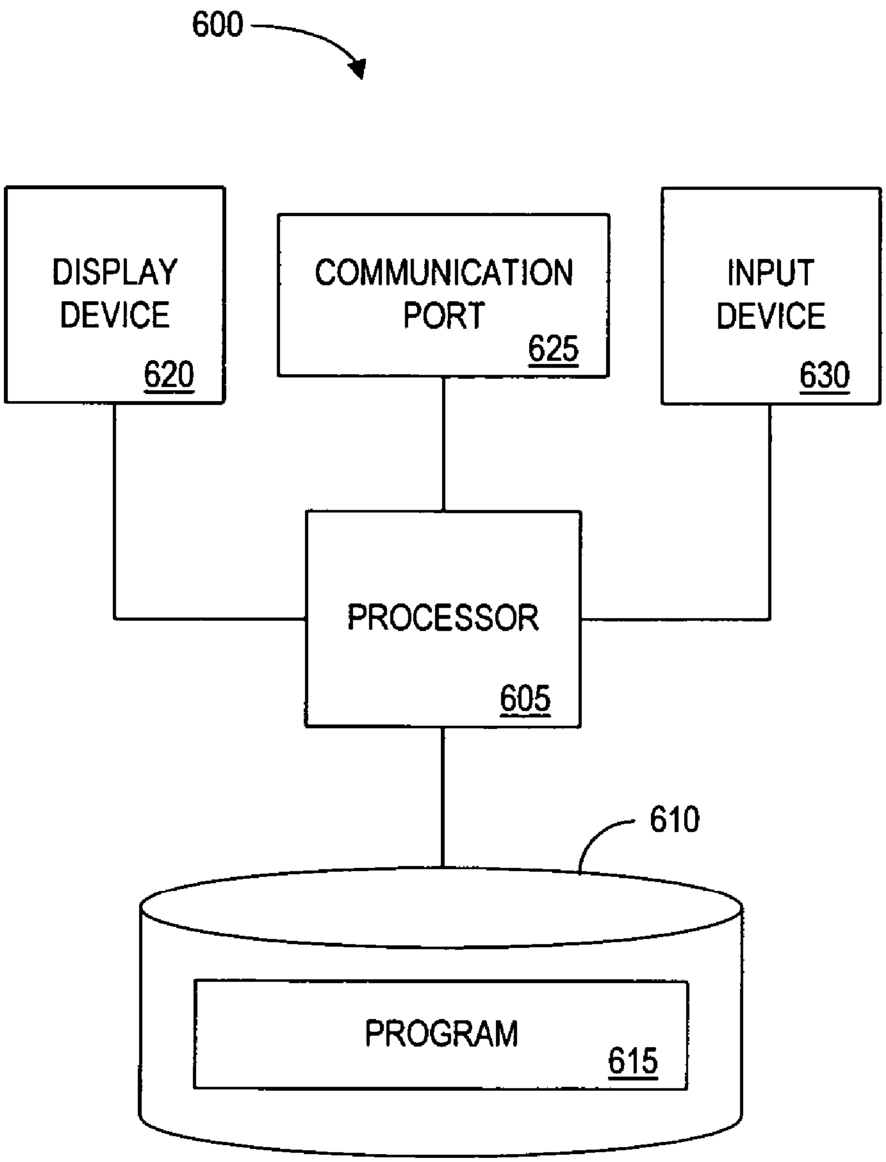
FIG. 6 is a block diagram of a player device that may be part of the system of FIG. 1, consistent with at least one embodiment of the present invention.

Referring now to FIG. 6, illustrated therein is an embodiment 600 illustrating an exemplary player device 150. The player device 600 may be implemented as a system controller, a dedicated hardware circuit, an appropriately programmed general-purpose computer, or any other equivalent electronic, mechanical or electromechanical device. The player device 600 may comprise, for example, a portable electronic device such as a personal digital assistant (PDA), operable to wirelessly communicate with one or more other devices, such as an information deriving device 125 or an information deriving device server 135. For example, the player device 600 may be operable to receive messages from an information deriving device 125 or an information deriving device server 135 and to output the messages to the player. In some embodiments, the player device 600 may further be operable to transmit signals to an information deriving device 125 or an information deriving device server 135 (e.g., a signal indicating an acceptance or rejection of an offer included in a message or answers to marketing questions posed in a message).

In operation, the player device 600 may function under the control of a casino, a merchant, marketer or other entity that may also control use of one or more information deriving devices 125 and/or information deriving device server 135. For example, a casino, merchant, marketer or other entity may provide the player device to the player when the player begins playing in a casino (e.g., for the duration of the players visit to the casino or another particular location), for purposes of outputting messages to the player. In another embodiment, a player may provide a contact address for a player device owned by the player (as well as permission to be contacted) to the casino, merchant, marketer, or other entity.

The player device 600 comprises a processor 605, such as one or more Intel® Pentium® processors. The processor 605 is in communication with a communications port 625 (e.g., for communicating with one or more other devices) and a memory 610. The memory 610 may comprise an appropriate combination of magnetic, optical and/or semiconductor memory, and may include, for example, Random Access Memory (RAM), Read-Only Memory (ROM), a compact disc and/or a hard disk. The processor 605 and the memory 610 may each be, for example: (i) located entirely within a single computer or other device; or (ii) connected to each other by a remote communication medium, such as a serial port cable, telephone line or radio frequency transceiver. In one embodiment, the player device 600 may comprise one or more devices that are connected to a remote server computer for maintaining databases.

The memory 610 stores a program 615 for controlling the processor 605. The processor 605 performs instructions of the program 615, and thereby operates in accordance with the present invention, and particularly in accordance with the methods described in detail herein. The program 615 may be stored in a compressed, uncompiled and/or encrypted format. The program 615 furthermore includes program elements that may be necessary, such as an operating system, a database management system and "device drivers" for allowing the processor 605 to interface with computer peripheral devices. Appropriate program elements are known to those skilled in the art, and need not be described in detail herein.

According to an embodiment of the present invention, the instructions of the program 615 may be read into a main memory from another computer-readable medium, such from a ROM to RAM. Execution of sequences of the instructions in program 615 causes processor 605 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The processor 605 is also in communication with a display device 620. The display device 620 may comprise, for example, a screen such as an liquid crystal display (LCD) screen. The screen may be operable to output graphical information to the player, such as messages output as a result of information derived from the gaming device being played by the player.

The processor 605 is also in communication with an input device 630. The input device 630 is operable to receive input from the player. The input device 630 may comprise, for example, a keyboard or touchscreen. A player may utilize the input device 630, for example, to respond to messages output via the display device 620. In some embodiments, the display device 620 is a touchscreen that also functions as an input device 630.

Referring now to FIG. 7, an exemplary tabular representation 700 illustrates an embodiment of an image file database 220, such as may be stored in the memory of an information deriving device 200. The tabular representation 700 of the image file database includes a number of example records or entries, each defining an image. Those skilled in the art will understand that the image file database may include any number of entries. The tabular representation 700 also defines fields for each of the entries or records. The fields specify: (i) an image identifier 710 that uniquely identifies an image; (ii) an image data file 720 that comprises data defining the image or a file path to a location of file of an image; and (iii) a description 730 that describes the image.

An information deriving device 200, or another device, may utilize the image file database 700, for example, to determine whether a predetermined event has occurred at a gaming device. For example, an image data file corresponding to one or more predetermined events may be stored in the database 700. For example, an image of an outcome that is a predetermined event (e.g., an outcome that does not qualify for a payout but that is one symbol away from qualifying for a payout) may be stored. As the information deriving device 200 derives image information from a gaming device (e.g., via a camera sensor of the information deriving device 200), the processor 205 may compare the derived image data to the image files stored in the database 700 to determine whether there is a match. If there is a match (e.g., a payout occurring at the gaming device matches a stored image of a payout), the processor 205 may determine that the predetermined event corresponding to the image file has occurred.

Referring now to FIG. 8, an exemplary tabular representation 800 illustrates an embodiment of an audio file database 225, such as may be stored in the memory of an information deriving device 200. The tabular representation 800 of the audio file database includes a number of example records or entries, each defining a set of audio data. Those skilled in the art will understand that the audio file database may include any number of entries. The tabular representation 800 also defines fields for each of the entries or records. The fields specify: (i) an audio data identifier 810 that uniquely identifies audio data; (ii) an audio data file 820 that comprises data defining the audio data or a file path to a location of file of an audio data; and (iii) a description 830 that describes the audio data.

An information deriving device 200, or another device, may utilize the audio file database 800, for example, to determine whether a predetermined event has occurred at the gaming device associated with the information deriving device 200. For example, an audio data file corresponding to one or more predetermined events may be stored in the database 800. For example, an audio data file corresponding to the dropping of twenty coins into a coin tray of the gaming device may be stored. As the information deriving device 200 derives audio information from a gaming device (e.g., via a microphone sensor of the information deriving device 200), the processor 205 may compare the derived audio data to the audio data files stored in the database 800 to determine whether there is a match. If there is a match (e.g., a payout occurring at the gaming device is a payout of twenty coins), the processor 205 may determine that the predetermined event corresponding to the audio data file has occurred.

Referring now to FIG. 9, an exemplary tabular representation 900 illustrates an embodiment of a prior art payout database 330 and/or a prior art payout database 230, such as may be stored in the memory of gaming device 300 and/or an information deriving device 200. Alternatively or additionally, the whole or portions of the data of payout database 330 or 230 may be stored in an information deriving device server 135.

The tabular representation 900 of the payout database includes a number of example records or entries, each defining a payout that may be obtained by a player as a result of a game play. Those skilled in the art will understand that the payout database may include any number of entries. The tabular representation 900 also defines fields for each of the entries or records. The fields specify: (i) an outcome 910 comprising a set of symbols that may be displayed as a result of a game play at the gaming device; and (ii) a number of coins awarded 915 that indicates a number of coins or electronic credits that are to be provided to a player if the corresponding outcome is obtained by the player.

Other arrangements of payout databases and probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

A gaming device 110, or another device (e.g., in one or more embodiments an information deriving database and/or information deriving device server may store a payout database for use in determining a payout that a player qualified for, almost qualified for, or failed to qualify for), may utilize the payout database 900, for example, to determine whether to a player has qualified for a payout as a result of an outcome obtained by the player. For example, the processor 105 may compare an outcome for a game play to the outcomes of the payout table 900 to determine whether the outcome corresponds to a payout. If the outcome does correspond to the payout, the processor 105 may cause the appropriate amount of coins or electronic credits to be provided to the player.

An information deriving device 125 and/or an information deriving device server 135 may utilize database 900, for example, to determine whether a predetermined event has occurred at a gaming device. For example, an information deriving device 125 may derive, via a camera sensor, that an outcome comprising the symbols "7-7-orange" has been displayed along a payline of the gaming device being monitored. The processor of the information deriving device may then determine whether the outcome corresponds to a payout by comparing the outcomes corresponding to payouts in table 900 to the outcome displayed on the gaming device 110. In some embodiments, if the outcome is determined not to correspond to a payout the processor may further determine whether the outcome displayed on the gaming device is close to an outcome that does correspond to a payout. In the present example, the outcome "7-7-7" does correspond to a payout but the outcome "7-7-orange" does not correspond to a payout. Further, the outcome "7-7-orange" is one symbol away from qualifying for a payout of one hundred coins. A predetermined event that causes a message to be output to a player may comprise, for example, the obtainment by a player of an outcome that is one symbol off from qualifying for a payout of at least fifty coins. The outcome "7-7-orange" qualifies as such an event. Accordingly, using the payout table 900, the information deriving device and/or another device performing the determination of whether a predetermined outcome has occurred (e.g., the information deriving device server 135) may conclude that a predetermined event has occurred and that a message is to be output to a player.

Referring now to FIG. 10, an exemplary tabular representation 1000 illustrates an embodiment of a player session database 235, such as may be stored in the memory of an information deriving database 200. The tabular representation 1000 of the player session database includes a number of example records or entries, each defining a session of a player. A session, as used herein, is plurality of game plays initiated by a particular player within a pre-defined period of time, within a predetermined period of time of one another, consecutively and on a particular gaming device, or otherwise associated with one another.

Those skilled in the art will understand that the player session database may include any number of entries. The tabular representation 1000 also defines fields for each of the entries or records. The fields specify: (i) a session identifier 1005 that uniquely identifies a session of a player, (ii) a time started 1010 that indicates the time at which the session was begun by the player, (iii) a consecutive number of a game play 1015 that indicates which game play (e.g., spin of a reel slot machine or hand of a video poker machine), as counted consecutively from the beginning of the session, a row of the record pertains to, (iv) a time of game play 1020 that indicates the time at which a particular game play was initiated, (v) an amount wagered 1025 that indicates the amount that the player wagered on the particular game play, (vi) an outcome 1030 of the game play (e.g., the symbols displayed along a payline of a reel slot machine at the conclusion of a game play), and (vii) a payout 1035 that indicates the payout, if any, provided to the player as a result of the corresponding outcome.

Note that the session identifier may include the identifier of the player associated with the session or a portion thereof. Further note that, although a session is depicted as occurring at a single gaming device in database 1000, in one or more embodiments a session may include play on more than one gaming device.

The player session database 1000 may be utilized by an information deriving device 125 and/or an information deriving device server 135, for example, to track the outcomes of a player during a particular session. Such tracking may be utilized, for example, to determine whether a predetermined event has occurred at a gaming device and thus whether a message is to be output to the player of the gaming device. For example, a predetermined event that causes a message to be output to a player may comprise the obtainment by the player of ten outcomes in a row that do not qualify for any payout. By tracking, in the player session database 1000, the consecutive outcomes obtained by a player, the information deriving device 125 and/or an information deriving device server 135 may determine whether the predetermined event has occurred.

Referring now to FIG. 11, an exemplary tabular representation 1100 illustrates an embodiment of a gaming device database 425, such as may be stored in the memory of a gaming device server. The tabular representation 1100 of the gaming device database includes a number of example records or entries, each defining a gaming device in communication with the gaming device server 135. Those skilled in the art will understand that the gaming device database may include any number of entries.

The tabular representation 1100 also defines fields for each of the entries or records. The fields specify: (i) a gaming device identifier 1105 that uniquely identifies a gaming device, (ii) a game 1110 that indicates the commonly known name or general description of the game available on the gaming device (note that some gaming devices may have more than one game available thereon, in which embodiments each of the game names or descriptions would be included in field 1110), (iii) a denomination 1115 that indicates the currency denomination accepted by the gaming device, and (iv) a location 1120 that indicates the geographical location of the gaming device (e.g., within a particular casino, building, or complex of buildings). Note that the location 1120 field may store an electronic address at which the gaming device may be contacted (e.g., a network address or an IP address).

The gaming device database 1100 may be utilized by a gaming device server 120, for example, to contact a gaming device. For example, the gaming device database 1100 may be accessed to determine the location of a gaming device that a casino employee is to be deployed to. In another example, the gaming device database 1100 may be accessed to determine the address via which a particular gaming device may be contacted (e.g., in order to direct the gaming device to perform a function).

Referring now to FIG. 12, an exemplary tabular representation 1200 illustrates an embodiment of a player database 430, such as may be stored in the memory of a gaming device server 120. The tabular representation 1200 of the player database includes a number of example records or entries, each defining a player registered with the entity practicing the present invention. Those skilled in the art will understand that the player database 1200 may include any number of entries.

The tabular representation 1200 also defines fields for each of the entries or records. The fields specify: (i) a player identifier 1205 that uniquely identifies a player, (ii) a name 1210 of a player, (iii) a financial account identifier 1215 associated with a player, (iv) a home mailing address 1220 associated with the player, (v) an electronic mail (e-mail) address 1225 associated with the player, (v) a theoretical win/[loss] 1230 associated with the player, and (vi) a player device address 1235 that indicates the address or other contact information via which a message may be output to a player device, if any, associated with the player.

The information in the player database 1200 may be created and updated, for example, based on information received from a player, a casino employee, a gaming device 110, an information deriving device 125, a gaming device server 120, an information deriving device server 135, and/or another device. For example, the information may be created when a player registers with a casino and receives a player tracking card encoded with the player identifier. The information may be subsequently updated when a player requests to update the information (e.g., when a player indicates a desire to change a preferred character or preferred method of outputting an outcome) or when additional information is obtained about the player via the casinos interactions with the player (e.g., the lifetime theoretical win may be updated on an ongoing basis as the player plays games at a casino).

The player identifier 1205 may be, for example, an alphanumeric code associated with a player who may operate a gaming device or play a table game at a casino. The player identifier 1205 may be generated or selected, for example, by the gaming device server 400 or by the player (e.g., when a player first registers with a casino). In some embodiments, a player tracking card number of a player tracking card provided to a player may be distinct from a player identifier. In such embodiments, an additional field for the player tracking card number may be included in player database 1200. For each player, the player database 430 may also store the players name 1210 (e.g., for use in outputting messages to the player). In one or more embodiments the players name may comprise a nickname or other designation for the player that is selected by the player or the casino. In one or more embodiments, the nickname may comprise a designation that reflects the players status (e.g., “premium player”). Such a status may indicate, for example, the typical spending range of the player or other indication of how valuable the player is considered to be by the casino. Such a designation may or may not be known to the player.

The financial account identifier 1215 (e.g., a credit card account number, a debit card account number, a checking account number, a casino financial account number, or digital payment protocol information) identifies a financial account associated with the player. The financial account identifier 1215 may be used, for example, to credit a payment to the player (e.g., wherein a benefit obtained by the player comprises a monetary amount) and/or to debit a wager amount. For example, if, in response to a message output to a player, the player agrees to perform an activity in exchange for a payment, the payment may be credited to the financial account by use of the financial account identifier associated with the player.

The theoretical win/[loss] 1230 stores an indication of the theoretical win of the player based on the playing activity of the player since the playing activity of the player has been tracked. In other words, the theoretical win/[loss] 1230 may be a “lifetime” theoretical win. In other embodiments a theoretical win/[loss] based on other periods of time may be stored in addition to or instead of the lifetime historical theoretical win/[loss]. For example, an annual or session theoretical win/[loss] may be stored.

The player device address 1235 stores an address usable to contact a player device associated with (e.g., carried by) a player. For example, assuming the players device is a BLUETOOTH enabled device, the BLUETOOTH address (often referred to as the BD_ADDR) of that device may be stored in player device address field 1235. The BLUETOOTH address of a BLUETOOTH enabled device is a twelve character code that can usually be found on the device such as near the devices serial number. In another example, the player device address field may be an IP address of the device.

It should be understood that although a player identifier and information related to each registered player is described in detail, a player need not be registered in order to obtain benefits of the present invention (e.g., receive messages offering benefits based on information derived from the gaming device being played by the player). Accordingly, registration of a player and storing of information related to a player is not necessary for practice of the present invention.

The player database 1200 may be utilized by a gaming device server 400, for example, to retrieve information about players in order to facilitate the output of messages and/or the provision of a benefit to a player. For example, the players name may be retrieved from the player database for incorporation into the message to be output to the player. In another example, the address of the player device associated with the player may be retrieved for use in outputting the message to the player. In yet another example, the financial account identifier associated with the player may be retrieved for use in crediting a benefit (e.g., a benefit to be provided to the player in exchange for the players acceptance of an offer included in a message that had been output to the player).

In one or more embodiments, the player database 1200, or some or all of the data described as being stored therein, may be stored in a device other than the gaming device server 400. For example, the player database 1200 may be stored in a gaming device 110, an information deriving device 125, an information deriving device server 135, and/or another device.

Referring now to FIG. 13, an exemplary tabular representation 1300 illustrates an embodiment of an information deriving device database 525, such as may be stored in the memory of an information deriving device server 500. The tabular representation 1300 of the information deriving device database includes a number of example records or entries, each defining an information deriving device that may be in communication with an information deriving device server 500. Those skilled in the art will understand that the information deriving device database 1300 may include any number of entries.

The tabular representation 1300 also defines fields for each of the entries or records. The fields specify: (i) an information deriving device identifier 1305 which uniquely identifies an information deriving device (and which may comprise or include an address via which the information deriving device may be contacted, such as a network address), (ii) an associated gaming device identifier 1310 that uniquely identifies the one or more gaming devices with which the information deriving device is associated (e.g., the gaming device at which the information deriving device is focused on or attached to), (iii) a camera focused on display screen? field 1315 that stores an indication of whether a sensor that comprises a camera and that is a component of the information deriving device is focused on the display screen of the associated gaming device, (iv) a camera focused on credit meter? field 1320 that stores an indication of whether a sensor that comprises a camera and that is a component of the information deriving device is focused on a credit meter of the associated gaming device, (v) a microphone in coin tray? field 1325 that stores an indication of whether a sensor that comprises a microphone and that may be a component of the information deriving device is located in or near the coin tray of the associated gaming device, (vi) a touch sensors on physical buttons? field 1330 that stores an indication of whether one or more sensors comprising touch sensors and that may be components of the information deriving device are located on the physical buttons of the associated gaming device, and (vii) a touch sensors on display screen? field 1335 that stores an indication of whether one or more sensors comprising touch sensors and that may be components of the information deriving device are located on a display screen (e.g., that comprises a touch screen for use by the player in inputting information) of the associated gaming device. Note that the fields 1315 through 1335 may store an indication of whether each of the respective sensors is currently activated and receiving information, or another status of the sensors. In one or more embodiments, the information deriving device database 1300 may store additional information regarding, for example, the one or more sensors. For example, for a sensor comprising a camera for capturing an image, the database 1300 can store an indication of the exact location within the image that a particular piece of information may be found (e.g., that the credit meter balance may be found by evaluating particular pixels or a particular quadrant of the image).

The information deriving device database 1300 may be utilized by an information deriving device server 500, for example, to determine which gaming device is associated with an information deriving device and/or to update or change which gaming device is associated with an information deriving device. In another example, the database 1300 may be accessed to update the status of a sensor that is a component of an information deriving device.

Referring now to FIG. 14, an exemplary tabular representation 1400 illustrates an embodiment of a message determination database 530, such as may be stored in the memory of an information deriving device server 500. The tabular representation 1400 of the message determination database includes a number of example records or entries, each defining a condition that, if satisfied, causes a message to be determined for output to a player. Those skilled in the art will understand that the message determination database 1400 may include any number of entries.

The tabular representation 1400 also defines fields for each of the entries or records. The fields specify: (i) a message condition 1405 that indicates the condition which, if satisfied, will cause a message to be determined for output to a player, and (ii) a message identifier 1410 that identifies the message to be output to the player when the corresponding condition is satisfied.

The message determination database 1400 may be utilized by the information deriving device server 500 and/or an information deriving device 200, for example, to determine whether a message is to be output to a player. For example, it may be determined whether one of the conditions stored in the database 500 has been satisfied. If it is determined that a condition has been satisfied, the identifier of the message corresponding to the condition may be determined.

As described herein, in one or more embodiments an information deriving device 125 may be operable to determine whether a condition for outputting a message to a player has been met. In such embodiments, the message determination database 1400, a version thereof, or at least a portion of the data described as being stored therein, may be stored in the memory of one or more information deriving devices in addition to or in lieu of being stored in the memory of the information deriving device server 135 (e.g., the information deriving device server may not exist in some embodiments).

It should be noted that although the embodiment 1400 illustrates a one-to-one correspondence between a condition and a message identifier, in other embodiments more than one condition may correspond to a single message identifier and/or more than one message identifier may correspond to a single condition. If more than one message identifier corresponds to a particular condition, the information deriving device 200 and/or the information deriving device server 500 may store in memory a program or set of rules for determining which of the plurality of messages is to be output to a player. In some embodiments, more than one message may be output to the player (e.g., each of the corresponding messages may be output). In another embodiment, a message may be selected randomly or based on one of the stored rules. For example, one or more of the messages may be selected based on other information associated with the player such as player preferences or previous messages that have been output and/or responded to favorably by the player.

Referring now to FIG. 15, an exemplary tabular representation 1500 illustrates an embodiment of a message details database 535, such as may be stored in the memory of an information deriving device server 500. The tabular representation 1500 of the message details database includes a number of example records or entries, each defining a message that may be output to a player. Those skilled in the art will understand that the message details database 1500 may include any number of entries.

The tabular representation 1500 also defines fields for each of the entries or records. The fields specify: (i) a message identifier 1505 uniquely identifies a message, (ii) a message type 1510 that indicates the nature of the message (e.g., whether it is an offer, an advertisement, or a survey), (iii) a message 1515 that indicates the text of the message to be output to the player, and (iv) a response 1520 that indicates whether a tracked response from the player to the message is expected or possible (e.g., if the message is simply an advertisement, no tracked response is expected or possible).

The message details database 1500 may be utilized by the information deriving device server 500, for example, to determine the text of the message to be output to the player. As described above, database 1400 may be used to determine the message identifier of a message to be output to the player. Once the message identifier is determined, database 1500 may be accessed to determine the text of the message to be output to the player. In one or more embodiments, the manner in which a message is presented to a player may be affected by the type of message (e.g., whether it is an advertisement or an offer). In such embodiments, the database 1500 may be used to determine the type of message to be output, thereby determining the manner in which the message is to be output. In one or more embodiments, a response from a player is expected to some messages but not to others. Accordingly, further action such as tracking the status of a players response to a message may be required on the part of a device for the messages to which a response is expected. In such embodiments, the database 1500 may be accessed to determine whether a response is expected to the particular message being output, thereby determining whether a subroutine for tracking the status of the response is to be initiated.

As described herein, in one or more embodiments an information deriving device 125 may be operable to determine the message to be output to a player. In such embodiments, the message details database 1500, a version thereof, or at least a portion of the data described as being stored therein, may be stored in the memory of one or more information deriving devices in addition to or in lieu of being stored in the memory of the information deriving device server 135 (e.g., the information deriving device server may not exist in some embodiments).

As illustrated in the message identified as message "M5555", a message may comprise an offer. An offer, as the term is used herein, defines an activity to be performed or obligation to be committed to and a benefit to be provided in exchange for the performance, or agreement to perform, the activity or the commitment to the obligation. In the message "M5555", for example, the offer defines an activity of switching long distance phone companies and a benefit of "$30" to be provided to the player.

Examples of activities that may be included in an offer include (i) signing up for a new credit card, (ii) answering survey questions about a product or service, and (iii) committing to a gambling activity (e.g., playing at a gaming device for a predetermined amount of time and at a predetermined rate of play).

In one or more embodiments, an activity may be specified and/or have value to a third-party merchant. For example, a credit card issuer may be willing to pay up to $50 to get a customer to sign up for a new credit card, since acquiring this customer will likely result in more than $50 of profits for the credit card issuer.

Basic types of activities that may be included in an offer include:

(i) purchasing a product or service;
(ii) using a product or service;
(iii) testing a product (e.g., a casino representative may bring a product to the players gaming device and have the player try, sample, or preview it; the player might be required to try a cup of coffee, take a sample issue of a magazine, or wear a new watch for an hour);
(iv) selling a product or service;
(v) providing a product or service;
(vi) providing information;
(vii) viewing information;
(viii) performing an action; and
(ix) telling a friend or relative about a product or service.

Note that there are many other types of activities and that some activities do not fit clearly into any one category. The discussion below provides examples of each of these basic types of activities.

Examples of purchasing a product or service include:

(i) signing up for a magazine subscription;
(ii) buying $20 worth of books from an online Internet store; and
(iii) signing up for a warranty.

Examples of using a product or service include:

(i) receiving a new credit card;
(ii) using a new long distance telephone provider;
(iii) printing a predetermined minimum number of pages per week from a laser printer; and
(iv) receiving 3 free issues of a magazine.

Examples of providing a product or service include:

(i) providing legal or medical advice;
(ii) donating an old television set; and
(iii) providing help to novice players.

Examples of selling a product or service include:

(i) selling a used product on an auction Website; and
(ii) providing tax advice at a rate of $10 per hour.

Examples of providing information include:

(i) answering survey questions;
(ii) providing product ratings and reviews; and
(iii) indicating demographic and/or purchasing information or providing access or permission to access such information.

Examples of viewing information include:

(i) watching or listening to a commercial or other advertisement;
(ii) listening to an audio tape of a public health message (e.g., about the health dangers of smoking cigarettes); and
(iii) reading a pamphlet that explains how to use a product.

Examples of performing an action include:

(i) playing a game of chance or a game of skill;
(ii) applying for a credit card
(iii) performing a repeated action (e.g. purchasing a product from a retailer at least once a month for the duration of an insurance policy, maintaining a balance on a credit card);
(iv) performing a customer-segmenting activity (i.e., an activity that allows a seller to segment its customer base; for example, a casino may segment its player base by asking a player to perform an activity over an extended period of time, since some players will not have the time to perform such activities); and (v) convincing another party (e.g., another player) to perform one or more activities (e.g., a first player may perform an activity of convincing three of his friends to sign up for magazine subscriptions).

Examples of gambling-related activities include:

(i) playing a game for a predetermined period of time (perhaps at a predetermined minimum rate of play);
(ii) playing a predetermined number of game plays (perhaps within a predetermined period of time and/or at a predetermined gaming device or type of gaming device);
(iii) placing a predetermined number (or dollar value) of wagers;
(iv) winning a predetermined number of game plays (perhaps within a predetermined period of time);
(v) winning a predetermined payout or minimum payout (perhaps within a predetermined period of time or within a predetermined number of game plays);
(vi) winning a predetermined amount of money (perhaps within a predetermined period of time);
(vii) playing a designated game and/or gaming device (perhaps for a predetermined duration or within a predetermined period of time);
(viii) playing a game in a predetermined fashion (e.g., always make the maximum bet, always hit with 16 in blackjack);
(ix) signing up for a player tracking card; and
(x) providing gambling-related information (e.g., inserting a player tracking card, answering survey questions).

In one or more embodiments, an offer may specify an expiration condition (e.g., a time or condition that, if it occurs, causes the offer to no longer be available for acceptance or by which time an activity specified in the offer must be completed). Examples include:

(i) an activity must be finished by a predetermined time or event (e.g., before 6:00 PM tonight);
(ii) an activity must be started before a predetermined time or event (e.g., before the end of a baseball game);
(iii) an activity must be performed before a predetermined condition is true (e.g., while there are at least 4 players at a particular bank of slot machines); and
(iv) an offer must be accepted before a predetermined time occurs, a predetermined event occurs, and/or a predetermined condition is true.

In one or more embodiments, there may be additional restrictions as to how and where an activity is performed. For example, a player may be required to perform an activity while the player is at the casino or at a particular gaming device.

In one or more embodiments, an offer may define more than one activity or more than one performance of a single activity. In such embodiments, the player may be required to perform each activity or each performance of the activity in order to qualify for the benefit defined in the offer. In other embodiments, the player may be able to choose which one or more of the defined activities to perform. In other embodiments, the player may perform as many activities or performances of activities as desired and the benefit may be prorated therefore. In some embodiments, each activity or performance of an activity defined in the offer may correspond to a distinct benefit or provision of a benefit. For example, an offer may define a performance of an activity of playing five minutes at the gaming device and a provision of a benefit of one hundred comp points. Thus, for every five minutes that the player plays at the gaming device, the player will be provided with one hundred additional comp points. Other examples of multiple activities or multiple performances of an activity that may be defined in an offer include:

(i) a requirement that a player play one hundred hands of video blackjack today and eat lunch at the casino buffet tomorrow; and
(ii) a requirement that a player perform a repeated activity (e.g., purchasing a product from a retailer at least once a month for the duration of an insurance policy, maintaining a balance on a credit card).

In accordance with one or more embodiments, a players completion of an activity may be based on activities of other persons. For example:

(i) a player may be required to perform a competitive activity the success of which is determined relative to at least one other person (e.g., a player may be required to win a hand of poker or win a slot machine tournament); and/or
(ii) a player may be required to perform a team activity (i.e., an activity where players work together to accomplish a common goal; for example, all the players at a bank of slot machines may have to work together to increase a progressive jackpot to be greater than $10,000).

In accordance with one or more embodiments, a player may receive help in performing an activity. In such embodiments, one or more other parties may perform an activity in the place of the player or in addition to the player. For example, a player may be required to perform an activity of playing a slot machine continuously for four hours. The player may enlist three friends to help him perform this activity. For instance, each person including the player may play the slot machine for one hour, and then give up his seat to the next person. In another example, a player may be required to perform an activity of signing up for three magazine subscriptions. However, the player is only interested in receiving two magazine subscriptions. In such a scenario, the player may be allowed to have a friend sign up for the third subscription in order for the player to qualify for the benefit. In yet another example, a player may be required to perform an activity of completing an exercise workout video. However, if the player does not enjoy exercise video workouts, but his wife does, the player may be allowed to have his wife perform the activity of completing the workout. In other embodiments, it may not be permissible for a player to receive help in performing an activity.

In accordance with one or more embodiments, it may be permissible for an activity to have been performed in the past. For example, a player may be asked to perform an activity of placing at least $100 worth of wagers at video poker. If the player has already placed $150 worth of wagers at video poker, then this may constitute performance of the activity. In one or more embodiments, the player may be asked to provide evidence that he performed an activity in the past (e.g., by inserting his player tracking card or providing a receipt). In yet other embodiments, in order for an activity performed in the past to qualify the player for a benefit of a current offer, the activity may be required to have taken place within a predetermined time of the current time (e.g., within the last hour or the current day).

In accordance with one or more embodiments, it may be permissible for a player to make a forward commitment to perform an activity and still obtain the benefit of the offer immediately (i.e., before the activity is performed). According to one embodiment, a forward commitment is an agreement to perform an activity at some point in the future. For example, a player may be required to perform an activity of test driving a car within the next month. The player may agree to perform this activity later (e.g., once he returns home from visiting the casino), thereby completing the activity. Note that forward commitments may include time-based requirements and expiration conditions.

In accordance with one or more embodiments, a forward commitment may be penalty-secured. This means that a player may be penalized for not completing the activity specified in the forward commitment. For example, a players credit card may be charged a predetermined monetary amount if the player does not complete an activity by a specified date. Examples of penalties include:

(i) monetary penalties that may be charged to a players credit card, debit card, player account or other financial account (according to one embodiment, a player may be required to provide a payment identifier (e.g., a credit card number) when accepting a penalty-secured forward commitment);

(ii) denial of products and/or services (e.g., the player may not be permitted to gamble at the casino any more)—note that penalties that involve denial of products or services may be temporary;

(iii) a requirement that the player perform one or more additional (e.g., different) activities or instances of activities (e.g., the player may be required to test-drive at least two cars rather than one); and (iv) other forms of consideration.

Note that penalty-securing a forward commitment may be necessary to avoid a number of different methods of cheating the system. For example, if a forward commitment was not penalty secured, then a player may promise to perform an activity, receive a benefit, and then never perform the activity as promised.

As described above, an offer may define a benefit to be provided to a player in exchange for the players performance of an activity, agreement to perform an activity, or commitment to an obligation. Examples of benefits that may be provided to a player include:

(i) money (e.g., currency or electronic credits);

(ii) products (e.g., a souvenir watch, a sweatshirt, a magazine subscription);

(iii) services (e.g., a free meal, a haircut);

(iv) discounts on products or services (e.g., 50% off the list price of a hotel room);

(v) alternate currencies (e.g., comp points)

(vi) an entry into a game of chance (e.g., a lottery ticket, an entry into a sweepstakes, a free spin on a slot machine); and (vii) other consideration.

It should be noted that a benefit may be provided to a player in one event. For example, a benefit may be provided to the player via a check, by being handed to the player by a casino representative or by crediting a financial account associated with a player. In another example, a benefit may be provided to a player over the course of a plurality of events. For example, a free cocktail may be provided to the player every fifteen minutes for the next two hours.

In accordance with one or more embodiments, a benefit or part of a benefit may be provided to a party associated with the player (e.g., a friend of the player, a family member, a charity). For example, while providing a benefit to a players favorite charity may not provide a tangible benefit to the player, the player does receive an intangible benefit (e.g., he may feel altruistic and good-hearted). For this reason, benefits to friends of players may be particularly motivational for a player. According to one embodiment, a benefit provided to a friend of a player may be contingent on the friend performing one or more activities. For example, a players friend may be asked to perform an activity in order to receive a benefit.

In accordance with one or more embodiments, a third-party merchant may provide a benefit related to a players performance of an activity. Such a benefit may be provided because an activity has value to the third-party merchant. Examples of activities that have value to third-party merchants include:

(i) a player signing up for a new credit card (the third-party merchant may be the issuing bank of the credit card);

(ii) a customer views an advertisement (the manufacturer of the product being advertised may be the third-party merchant); and (iii) a player convincing three friends to register with a website (the website may be a third-party merchant).

According to one embodiment, a third-party merchant provides consideration to the casino in exchange for the casinos aid or permission in outputting a message to a player. Examples of consideration that may be provided to the casino include payments (e.g., in money or an alternate currency like frequent flyer miles), products, and services. Examples of how a third-party merchant may provide consideration to a casino include:

(i) providing the consideration at various different times, such as before, after or substantially simultaneously with an activity performed by a player, a message being output to a player, or an offer being accepted to a player;

(ii) providing consideration contingent upon the output of a message, the output of a minimum number of messages, the acceptance of an offer by a player, a minimum number of acceptances by players, an activity being performed satisfactorily, an activity being performed satisfactorily by a minimum number of players; and (iii) providing consideration upfront in one lump sum in exchange for the casinos commitment to output a message in a satisfactory manner (e.g., the message is to be output a minimum number of times within a predetermined duration of time and/or to players who satisfy at least one predetermined characteristic).

In accordance with one embodiment, a third-party merchant may provide a benefit directly to a player. In this case, the benefit may be in addition to a benefit that is provided to the player by the casino.

In accordance with one or more embodiments, an information deriving device, the information deriving device server, and/or the gaming device server may communicate with a third-party merchant device to determine information about benefits to be offered by a third-party merchant. For example, such communication may comprise negotiation with merchants to develop offers, develop the language of the offers and associated graphics, and handle back office billing and penalties associated with the offers. Alternatively, casino personnel may communicate with a third-party merchant to facilitate such information. In addition, the information about third-party merchants participating in the system of the present invention may be stored in a third-party merchant database (not shown).

In one or more embodiments, a benefit provided to the player may be in the form of information. Examples of such information include: (i) digital audio clips, such as MP3s; (ii) video clips; (iii) video games; (iv) other software programs, including spreadsheet, word processing, database, and web browser applications; (v) short stories, novels, newspaper or magazine articles, or other text; (vi) stock quotes; (vii) analyst reports on companies; (viii) sports scores; (ix) pictures, including pictures of the player at the casino, pictures of the players friends, pictures of famous landmarks, or pictures of celebrities; (x) advice, including legal, financial, or medical advice; (xi) coupons, which might be printed later for redemption at a retailer; (xii) digital vouchers, redeemable for cash or credits—e.g., at a casino desk; (xiii) electronic currency; (xiv) information allowing the player access to phone minutes (e.g., the information may include a PIN number to use in order to redeem phone minutes; and (xv) a code for obtaining benefits at a gaming device.

An example of a code for obtaining benefits at a gaming device is a code (e.g., received from an information deriving device) that the player may enter into a gaming device, thereby obtaining a free game play, free credits, or a cashless gaming receipt. A code may consist of an alphanumeric character sequence, such as "ad429xf3"; a sequence of pulses, such as a Morse code or bar code; or any other data sequence. A player may enter a code using, for example, a keypad on a gaming device, a microphone with which to provide voice input, or a communications port on the gaming device with which to interface a player device to communicate the code electronically.

One advantage of providing a benefit in digital form is that the benefit can be provided to the player directly by the information deriving device and/or a player device. For example, the information deriving device may communicate the benefit to the player device via a wireless or wired connection established between the two. Thus, a benefit may be provided to the player without requiring the gaming device to dispense currency to the player, to provide the player with free game plays, etc. Since, in one or more embodiments, the information deriving device will often have no control over the gaming device, it may be important that a benefit may be provided without involving the gaming device. In one or more embodiments, a benefit may also be e-mailed to an account associated with the player. For example, the information deriving device server and/or the gaming device server may cause an MP3 to be e-mailed to the players e-mail account.

Referring now to FIG. 16, an exemplary tabular representation 1600 illustrates an embodiment of a message tracking database 540, such as may be stored in the memory of an information deriving device server 500. The tabular representation 1600 of the message tracking database includes a number of example records or entries, each defining a message that has been output to a player and the status of which is being tracked. Those skilled in the art will understand that the message tracking database 1600 may include any number of entries.

The tabular representation 1600 also defines fields for each of the entries or records. The fields specify: (i) an output message identifier 1605 that uniquely identifies a message that has been output to a player, (ii) a message identifier 1610 that uniquely identifies a message that is available for output via the system of the present invention, (iii) a player identifier 1615 that uniquely identifies the player to whom the message was output, and (iv) a response to message 1620 that indicates the players response to the message, if any was received or expected. Note that a message with a unique message identifier 1610 (which may correspond to a message identifier 1410 and 1505) is assigned a unique output message identifier 1605 when it is output to a player, such that two messages that have the same message identifier 1610 may have different output message identifiers 1605, to allow tracking of responses from each of the individual players to whom the message was output.

The message tracking database 1600 may be utilized by the information deriving device server 500, for example, to track the responses of a player to a message that had been output to the player. For example, a message may comprise an offer to provide a benefit to the player in exchange for the players agreement to perform an activity. In such an example, the database 1600 may be utilized to determine whether the player has accepted the offer (i.e., agreed to perform the activity) and thus whether the benefit is to be provided to the player. In some embodiments, a benefit or a part of a benefit may not be provided to a player until the player completes the activity that the player agrees to perform. In such embodiments, the database 1600 may further track the status of the players performance of the activity (alternatively, the tracking of the players performance of the activity may be tracked in a different database).

As described herein, in one or more embodiments an information deriving device 125 may be operable to track the messages that have been output to a player. In such embodiments, the message tracking database 1500, a version thereof, or at least a portion of the data described as being stored therein, may be stored in the memory of one or more information deriving devices in addition to or in lieu of being stored in the memory of the information deriving device server 135 (e.g., the information deriving device server may not exist in some embodiments).

Figure 17:
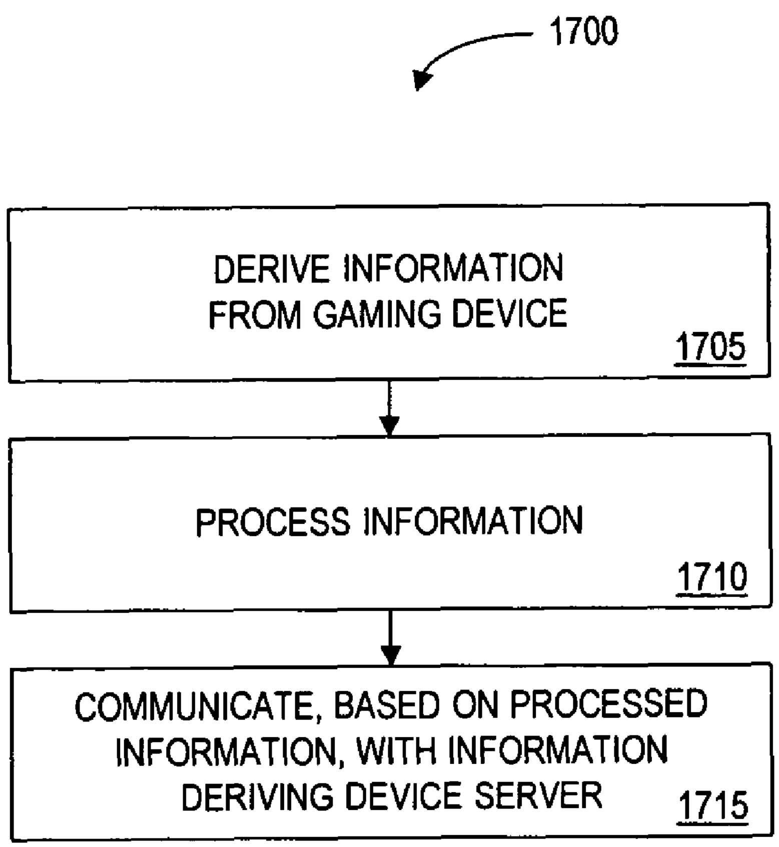
FIG. 17 is a flowchart illustrating a process for deriving information from a gaming device, which may be performed by an information deriving device and is in accordance with at least one embodiment of the present invention.

Note that, in one or more embodiments, an action by a device may be triggered based on the response of a player to a message that had been output to the player. For example, Referring now to FIG. 17, a flowchart illustrates a process 1700 that may be performed by an information deriving device 125. The process 1700, and all other processes described herein unless expressly specified otherwise, may be performed by a gaming device 110, an information deriving device 125, an information deriving device server 135, a gaming device server 120 and/or a combination thereof. Each of these devices is described in detail above. For purposes of illustration, the steps of process 1700 will be described as being performed by an information deriving device 125. Further, the process 1700, and all other processes described herein unless expressly specified otherwise, may include steps in addition to those expressly depicted in the Figures or described in the specification without departing from the spirit and scope of the present invention. Similarly, the steps of process 1700 and any other process described herein, unless expressly specified otherwise, may be performed in an order other than depicted in the Figures or described in the specification, as appropriate.

Turning now to process 1700, information is derived from a gaming device in step 1705. As described above, deriving information from a gaming device may comprise deriving information that the gaming device is outputting to an entity other than the information deriving device 125, such as a player. For example, step 1705 may comprise receiving information via the one or more sensors that components of the information deriving device 125.

Once the information from the gaming device is derived, the information is processed in step 1710. Processing the information may comprise, for example, interpreting a signal received from a sensor. Processing the information may also comprise, in another example, deriving necessary information from the received signal.

In one or more embodiments, for example, an information deriving device 125 may forward information derived from a gaming device 110 to an information deriving device server 135 and the information deriving device server 135 may determine whether to output a message to a player based on this forwarded information. For example, the information deriving device 125 may receive a signal consisting of the image from a display screen of a gaming device 110. The signal describing the image may itself be very large, as a typical image might be formed from a million or more pixels, with each pixel taking on 256 or more possible states. However, the information deriving device 125, through various image-processing techniques, may deduce that the essential information conveyed by the image is that the player has obtained an outcome of "bell-bar-orange." Such information may in turn be transmitted to another device, such as the information deriving device server 135. In this example, the second signal describing the outcome itself may be much smaller than the first signal describing the entire display of the gaming device. Therefore, by processing the first signal to form the second signal, the information deriving device 125 may potentially lower the power requirements, and the time requirements for communicating with the information deriving device server 135.

To process an image signal, the information deriving device 125 may use various image recognition programs that are well known in the art. The task of recognizing symbols and other images shown on the display of a gaming device is aided by the fact that gaming devices typically display a limited number of symbols, each in a limited number of configurations. For example, a fruit slot machine might display only six symbols: a plum, cherry, orange, bar, bell, and 7. Each of these symbols might only be displayed in one orientation, i.e., they are never rotated, inverted, flipped, warped, etc. Additionally, each symbol is typically displayed in only one of a small set of locations on the display screen. Therefore, the information deriving device need not necessarily determine where a symbol is before determining what the symbol is.

As described above, the information deriving device may be preloaded with a database of image files together with outcome designations for the images in the image files. An exemplary image file database is provided in FIG. 7. To determine a symbol that is displayed on the display screen of a gaming device, an information deriving device may capture an image of the display using a camera. The information deriving device may then compare the captured image to various images stored in the image file database of FIG. 7. If the closest match to the captured image is a stored image designated "cherry," then the information deriving device determines that a cherry symbol has appeared on the display screen of the gaming device.

There are, of course, many other ways to recognize images than through comparison with image files. For instance, an image may be tested against a set of rules to determine the symbol depicted in the image. For example, if the $192^{nd}$ pixel in the image is red, then its a cherry; else if the $23950^{th}$ pixel is purple, then its a plum; else if the $10205^{th}$ and $10207^{th}$ pixels are orange, then its an orange; etc.

As has been discussed, an information deriving device may be programmed to recognize many other images besides those depicting outcome symbols. For instance, an information deriving device may be programmed to recognize text on the display screen of a gaming device, or on a dot matrix display beneath a player tracking card reader, or on a separate credit meter. For these purposes, the information deriving device may employ well-known character recognition algorithms.

In one embodiment, an information deriving device may not only recognize individual text characters, but may further interpret their meaning in a larger context. For example, a gaming device might display "Congratulations, prepare to win big bucks!!!" The information deriving device may recognize the individual characters (e.g. "C", "o", "n"), and then combine the characters to form the sentence. Finally, by comparing the sentence to sentences pre-stored in a database (not shown), the information deriving device may determine that this particular sentence means the player has just won entry into a bonus round. Therefore, the information deriving device may later communicate to another device such as the information deriving device server 135 or the gaming device server 120 that the player has won entry into a bonus round. Similarly, a gaming device may display a credit balance of 256. The information deriving device may recognize the individual characters, "2", "5", and "6", combine them together, and transmit to the information deriving device server 135 or the gaming device server 120 only the number 256, e.g., in binary form.

In one or more embodiments, an information deriving devices interpretation or processing of information comprising an image may depend on the location of the image. For example, if an image appears in the center of a display screen of a gaming device, where outcome symbols always appear, then the information deriving device may be programmed not to compare the image to text characters, but only to pre-stored outcome symbol images. Similarly, if an image appears in the lower right hand corner of a display screen, where a credit balance always appears, then the information deriving device may be programmed not to compare the image to pre-stored outcome symbol images, but only to pre-stored images of text characters.

In one or more embodiments, an information deriving device may also have the capability to recognize images from common objects a person might be carrying. For example, an information deriving device might store in a database images of cups, coin buckets, keys, cell phones, paper tickets, and so on. An information deriving device might even have the capability to recognize images of humans. In one aspect, an information deriving device may be operable to recognize the presence of one or more humans, and to thereby count the number of humans present. In another embodiment, an information deriving device may be operable to recognize individual human faces, and to thereby identify individuals.

In one or more embodiments, an information deriving device may be operable to recognize the direction in which a human face is looking by using pre-stored images of human faces as viewed from different angles. For instance, one view shows a face full-on, another view shows a profile, a third view shows a quarter shot, and so on. If the camera sensor of an information deriving device determines a profile of a players face, the information deriving device may infer that the player is looking at an object that is in a direction perpendicular to that of the information deriving device with respect to the player. The information deriving device may further store a list of what such an object might be, e.g., the screen of the gaming device, the pay table of the gaming device. The information deriving device might thereby be operable to determine what the player is looking at. An information deriving device may also recognize common human facial expressions, such expressions of happiness, sadness, excitement, confusion, concentration, and boredom. In recognizing expressions, the information deriving device may once again reference a table of images showing examples of faces with each expression.

As described above, in addition to or in lieu of image signals, an information deriving device may be operable to interpret audio signals. As with images, a gaming device may output only a limited number of audio signals. Audio signals may include, for example, (i) the sound of coins dropping (either real or simulated), (ii) the sound of bells indicating, e.g., a jackpot, (iii) the sound of a simulated announcer announcing, e.g., a bonus round, (iv) the sound of mechanical reels spinning, (v) the sound of mechanical reels stopping, (vi) the simulated sound of reels spinning or stopping, (vii) the sound of a trains horn blowing, as during a bonus round, (viii) the sound of a bill acceptor receiving a bill, (ix) the sound of a bill acceptor ejecting a bill (e.g., the bill is too crumpled), (x) the sound of a player tracking card reader receiving a player tracking card, and (xi) the sound of a player tracking card reader ejecting a player tracking card.

It should be noted that the different audio signals may emanate from different components of a gaming device. For example, the sound of coins dropping may come from the coin tray, while the sound of an announcer might come from a speaker on the gaming device. Therefore, an information deriving device may be operable to interpret audio signals based on their point of origin just as the information deriving device may be operable to interpret image signals based on their location.

In one or more embodiments, the processor of the information deriving device may be programmed to execute a program to compare audio signals received from the gaming device with audio signals from a database of stored audio signals, such as the database of FIG. 8. The processor may then be further operable to determine the designation for the audio signal, such as "coin dropping" or "reel stopping", based on the signal from the database to which the signal under consideration most closely matches. Algorithms for the interpretation and recognition of audio signals are well known in the art and will not be described in detail herein.

In one or more embodiments, a simulated announcer (or prerecorded announcer) may potentially make a plurality of differing announcements. For example, depending on the situation at a gaming device, the same announcer might say, "That was a great spin!" or "Gee, you were so close." It may be desirable for the information deriving device to distinguish between multiple different announcements using voice transcription technology, which is well known in the art. The information deriving device may, for example, convert the announcement into text, and compare the text of the announcements to multiple text entries in a database. The information deriving device may then be further programmed to arrive at a designation for the announcement, such as "the player has just won a payout," or "the reel configuration differed only slightly from a configuration that would win the player a large jackpot."

In one or more embodiments, an information deriving device may be operable to receive and process vibrational signals. Vibration signals may include, for example: (i) vibrations created intentionally by the gaming device to, e.g., indicate an altered state of the gaming device in which all payouts are doubled, and (ii) vibrations created by interactions between the player and the gaming device. Regarding example (ii), such a vibration may be created when the player, for example, hits the gaming device in disgust, or the player drops a bucket of coins onto the surface of the gaming device. Another example of a vibration signal includes vibrations created by general activity in the casino. For example, large amounts of foot traffic may cause the floor of the casino to vibrate.

In one or more embodiments, in processing the vibration signal the information deriving device may be operable to compare a received vibration signal to signals in a database of vibration signals (not shown), to arrive at a designation for the received vibration signal.

There are, of course, many other types of signals that an information deriving device may receive and process. All may be processed, in one or more embodiments, through comparison with signals in a database in order to arrive at a designation.

As described briefly above, processing information derived from a gaming device may, in one or more embodiments, comprise interpreting the information. For example, an information deriving device may be operable to interpret touch signals. As described above, in one or more embodiments an information deriving device may include components consisting of thin, transparent films spread over, e.g., buttons and touch screens on a gaming device. In such embodiments, when a player actuates a button, or touches an area of the touch screen, the information deriving device receives a signal that the player has actuated a button or touched the screen. The transparent film may include circuitry or other means for detecting where on the film the player has touched. For example, a grid of fiber optic strands may be interwoven into the film. The pressure of the players touch will change the optical properties of certain vertical and horizontal strands, allowing the information deriving device to pinpoint the location of the players touch as the intersection between the vertical and horizontal strands. The information deriving device may store in memory a map of important areas on the touch screen of the gaming device. For example, the information deriving device may be programmed to recognize the relative positions of a "bet 3" button or a "hold 2$^{nd}$ card" button. The information deriving device may compare the location of the players touch to the stored map of the touch screen in order to interpret the meaning of the players touch. Of course, if a player actuates a physical button (a button not simply displayed on a touch screen), then it often does not matter what portion of the button a player touches, only that the player has actuated the button. In some embodiments, a touch screen controlled by the information deriving device may be layered on top of a physical button, or even on top of an existing touch screen controlled by the gaming device.

In one or more embodiments, processing information derived from a gaming device may comprise comparing multiple different signals (e.g., as received from different sensors or different types of sensors) in order to be more certain of signals interpretation. In one example, touch sensors of the information deriving device may detect a player actuating a "spin" button. Soon thereafter, audio sensors of the information deriving device (e.g., microphones) may detect the sound of the mechanical reels of the gaming device beginning to spin. Each of the two signals individually indicates that the player has just initiated a handle pull. However, taken together, the signals provide an even more solid indication that the player has just initiated a handle pull. In another example, a camera sensor of the information deriving device, focused on the payout meter of a gaming device, provides an image that is interpreted as the player having received a payout of ten coins. Soon thereafter, a microphone placed near the coin tray receives an audio signal that is interpreted as the sound of ten coins dropping into the coin tray. Thus, the two signals are consistent and strongly indicate that the player has just won a payout of ten coins. In the noisy environment of a casino, with extraneous sounds, vibrations, and lights, comparison of multiple signals may provide a more accurate way of processing signals and thereby interpreting player actions.

In one or more embodiments, the processing of a first piece of information may be a necessary precursor to the processing of a second piece of information. For example, the information deriving device may receive an image of an outcome, such as "orange-orange-bar," and may attempt to interpret the image signal as corresponding to a payout being provided to the player. In order to make such an interpretation, the information deriving device may first need to determine the size of the players wager for the game play for which the outcome was determined (e.g., because the size of the payout may vary with the size of the wager). Thus, the information deriving device may first need to process another signal such as, e.g., a touch signal from a "bet 2" button, before being able to process the image of the outcome as a payout of a particular number of coins. In another example, the information deriving device may receive a signal that the player has actuated the "spin" button on a gaming device. However, the information deriving device may not be able to conclude that a game play was actually initiated without processing another signal from a camera indicating that the player had a non-zero credit balance, and therefore was able to initiate a game play.

As can be deduced from the above description of how information derived from a gaming device may be processed, in one or more embodiments an information deriving device may store large amounts of data for use in the processing of such information. For example, the information deriving device may store images of symbols so that it may interpret the outcomes a player achieves. Part of embodiments of the present invention, therefore, is loading the required data into the memory of the information deriving device. Once image data, audio data, vibration data, and/or other relevant data is readily available, it may be loaded into the information deriving device either before or after the information deriving device is associated with a gaming device. For example, a memory chip that is to be a component of an information deriving device may be plugged into a circuit board associated with the information deriving device server 135, and the information deriving device server 135 may thereupon load all or some of the data into the ROM. The data loaded may be particular to the gaming device with which the information deriving device will be associated. Accordingly, an information deriving device associated with a video poker machine may not, in one embodiment, receive image data corresponding to orange, cherry, and other symbols associated with a fruit slot machine.

Alternatively, if, in one or more embodiments, an information deriving device may first be associated with a gaming device before any data is preloaded, the information deriving device server 135 may wirelessly transmit to the information deriving device image data, audio data, and any other helpful to the information deriving device for use in processing information derived from the gaming device.

In one or more embodiments, image data, audio data, and other data may not be readily available for loading into an information deriving device. For example, assume a new type of gaming device has just been produced. Although the manufacturer of the new gaming device may very well possess image data sufficient for image recognition at the gaming device, the manufacture may not necessarily share such data with the casino or other entity desiring to employ information deriving devices. In such an example where data for processing information derived from a gaming device is not readily available, such data may be gathered in a number of ways.

In one embodiment, a casino attendant or other person may position a sensor so that the sensor may receive signals from the gaming device. The sensor may be that of an information deriving device or of another device. For example, the casino attendant may position a camera sensor and/or another type of sensor (e.g., a microphone) of an information deriving device with the lens of the camera focused on the screen of a gaming device, or may use a separate camera not affiliated with an information deriving device. The casino attendant may then perform a wide range of activities at the gaming device. For example, the casino attendant may place a number of wagers and initiate a number of handle pulls, may insert and retract a tracking card, may cash out, may consult all the help screens, and so on. As the casino attendant performs activities at the gaming device, the camera or other sensor receives signals from the gaming device. The casino attendant may then record the meaning of the signals for future use by an information deriving device in processing information derived from the gaming device. The casino attendant may also, in one or more embodiments, indicate which portion of an image captured by a camera sensor include information relevant to a particular determination. For example, if a fixed camera sensor captures an image of the entire front of a gaming device and an event the information deriving device is monitoring for is a particular credit meter balance, the casino attendant may indicate where on the image the credit meter may be found. The information deriving device may store the location of which part of the captured image includes the credit meter, for future use in evaluating captured images.

In one example of the above-described method of obtaining data for future processing of information from a gaming device, a camera sensor may be positioned such that it faces a display screen of a gaming device. Assume the casino attendant initiates a game play and obtains the outcome "cherry-bar-bell". The casino attendant may then key the following information into a laptop or other suitable device: "the first symbol is a 'cherry', the second symbol is a 'bar', the third symbol is a 'bell', the payout for 'cherry-bar-bell' is 2 coins". In this manner, the casino attendant has documented, for the future use of an information deriving device, that a first particular configuration of pixels of a particular configuration of colors corresponds to a cherry, a second particular configuration corresponds to a bar, and so on. A casino attendant might do without indicating payout information at this juncture, as such information can easily be entered as part of a pay table. For instance, the casino attendant might call up a screen on the gaming device that shows a pay table. The casino attendant can then key information from the pay table into his laptop.

In some embodiments, a casino attendant may document that certain payouts are associated with certain combinations of symbols by pointing a camera of the information deriving device at a payout table. The payout table may graphically illustrate various combinations of symbols together with associated payouts. Once such payout data is documented and stored in a memory of an information deriving device, the information deriving device may utilize it to recognize combinations of symbols shown in the payout table when they later appear as outcomes on a display screen, and may be able to associate payouts with the combinations of symbols. The information deriving device may not, however, be able to identify the symbols by their names, such as "bar", "bell", or "plum". In some embodiments, a payout table may contain blanks, or variables, indicating that it doesnt matter what symbol appears in the designated location (as illustrated in FIG. 9). An information deriving device may recognize these variable symbols, and may later recognize combinations of symbols that involve all the other required symbols as corresponding to a particular payout.

In one or more embodiments, a casino attendant may subsequently check the information that has been downloaded to an information deriving device by consulting, e.g., the image file database of the information deriving device and verifying that the information deriving device has assigned images the proper designations. For example, if the attendant sees an image of a cherry labeled as "orange", then the attendant knows a mistake has been made and may correct it. Similarly, if the casino attendant sees an image of the upper right hand corner of a display screen (where no symbols are displayed), and the image is labeled as "bell", then again a mistake has been made and the attendant may correct it. Perhaps the camera was not focused on the proper part of the display screen of the gaming device and the attendant may refocus the camera more properly.

In one or more embodiments, a casino attendant may also subsequently verify the information that has been downloaded to an information deriving device by associating the information deriving device with the gaming device, playing the gaming device, and checking the information deriving devices interpretation of the events that occur at the gaming device. If any interpretations are incorrect, then further adjustments of the downloaded data may be required.

In one or more embodiments, once sufficient data has been gathered about a new gaming device so as to allow an information deriving device to process information derived from the gaming device with sufficient accuracy, the same data can be downloaded into any information deriving device that is to be associated with a similar gaming device. It may be important in some embodiments, however, that all sensors of the information deriving devices are located in relation to the gaming devices in a manner similar with which the sensors used to gather the data were located. For example, if image data has been gathered by a camera that was situated to the left of a display screen, then the camera of an information deriving device should also be to the left of the display screen of the gaming device. Otherwise, the information deriving device may misinterpret information to come from the gaming device.

In one embodiment, an information deriving device, or any component of an information deriving device, may contain indicators, such as indicator lights, for indicating when the information deriving device is not functioning normally. For example, when a battery of an information deriving device is low, an indicator light might come on (or go off). A casino attendant might then stop by and recharge or replace the battery. Similarly, when a particular sensor is no longer working, an indicator might serve to inform a casino attendant that the sensor should be fixed or replaced. In some embodiments, the information deriving device server or gaming device may infer that an information deriving device is not functioning normally when it no longer receives signals from the information deriving device, when the signals are weak, or when the signals explicitly state that there is some malfunction. In some embodiments, the information deriving device server or gaming device server may detect a malfunction when it receives signals that are unlikely to be true. For example, if the signals indicate that the player wins a payout on every game play, or the player never deposits any currency into the gaming device.

It should be noted that although the step 1705 of processing the information derived from the gaming device is described as being performed by an information deriving device, in one or more embodiments the processing of the information may be performed partially or wholly by the information deriving device server 135 and/or the gaming device server 120. In such embodiments, any functions described above as being carried out by the information deriving device, and any data described above as being stored in the memory of the information deriving device, may instead or in addition be carried out by or stored in the memory of the information deriving device server 135 and/or the gaming device server 120, as appropriate.

Turning now to step 1710, communication with the information deriving device server occurs based on the processed information. For example, the information deriving device may transmit the results of the processing of step 1705 to the information deriving device server. For example, if the processing of the derived information results in the determination that a player has obtained a particular outcome, the fact that the player has obtained a particular outcome at the particular gaming device being monitored may be communicated to the gaming device server. The information deriving device may transmit information other than the processed information in step 1710. For example, the information deriving device may include in the communication an identifier of the information deriving device and/or the gaming device being monitored.

The information deriving device server may then, based on the communicated information, determine whether to output a message to the player. This process will be described in detail with respect to FIGS. 18A and 18B. It should be noted, however, that in some embodiments, the information deriving device may instead, or in addition to, communicating with the information deriving device server based on the processed information communicate with another device, such as the gaming device server 120. It should further be noted that, in some embodiments, the information deriving device may be operable to carry out further functions based on the processed information.

For example, the information deriving device may be operable to determine whether to output a message to the player of the gaming device, determine the details of the message to be output, cause the message to be output, and/or track any expected response to the message, and/or perform any further activities based on the players response, as appropriate. In such embodiments, the information deriving device may perform some or all of the steps described with respect to process 1800 of FIGS. 18A and 18B. Further, in such embodiments, the information deriving device may not communicate with the information deriving device server or the gaming device server based on the processed information, or may communicate only to access certain information useful in carrying out the further functions. For example, the information deriving device may communicate with the gaming device server to determine the players name, financial account identifier, and/or the address of the player device associated with the player.

In yet other embodiments, the information deriving device may communicate the processed information to the information deriving device server 135 and/or the gaming device server 120 and be further operable to receive, from the information deriving device server 135 and/or the gaming device server 120 instructions in response to the communicated information. For example, the information deriving device may be operable to receive the text of the message to be output to the player and to output the message to the player.

It should be noted that, in one or more embodiments, any communication transmitted by an information deriving device (e.g., to an information deriving device server and/or a gaming device server) may include an identifier that identifies the information deriving device. The information deriving device server and/or the gaming device server may then consult a database, such as the information deriving device database of FIG. 13, to determine, e.g., which information deriving device sent the signal, what sensors the information deriving device possesses, and the gaming device with which the information deriving device is associated. The information deriving device server or the gaming device server may, in turn, consult the gaming device database of FIG. 11 to determine, e.g., the type of gaming device with which the information deriving device is associated.

Note that in some embodiments, the information deriving device does not process the information derived from the gaming device. For example, the information deriving device may simply retransmit to the information deriving device server and/or the gaming device server the raw information derived from the gaming device (e.g., the image signal received from a camera sensor of the information deriving device). The information deriving device server or the gaming device server, in such embodiments, may process the information.

In some embodiments, the information deriving device partially processes the information derived from the gaming device and the information deriving device server or the gaming device server further processes the information once it receives the partially processed information. For example, an information deriving device may derive image data from a gaming device, and interpret the image data to be a particular outcome: "bell-bell-bell." The information deriving device may then transmit the outcome to the information deriving device server or the gaming device server, and the server may use the outcome, and a stored payout table, to deduce the payout the player received as a result of the outcome.

In one or more embodiments, an information deriving device server and/or a gaming device server may receive distinct signals directly from a gaming device, in addition to receiving signals from an information deriving device. Such distinct signals may arrive, for example, via a network, and may include accounting information, such as the amount of a players wager, the amount of a players payout, the number of credits a player first inserts into a gaming device, and the amount for which a player cashes out. The information deriving device server and/or the gaming device server may use such distinct signals in conjunction with any signals received from an information deriving device to determine whether a predetermined event has occurred at the gaming device, and thereby determine whether a message is to be output to a player of the gaming device. The casino may also use these distinct signals from the gaming device in combination with signals received from an information deriving device to form an understanding of what player activities occur at a gaming device, and to better formulate ways in which to respond to a players activities.

Figure 18A:
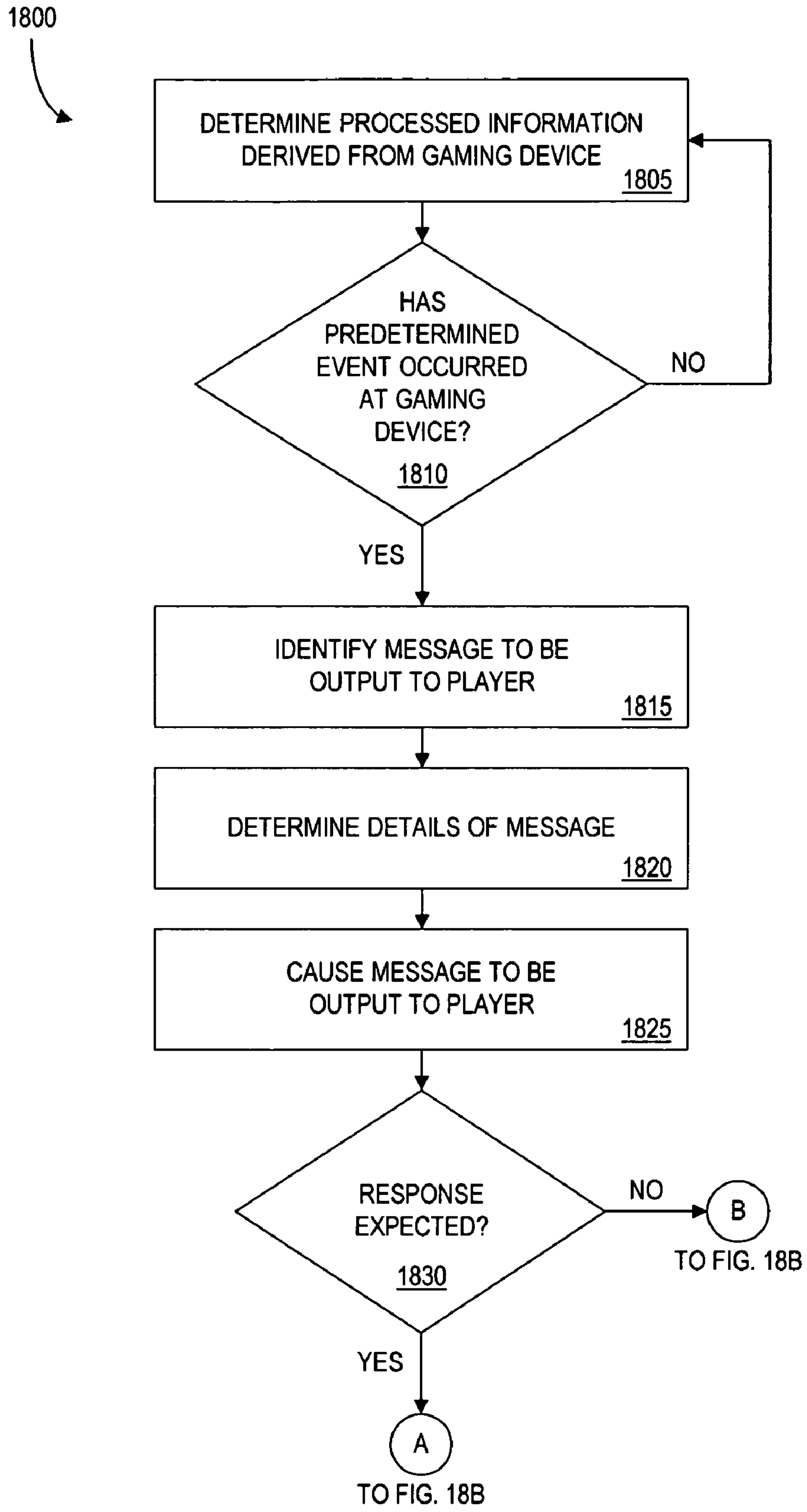
FIGS. 18A and 18B are a flowchart illustrating a process for determining a message to be output to a player, outputting the message, and tracking the message, as may be performed by either an information deriving device or a server device and which is in accordance with at least one embodiment of the present invention.
Figure 18B:
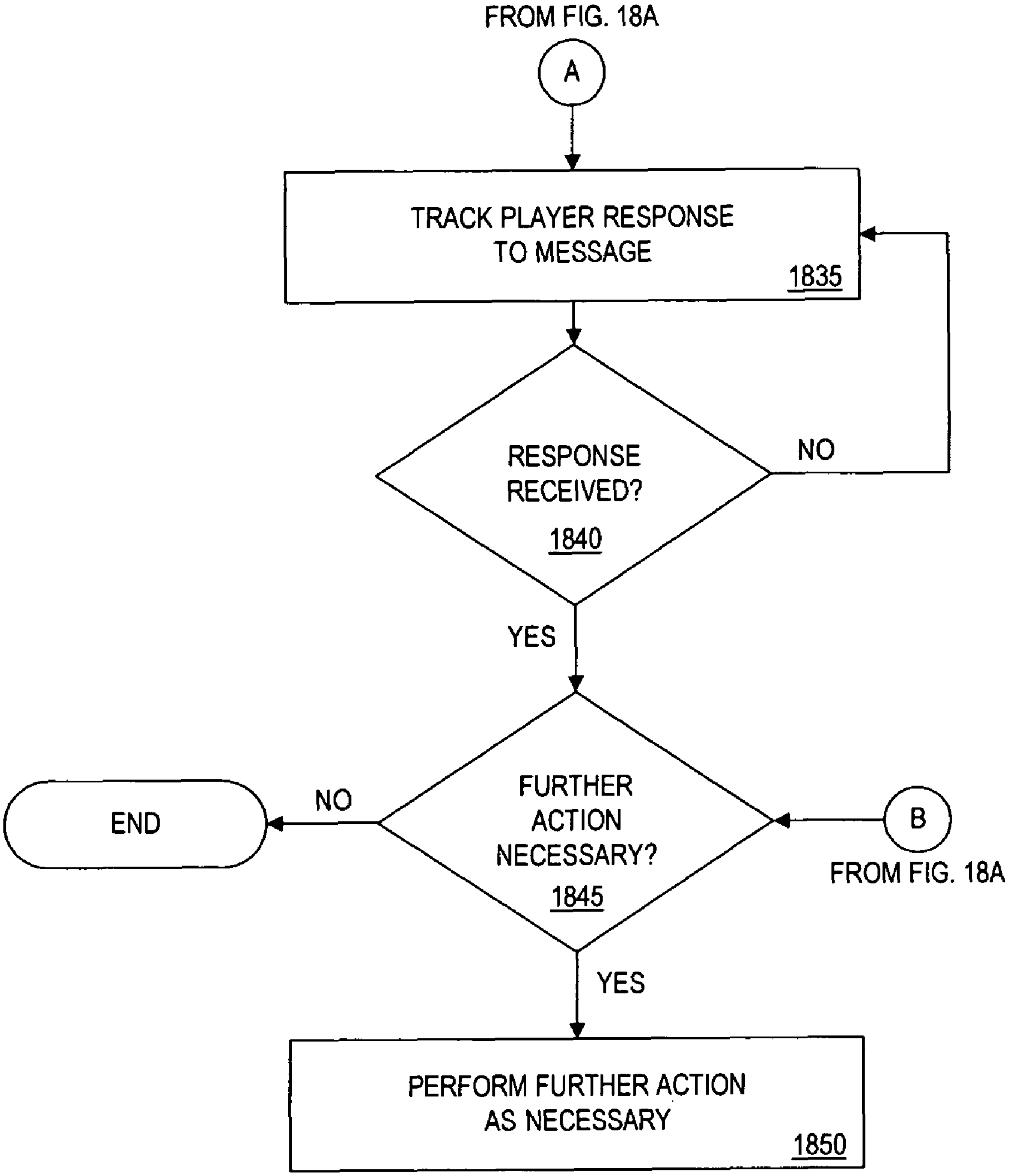

Turning now to FIGS. 18A and 18B, a process 1800 illustrates a method for determining whether to output a message to a player, outputting the message, and tracking the message. For illustrative purposes only, process 1800 is described as being performed by an information deriving device server 135. In other embodiments, some or all of the steps of process 1800 may be performed by the information deriving device 125, gaming device server 135, or another device.

Process 1800 begins at step 1805, in which the processed information derived from a gaming device is determined. For example, step 1805 may comprise receiving the processed information from an information deriving device 125 via communication network 140.

It should be noted that, in one or more embodiments, a record of a player session database may be updated (e.g., by the information deriving device server or gaming device server) based on the processed information. An exemplary player session database is illustrated in FIG. 10. For example, if the processed information indicates that the player has just won a $40 payout, then the record associated with the player (e.g., which may be retrieved based on a player identifier included in the processed information or determined based on which player is currently playing the gaming device identified in the processed information) may be retrieved and updated to reflect this payout. The record may also be updated, for example, to reflect that the player has initiated and completed another game play and with the time of the game play. As described above with respect to FIG. 10, the player session database may be used to keep track of statistics for a players session (e.g., at a gaming device). For example, by adding up the amounts a player has won on each game play of a session, the players gross winnings for the session may be determined. Further, by subtracting the total amount wagered from the gross winnings, the players net winnings, i.e., the amount of money by which the player is "up" or "down" since commencing play, may be determined. Other information for a session may also be tracked and/or determined based on processed information received from an information deriving device. The following are some examples of such information: (i) the number of times the player has achieved an outcome of bell-bar-bell, (ii) the number of times the player has achieved an outcome paying more than 20 coins, (iii) the number of consecutive game plays on which the player has lost, (iv) the net winnings for the player in the past half hour, (v) the difference in the players rate of play (e.g., number of game plays per hour) over the past half hour and the players rate of play during the first half hour of the session, and (vi) the number of comp points the player has won for the session.

As described above, in one or more embodiments, the information deriving device may maintain the player session database (or a copy or portion thereof), and may only communicate certain statistics, such as those mentioned above, to the information deriving device server 135 and/or the gaming device server 120. In some embodiments, the information deriving device server, the gaming device server and the information deriving device may each maintain versions of the player session database. Further, the information deriving device server and/or the gaming device server may update records of the player session database based on communications in addition to, or in lieu of, those received from an information deriving device. For example, the information deriving device server 135 and/or the gaming device server 120 may receive accounting information from the gaming device being played by the player.

It should be noted that, in one or more embodiments, the information deriving device server 135 and/or the gaming device server 120 may receive and store information relating to a player in addition to session related information. This additional information need not come from an information deriving device. For example, the gaming device server and/or the information deriving device server may receive information from a computer at the front desk of a casino-hotel, indicating that a player has just checked into a hotel. In another example, the server may receive information from a casino restaurant indicating that the player has just paid $40 for a steak dinner.

Additional information may also come from an information deriving device associated with a gaming device different from that being currently played by the player. For example, the information deriving device server and/or the gaming device server may receive information from an information deriving device associated with a gaming device being played by a person associated with the player (e.g., a friend, family member, or person at a nearby or adjacent gaming device).

At step 1810, it is determined whether a predetermined event has occurred at the gaming device. This determination comprises a determination of whether a message is to be output to the player of the gaming device. This determination may further be based on the processed information determined in step 1805. For example, the message determination database 530 (e.g., as illustrated in embodiment 1400 of FIG. 14) may be accessed to determine, based on the processed information, whether any of the conditions 1405 have been satisfied. If so, the message identifier 1410 corresponding to the message condition 1405 that has been satisfied may be retrieved.

In one or more embodiments, the occurrence of a wide variety of events or the satisfaction of many types of conditions, may trigger a message to be output to a player. Examples of the types of events that may cause a message to be output include, but are not limited to:

(i) events relating to a players gambling activities;

(ii) events relating to a players gambling activities during one or more play sessions;

(iii) events relating to a players visit to a casino (e.g., arrival, hotel stay, meals, entertainment);

(iv) events or conditions relating to other persons associated with a player;

(v) events or conditions relating to revenue management of a casino; and (vi) events or conditions relating to offers that are available for output as messages.

Examples of particular events relating to a players gambling activities include:

(i) the player registering for a player tracking card;

(ii) the player initiating a play session;

(iii) the player inserting his player tracking card into a gaming device;

(iv) the player inserting a coin or bill into a gaming device;

(v) the player placing a wager at a gaming device or table game;

(vi) the player placing a maximum allowable wager at a gaming device;

(vii) the player winning a payout (e.g., of a predetermined magnitude);

(viii) the player obtaining a winning outcome (i.e., an outcome that corresponds to a payout) at a gaming device;

(ix) the player obtaining a losing outcome (i.e., an outcome that does not correspond to a payout) or a consecutive set of losing outcomes;

(x) the player finishing a play session;

(xi) the player actuating (or indicating a readiness to actuate) the “cash out” button on a gaming device or picking up his chips from a blackjack table;

(xii) the player actuating (or indicating a readiness to actuate) the “change request” button on a gaming device;

(xiii) the player obtaining an intermediate outcome at a gaming device (e.g., a single card dealt at video blackjack or an initial hand being revealed in video poker);

(xiv) the player waiting for a fill so that he can be paid coins due; and (xv) the player doubling down on a blackjack bet.

As noted above, events relating to a players gambling activities during one or more play sessions may also cause a message to be output to the player. Examples of such events include:

(i) the players credit balance at a gaming device equaling, exceeding, or failing to at least equal a predetermined value;

(ii) the players session win equaling, exceeding, or failing to at least equal a predetermined value;

(iii) the players session theoretical win equaling, exceeding or failing to at least equal a predetermined value;

(iv) the players session coin-in equaling, exceeding, or failing to at least equal a predetermined value;

(v) the players year-to-date win equaling, exceeding or failing to at least equal a predetermined value;

(vi) the players year-to-date theoretical win equaling, exceeding or failing to at least equal a predetermined value;

(vii) the players year-to-date coin-in equaling, exceeding, or failing to at least equal a predetermined value;

(viii) the player being determined to be on a “winning streak” (e.g., obtaining a predetermined number of winning outcomes within a predetermined amount of time or within a predetermined number of game plays); and (ix) the player being determined to be on a “losing streak” (e.g., obtaining a predetermined number of losing outcomes within a predetermined amount of time or within a predetermined number of game plays).

As noted above, events relating to a players visit to a casino may cause a message to be output to a player. Examples of such events include:

(i) the player reserving a hotel room at the casino;

(ii) the player checking into or out of a hotel room at the casino;

(iii) the player purchasing a meal at a restaurant associated with the casino;

(iv) the current time of day being 6:00 PM, which is when the player or a typical player usually eats dinner;

(v) the current time of day being 8:00 AM, and the player being required to check out of the hotel at 11:00 AM;

(vi) the player receiving a complimentary beverage;

(vii) the player requesting a complimentary product or service;

(viii) the player receiving a complimentary product or service; and (ix) the player attending a show or sporting event.

As noted above, events or conditions relating to other persons who are in some way associated with the player may cause a message to be output to the player. Such events relating to other persons may be similar to the events described with respect to the player. Examples of other persons that may be associated with the player include:

(i) a player who is operating a nearby gaming device;

(ii) a person who is sharing a room with the player;

(iii) a person who arrived on the same bus as the player; and (iv) family members, friends, and other associates of the player.

In some embodiments, activities performed by a players friends, relatives, or other persons associated with the player may influence the message sent to a player, and/or whether a message is sent at all. For example, a players friend might identify the player by identifying, for example, the gaming device at which the player is currently situated. The players friend may further indicate that the player hasnt been doing so well and could use an offer of a benefit. The players friend may desire that he and the player eat at a particular restaurant at which the player is reluctant to eat. The players friend may therefore request that a discount good at that restaurant be offered to the player. The players friend may provide any information about the player using, for example, an input device of an information deriving device, an information deriving device server, and/or a player device. In one embodiment, the friend of a player may receive a benefit for identifying the player as a candidate for receiving a message.

As noted above, events relating to revenue management of a casino may also cause a message to be output to a player. Examples of such events include:

(i) it being 6:00 PM on Saturday night and the casino hotel being only half full (e.g., to maximize revenues, a casino may want to fill all of its hotel rooms on a Saturday night and thus output an offer of a free or discounted room to the player if he agrees to perform some obligation); and (ii) only 10% of the gaming devices in a casino or particular area of a casino currently being played (e.g., to maximize revenue, a casino may desire to maximize the number of gaming devices being played at any given time and thus output an offer for a pair of show tickets if the player aggress to play a particular gaming device, type of gamin device, or gaming device in particular location and at a particular time).

In one or more embodiments, an event related to offers may cause an offer to be output to a player. For example, a device (e.g., an information deriving device server, an information deriving device, and/or a gaming device server) may track messages that have been presented to players (e.g., using the message tracking database 540, such as illustrated in embodiment 1600 of FIG. 16). In another example, the device may track messages that are available for output (e.g., using the message details database 535, such as illustrated in embodiment 1500 of FIG. 15). In such embodiments, a further message may be output to a player to whom a message had previously been presented, based on the tracking of the previously presented message, or a message may be output based on messages that are available for output. Examples of events based on messages, that may cause a further message to be output to a player, include:

(iii) the player completing an activity specified by a previous message;

(iv) the player not performing an activity specified by a previous message (e.g., by a predetermined time or within a predetermined time);

(v) the inventory of messages reaching a predetermined level (e.g., in an embodiment where only a limited number of messages may be presented);

(vi) an activity or benefit being added to the message details database; and (vii) the player accepting or rejecting an offer.

As described above, the device that determines whether an offer is to be output to a player (e.g., an information deriving device, an information deriving device server, and/or a gaming device server) may receive information about whether a predetermined event has occurred (e.g., at a gaming device) from a variety of sources. Such sources include:

(i) an information deriving device;

(ii) a gaming device (e.g., a slot machine may transmit a message to a gaming device server when a player inserts his player tracking card into a reader of the slot machine);

(iii) input devices (e.g., a check-in terminal in the hotel lobby);

(iv) casino employees (e.g., a cocktail waitress may use a computer keyboard to indicate that a player received a complimentary beverage);

(v) databases accessible by the device (e.g., the information about a players gambling history may be stored in the player database or a play session database and used to determine whether to output a message to the player); and (vi) a player device 150.

According to one or more embodiments, the determination of whether a predetermined event has occurred at a gaming device may comprise evaluating a Boolean expression that includes one or more variables associated with a players gambling or other activities at a casino. If the Boolean expression is true then it may be determined that an offer is to be output to the player.

In some embodiments, a message may be output to a player in response to a request made by the player. For example, the player may explicitly request a message to be output to him. The request may specify, for example, a particular message, a particular benefit to be included in an offer comprising the message, or a particular activity that the player is willing to perform in exchange for an unspecified benefit. In another example, the player may request information but not that a message be output.

In one example, the player may request a message by pressing a button on the information deriving device or another device (e.g., on the player device), the actuation of which communicates a desire on the players part to receive a message, or otherwise communicate with the information deriving device and/or the information deriving device server to communicate his desire to receive a message. For example, using the player device associated with the player, the player may contact the information deriving device and/or information deriving device server to request a message.

If, in step 1810, it is determined that a predetermined event has not occurred at a gaming device, the process 1800 returns to step 1805. However, if it is determined that a predetermined event has occurred at the gaming device, the process 1800 continues to step 1815. It should be noted that although process 1800 specified that it is the occurrence of a predetermined event "at a gaming device" that causes a message to be output to a player, in some embodiments of the present invention the occurrence of events that do not necessarily occur at a gaming device may also cause a message to be output to a player. For example, one of the exemplary events described above that may cause a message to be output to a player includes the check out of a casino hotel room by the player.

In step 1815 the message to be output to the player is identified. For example, if in step 1810 it had been determined, utilizing the message determination database 530, that a particular condition for outputting a message to a player had been satisfied and the message identifier corresponding to the condition had been identified, step 1815 may comprise determining the details of the message based on the message identifier. For example, the message details database 535 (e.g., as illustrated in embodiment 1500 of FIG. 15) may be accessed and the record of the message identified based on step 1810 may be retrieved.

Identifying a message to be output to a player may, in one or more embodiments, comprise randomly selecting a message from a list of available messages. For example, each message in the list of available message may correspond to a random number or range of random numbers. To identify one of the available messages for output to a player, a device may generate a random number and determine which message the random number corresponds to.

In one or more embodiments, a person rather than a device may be prompted to identify a message for purposes of step 1815. For example, personnel of the entity practicing aspects of the present invention (e.g., a marketer or casino representative) may be prompted to identify a message. In another example, a player (e.g., the player to whom the message is to be output or another player associated with him) may be prompted to identify a message to be output.

In one or more embodiments, a particular message may be programmed to be output at a particular time or during a particular time period. Accordingly, if it is determined during this particular time period that a message is to be output to a player, the message corresponding to the particular time period may be identified as the message to be output.

In one or more embodiments, a message for output to a player may be identified based on factors relating to messages. Examples of factors relating to messages include:

(i) whether the player completes an activity specified by a message previously output to the player;

(ii) the inventory of messages (e.g., in an embodiment where only a limited number of messages may be presented);

(iii) messages that have already been output to the player (e.g., as stored in the message tracking database shown in FIG. 16);

(iv) messages that the player has accepted or rejected;

(v) messages that have been made to other players (e.g., as stored in the message tracking database shown in FIG. 16) and/or other players responses to other messages; and (vi) whether the player qualifies for a particular message or type of message (e.g., if the message is an offer for a new credit card, what is the players credit limit? If the message is an offer for a magazine subscription, does the player already receive the magazine?).

In one or more embodiments, identifying a message to be output to a player may simply comprise identifying the type of message to be output to a player. For example, it may be determined whether an offer or an advertisement should be output to the player. This determination may be based on, for example, the event that is causing the message to be output to the player, the time (e.g., of day, week, month, or year), revenue-management principles (e.g., if a casino show has plenty of empty seats, an advertisement for the show may be output), other messages previously output to the player and/or the players responses to the messages, characteristics of the player, the gaming device being played by the player, and/or an input by casino personnel.

Once a message for output to the player is identified, the process 1800 continues to step 1820, in which the details of the message are determined. Determining the details of the message may comprise, for example, retrieving the details of the message from a memory based on the message identifier determined in step 1815. For example, the message details database 535 (e.g., such as that illustrated in embodiments 1500 of FIG. 15) may be accessed and the text of the message retrieved. It should be noted that, in one or more embodiments, steps 1815 and 1820 may be combined into one step.

As noted above, in one or more embodiments a message may comprise an offer. An offer comprises an offer of a benefit to the player in exchange for the players agreement to an activity or obligation specified in the offer. In such embodiments, determining the details of a message for output to a player may comprise determining the activity to be performed by the player and the benefit to be provided to the player in exchange for the performance, or agreement to perform, the activity. For example, an activity and a benefit to be included in an offer may be determined using a rules-based system.

Of course there are many other ways of determining an activity to be performed and a benefit to be provided. Examples include:

(i) a pseudo-random system (e.g., an activity for the player to perform and/or a benefit to be provided to a player may be randomly selected from a list of potential activities and/or benefits);

(ii) the player may be allowed to choose his own offer (e.g., by choosing a particular activity and/or benefit); and (iii) a casino representative may choose an offer (including, for example, a particular activity and/or benefit) for the player (e.g., based on the casino representatives knowledge of the players preferences).

In one embodiment, an activity to be included in an offer may be selected using a first method while a benefit to be included in the offer is selected using a second method. For example, an activity may be determined based on the event that occurred, whereas a benefit may be determined using a pseudo-random process.

In embodiments where a rules-based system is used to determine an activity and/or a benefit to include in an offer to be output to a player, one or more factors or variables may be taken into account in making the determination. General categories of such factors or variables include:

(i) factors relating to the event the occurrence of which is causing a message to be output to the player;

(ii) one or more characteristics of the player (e.g., players gender, age, demographic profile, preferences such a purchasing or eating habits, etc.);

(iii) factors relating to the players gambling activities (e.g., current credit balance, net loss for a current playing session, average wager amount, preferred games and/or types of gaming devices, etc.);

(iv) factors relating to the players visit to the casino (e.g., arrival, hotel stay, meals, entertainment);

(viii) factors relating to other persons associated with the player;

(ix) factors relating to the casinos revenues and/or desired revenues;

(x) factors relating to subsidies available from various entities to offset the cost of a benefit;

(xi) factors relating to offers previously output to the player and/or accepted or rejected by the player; and (xii) factors relating to available offers, activities, and/or benefits.

Characteristics of the player may be stored in a memory (e.g., in the player database 430 of the gaming device server 400, such as that illustrated in embodiment 1200 of FIG. 12). Examples of player characteristics include:

(i) information stored in a player database;

(ii) information determined by a casino representative (e.g., by talking to the player and/or observing the player);

(iii) the players hobbies and interests (e.g., sailing, golf);

(iv) physical characteristics of the player (e.g., age, height, weight, gender, dress and appearance);

(v) psychological characteristics of the player (e.g., creativity, risk-aversion);

(vi) the players marital status;

(vii) financial information associated with the player (e.g., the players occupation, income, work hours, credit report); and (viii) the players medical history.

In one or more embodiments, an activity and/or benefit to be included in an offer may be selected based on factors relating to the types of activities third-party merchants wish a player to perform, or the types of benefits third-party merchants are willing to provide to a player. Third-party merchants may benefit from player activities, such as shopping at the merchants stores, or bringing friends to the merchants stores. In return for a players performing activities beneficial to a third-party merchant, the third-party merchant may provide a benefit to the player. In some embodiments, the third-party merchant will provide the benefit indirectly. For example, the merchant may first pay the casino, and the casino may then pay the player. In one or more embodiments, the casino itself may keep a portion of the payment, and may thereby benefit from facilitating the interaction between player and third-party merchant.

According to one embodiment, an offer may not specifically specify a benefit. The benefit may be determined based on the activity performed, once the player performs the activity or begins to perform the activity. In such embodiments, determining the details of the message may comprise determining an activity. A later step in the process 1800 may then comprise determining a benefit to provide to the player.

It should be noted that, in accordance with one or more embodiments, determining a benefit to be included in an offer may comprise the value of the benefit. For example, it may be determined that a benefit corresponding to a value of $25 is to be included in an offer. A benefit may then be selected that has a corresponding value of exactly or approximately $25.

Although offers have been described in detail above, it should be noted again that many other types of messages may also be output to a player. For example, based on a particular event that causes a message to be output to a player, the player may be provided with an advertisement. As is apparent, an advertisement does not necessarily provide a player with a benefit, nor does it necessarily require an activity of the player. The various types of messages that may be provided to a player include:

(i) offers of a benefit in return for performing an activity (as described above);

(ii) offers of an alternate prize (e.g., a car in lieu of a jackpot);

(iii) advertisements;

(iv) informational messages (e.g., "the show you signed up for is starting in 10 minutes");

(v) messages containing coupons, vouchers for free trials of a product, or other benefits;

(vi) messages from a persons associated with the player that are, for example, stored on the casinos voice mail system (messages may also include e-mail messages, or instant messages from a players friends); and (vii) requests for the players feedback (e.g., the casino may ask the player what he thought of his hotel room, or what he thinks of the noise levels in the casino or request feedback on behalf of a third-party merchant, such as showing two possible designs for car bodies on behalf of a car manufacturer and ask the player which he prefers).

As noted above, the embodiment 1500 of FIG. 15, illustrating a message details database 535 lists several exemplary types of messages that may be selected for display to a player.

Once the details of the message is determined, the process 1800 continues to step 1825, in which the message is caused to be output to the player. For example, if in one embodiment the information deriving device server identifies the message and determines the details of the message, the information deriving device server may transmit the details of the message to be output to (i) the information deriving device monitoring the gaming device at which the player is currently playing, (ii) a player device, or (iii) the gaming device being played by the player. In embodiments where the details of the message are transmitted to the information deriving device, the information deriving device may in turn output the message to the player via a display or audio component of the information deriving device or may communicated with the player device associated with the player, causing the message to be output via the player device. In embodiments where the information deriving device identifies the message and the details of the message, the information deriving device may, again, output the message to the player via a display and/or audio component of the information deriving device or cause a player device associated with the player to output the message.

If, as described with respect to some embodiments, the message is output to a player via a player device associated with the player, step 1825 may comprise determining the address via which the player device may be contacted. For example, the player database 430 may be accessed to determine whether a player device is associated with the player and, if so, the address of the player device.

In one or more embodiments, a casino representative may be directed to present an offer or deliver some other message to the player. In such embodiments, a casino representative may be identified before (or simultaneously with) the offer determination. In this case, characteristics of the casino representative may be considered in determining the offer. Examples of characteristics of a casino representative include:

(i) the identity of the casino representative;

(ii) the acceptance rate for offers made by the casino representative;

(iii) the casino representatives history of making offers (e.g., speed, clarity, acceptance rate with this type of player);

(iv) physical characteristics of the casino representative (e.g., age, height, weight, place of birth, gender, dress and appearance);

(v) the type of PDA the casino representative has (e.g., for full effect, a particular offer may need to be presented to a player as a jingle or song; if a casino representatives PDA does not have a microphone, and therefore the PDA cannot play the tune for the representative to hear, then it may be difficult for the casino representative to learn the tune of the jingle; therefore, it might be better to select a different offer for the player);

(vi) the current location of the casino representative (e.g., is the casino representative within a predetermined proximity of the player such that the casino representative can reach the player within a predetermined amount of time;

(vii) the current availability of the casino representative (e.g., is the casino representative currently on duty and/or not busy with another task);

(viii) the training and/or other qualifications of the casino representative (e.g., has the casino representative been trained to present messages to players);

(ix) commissions that are paid to the casino representative (e.g., in one or more embodiments casino representatives are paid a commission for each message presented to a player and a casino representative may be selected based on which casino representative is furthest in meeting a quota for commissions or has had the fewest opportunities to earn commissions);

(x) time constraints for the casino representative (e.g., if the casino representatives shift is going to end soon then the casino representative may not be selected to present a lengthy or complicated message); and (xi) the casino representatives preferences (e.g., does he prefer to make a particular type of offer?).

Information used to select a casino representative may be stored in a memory, such as in a casino representative database that may be stored in the memory of an information deriving device, an information deriving device server, and/or a gaming device server. In one or more embodiments, casino representatives may not be selected but may instead volunteer or bid for the opportunity to present a message to a player.

Co-pending and commonly-owned U.S. application Ser. No. 10/212,636, entitled METHOD AND APPARATUS FOR GENERATING DIRECTIVES FOR PERSONNEL, and which was filed Aug. 2, 2002 and which claims the benefit of priority of U.S. Provisional Application No. 60/309,972, filed Aug. 3, 2001, describes in detail various methods and systems for how a casino representative may present a message to a player. The entirety of both the provisional and non-provisional application is incorporated by reference herein for all purposes.

In step 1830 it is determined whether a response to the message is expected. For example, messages such as offers by their nature have an associated response (i.e., an acceptance or rejection of the offer) that is expected from the player once the message is output to the player. Other types of messages, such as advertisements, typically do not require a response from a player. Determining whether a response is expected may comprise, for example, accessing the message details database 535 (e.g., as illustrated in embodiment 1500 of FIG. 15) and determining whether response field 1520 stores a "Yes" indicator or a "No" indicator. If a "Yes" indicator is stored as corresponding to the message, then it may be determined that a response to the message is expected. If a "No" indicator is stored, then it may be determined that a response is not expected. In another embodiment, a determination of whether a response is expected may comprise determining the type of message that has been output. Certain types of messages may correspond to an expectancy of a response (e.g., offers) while others do not (e.g., advertisements and informational messages).

If it is determined that a response to the message is not expected, the process 1800 continues to step 1845, which is described in detail below. If, on the other hand, it is determined that a response to the message is expected, then the process 1800 continues to step 1835.

In step 1835, the response of the player to whom the message has been output is tracked. For example, the device carrying out the tracking of the response may go into a "wait" mode for a predetermined amount of time, awaiting the players response. In one embodiment, if no response is received within a predetermined amount of time, the response may be assumed to be a negative response (e.g., a rejection of the offer or a refusal to participate in a survey comprising the message).

Tracking the player response to the message may comprise, for example, creating a new record in the message tracking database 540 (e.g., as illustrated in embodiment 1600 of FIG. 16).

In one or more embodiments, if a first device outputs the message to the player while a second device tracks the players response to the message, step 1835 may comprise determining whether a response from the player has been transmitted to the second device from the first device.

In step 1840 it is determined whether a player response to the message has been received. If a response has been received, the process 1800 continues to step 1845. If, on the other hand, a response has not yet been received, the process 1800 returns to step 1835.

Step 1845 is performed once a response has been received in step 1840 or if it is determined, in step 1830, that no response is expected. Step 1845 comprises a determination of whether any further action is necessary. For example, it may be determined whether the performance of an activity defined in an offer comprising the output message needs to be tracked. In another example, it may be determined whether a benefit is to be output to a player. In yet another example, it may be determined whether additional information is to be output to a player. For example, if the message comprised an offer to provide a benefit to a player if the player agrees to answer some survey questions and the player accepts the offer, the survey questions may need to be output to the player. In one embodiment, a response of a player may comprise a request for further information or clarification of an offer, or a request for an alternate offer.

If, in step 1845, it is determined that further action is necessary, the process 1800 continues to step 1850, in which the further action is performed, as appropriate. For example, a benefit may be output, information may be output, and/or the performance of an activity may be monitored. In one or more embodiments, performing the further action may comprise directing another device to perform the action. For example, the information deriving device server may direct the information deriving device to output a benefit or further information to a player. In another example, the information deriving device may direct the gaming device server to credit a financial account associated with a player. In yet another example, the information deriving device server may inform a third-party merchant associated with the message of the players response and a need for any further action.

EXAMPLES OF EMBODIMENTS OF THE INVENTION

Example 1 of an Embodiment

Joe Smith was gambling at a slot machine at the Queens Palace Casino. An information deriving device at the Queens Palace Casino was tracking Joes play. By tracking his play, the information deriving device could ensure, for example, that if Joe missed a jackpot by one symbol, Joe would be offered a consolation prize. On one particular spin, Joe achieved the outcome "lion-lion-elk." The payout was ten coins, so ten coins immediately clinked into his tray. However, had Joe achieved "lion-lion-lion," he would have won the jackpot of 1000 coins.

The information deriving device detected Joes near miss in the following way. Components of the information deriving device comprising a processor and a series of interconnected sensors were attached to Joes slot machine. When Joe obtained his outcome, one of the sensors, a camera, captured an image from the display screen of Joes slot machine. The processor of the information deriving device compared pieces of the image with known symbol images, and determined that the image was the outcome "lion-lion-elk". Another one of the sensors was a microphone, positioned at the coin tray of the slot machine. Soon after Joe achieved his outcome, the microphone had detected ten rapid sounds in the coin tray. Comparison of the sounds to known audio signals revealed that the sounds were likely the sounds of coins dropping. The processor of the information deriving device compared the number of sounds detected in the coin tray to the known payout for the outcome "lion-lion-elk." The payout was the same as the number of sounds detected. With this confirmation, the information deriving device determined, with a high degree of certainty, that Joe had achieved "lion-lion-elk" as an outcome. Therefore, using a wireless transmitter, the information deriving device transmitted to the information deriving device an indication that Joe had achieved the outcome "lion-lion-elk."

After receiving information about Joes near miss, the information deriving device server determined a message for Joe. The information deriving device server transmitted the message to the information deriving device on Joes slot machine. The information deriving device then transmitted the same message wirelessly to Joes PDA. Joe heard his PDA beep, and took it out of his pocket. He saw the message, which read, "Joe, we see you just got the outcome lion-lion-elk. You were so close to hitting the jackpot! But dont worry, we are going to give you a chance to win a lot more than the jackpot! In fact, if you just agree to have dinner tonight at our Cattle Ranch Steakhouse, then well make the size of the jackpot 10 times bigger for your next 100 spins! To agree, just key in the word "yes" to your PDA."

Joe was in the mood for steak, so he keyed in the word "yes" to his PDA. Then, on his 98$^{th}$ subsequent spin, he won the $1000 jackpot. Joe was ecstatic. He heard his PDA beep. It was another message from the information deriving device server, "Congratulations, on winning the jackpot. Since you agreed to eat at the steakhouse, your jackpot is multiplied by 10. Just show the following code to the casino attendant when she comes over, and she will award you $10,000! Code: 391FG9025B3EX2."

Example 2 of an Embodiment

Linda sat down at a video poker machine and inserted her player-tracking card. Lindas identity was relayed to the gaming device server via a wired network. Linda then began playing. As she played, an information deriving device determined the times at which Linda would press a "deal" button, thus beginning a new game. The information deriving device also monitored Lindas credit balance, keeping track of how much she was ahead or behind. After Linda had played 10 minutes, the information deriving device relayed to the gaming device server a signal indicating that Linda had completed 100 games in ten minutes, and that she was ahead by 50 credits. The information deriving device relayed the message to the gaming device server via a wireless connection. The gaming device server pieced together Lindas identity information (i.e., her name) from the wired network, and information about Lindas winnings and rate of play from the information deriving device, to tailor a message to Linda. The gaming device server transmitted the message wirelessly to the information deriving device associated with Lindas machine. The information deriving device, which included its own display screen (distinct from the display screen of the video poker machine), displayed the message for Linda. The message read, "Linda, we see you are doing well. If you maintain your current rate of play for the next two hours, we will give you a hotel room tonight at half price. If you would like to try for the hotel room, just touch this screen. The screen will keep you posted on how you are doing."

Linda was enjoying herself and had no intention of leaving her machine any time soon. So she touched the display screen of the information deriving device. The information deriving device thereupon printed, "Great! Play on!" The information deriving device also displayed a timer that began counting down from 2:00:00. Linda continued playing as the timer counted down.

At one point during the two hours, Linda paused to chat with a friend. The information deriving device sensed that Linda was not pressing the "deal" button, and that Linda was therefore not playing. The screen of the information deriving device then displayed, "Linda, be careful not to stop for too long if you are going to keep up your rate of play." Linda soon resumed play again, and the message disappeared.

After two hours had passed, the information deriving device displayed, "Linda, youve done it! To claim your hotel room, just check in at the front desk. When you give them your name, theyll know to give you half price." The information deriving device also transmitted a wireless signal to the gaming device server indicating that Linda had earned a half-priced hotel room, so that the gaming device server would flag Lindas name for the staff at the front desk.

Additional Embodiments Of The Invention

In one embodiment, an information deriving device may comprise an alternate or a simplified interface to a gaming device. For example, a third party, such as a casino, may believe that a gaming device manufacturer has not made an interface that is intuitive or easy for a player to use. As made, the gaming device may force a player to press a "bet 2" button each time he wishes to wager two coins on a game play. The third party may therefore create a new interface, using an information deriving device, to allow the default wager to be whatever the wager was on the prior game play. In this way, once a player presses "bet 2" on a first game play, he need not press the same button on a subsequent game play. The information deriving device may allow for this alternate interface by automatically actuating certain buttons on the gaming device itself. For example, when the player presses a "bet 2" button on a first game play, the information deriving device detects the actuation of the button. On a subsequent game play, the information deriving device automatically actuates the "bet 2" button for the player by, e.g., contracting a membrane stretched tightly over the "bet 2" button. If the player wishes to make a wager other than two credits, the player may actuate a different button on the gaming device, and the automatic actuation of the "bet 2" button will thereby be overridden.

In one or more embodiments, an information deriving device may be operable to play a gaming device autonomously once the player provides instructions for play. For example, an information deriving device might be operable to actuate a "spin" button on a gaming device. The player might insert 50 coins into the gaming device, and instruct the information deriving device to make 50 handle pulls for the player. The player may then sit back and watch play occur without needing to touch the gaming device. The player may provide the information deriving device with numerous additional instructions, including instructions to play until a credit balance has reached a certain level, instructions to play at a particular rate, instructions to alter a betting strategy upon the occurrence of certain outcomes, and so on.

In one or more embodiments, the information deriving device may instruct the player to respond to an offer, promotion, or other message by actuating a button on the gaming device. The button the player is instructed to actuate may have some meaning to the gaming device that is completely different from the meaning the player will convey to the information deriving device by actuating the button. For example, the information deriving device may instruct the player to actuate the "bet 3" button twice in rapid succession to accept an offer. The information deriving device may detect the actuation of the button using, for example, a transparent touch sensor layered on top of the "bet 3" button. Evidently, the reason the player is pressing the "bet 3" button has nothing to do with his wanting to wager three credits. In fact, the information deriving device may instruct the player to actuate only buttons that could have no effect at the moment on the players game play at the gaming device. For example, the information deriving device might instruct the player to actuate the "bet 3" button only if the player has a balance less than three credits, in which case the gaming device would not register the actuation of the button.

In one or more embodiments, rather than instructing a player to actuate a button, the information deriving device may instruct the player to touch an area of a display screen over which the information deriving device has stretched a touch-sensitive component or which the information deriving device may monitor with a camera sensor. The information deriving device may also instruct the player to pull the handle or to actuate some other input device on the gaming device.

In one or more embodiments, an information deriving device may include speech recognition software. In this way, an information deriving device may monitor and interpret player utterances at the gaming device. Player utterances may then serve as events the occurrence of which causes messages to be output to players. For example, if the player says, "Im hungry", the information deriving device may transcribe the players voice into a text message, and send the message to the information deriving device server. The information deriving device server may then select a message offering the player a two-for one meal special at the casino buffet.

In one or more embodiments, a casino (or any other entity) may operate its own independent reward system consisting of one or more devices attached to gaming device. These devices may be information deriving devices of the present invention. Such devices may be capable of communication with one another and/or with an information deriving device server in communication with the information deriving devices. The devices may sense player activity at corresponding gaming devices (e.g., to which an information deriving device is attached). For example, an information deriving device might sense vibration at a gaming device in order to determine that a player is at the gaming device. An exemplary information deriving device might take the form of a model of a clowns head. The device might output printed information on paper or on other media, and such an output may appear to come from inside the clowns mouth. The information deriving device may output various printed vouchers, coupons, prize certificates, and so on. These may be redeemable at a casino desk, or at a merchant affiliated with the casino.

In one or more embodiments, a component of an information deriving device may comprise a card reader similar to a player tracking card reader. A player might swipe his player-tracking card through a card reader on the information deriving device in order to be eligible to receive benefits from the information deriving device. The information deriving device may later tailor printed matter or other outputs to the player. For instance, the information deriving device may print the players name on a coupon that is output. An information deriving device server may also be operable to track the benefits that have been provided to a player through the independent reward system. Further, the information deriving device server may be operable to track the play habits of players who have swiped their cards. This may allow even more precise tailoring of rewards. For example, a printed coupon might read "Since you have played every day for the last week, you are entitled to this half price meal at the steak house."

Traditionally, rewards provided to slot players at a casino are controlled primarily by slot machines. Slot machines are, in turn, usually built by slot manufacturers, which are typically independent of casinos. It is true that casinos have comp systems, but players typically redeem benefits based on comp points only infrequently. Therefore, an independent reward system, which may include one or more information deriving devices controlled by a casino, may give the casino greater opportunity to control what rewards are provided to a player. The casino may, in turn, exert greater influence on player behavior, and may therefore derive increased benefit from player activities. For example, the casino may use the independent reward system to encourage a player to eat at a casino restaurant, stay at the casino hotel, remain for a longer period of time at the casino, and so on.

In one embodiment, an information deriving device may allow players to receive a type of comp point that is specific to a particular type of game they play, or to a particular type of gaming device they play. Whereas a standard casino network may provide a comp point for each dollar wagered at any game or at any machine, an information deriving device may provide information to, for example, a gaming device server, about which gaming device or type of gaming device a player is using, or what game a player is playing. Based on the game or gaming device, a player may receive a variable number of comp points. For example, gaming device manufacturer ABC may wish to award manufacturer comp points for play only at gaming devices manufactured by them. An information deriving device may indicate to the gaming device server that a player is at an ABC machine. The gaming device server may then award comp points to the player courtesy of ABC. The player may later have the opportunity to redeem the comp points with ABC by receiving a prize in the mail at his home address from ABC. Alternatively, the player may receive a prize by using his ABC comp points at the casino, and the casino may later bill ABC for the cost of the prize.

In another embodiment, a player may be awarded comp points based on the strategy he uses at a particular game. The information deriving device may therefore monitor choices the player makes at the gaming device, and communicate those choices to, for example, the information deriving device server. The information deriving device server may then award the player relatively more comp points, for instance, if he has used an inferior strategy, and relatively fewer comp points if he has used a superior strategy.

In one or more embodiments, an information deriving device may be able to detect breaks in a players play. For example, by noting the times at which a "spin" button is actuated, or at which time the reels begin spinning, the information deriving device may be able to detect gaps of time lasting, say, a minute during which the player is not making wagers. Therefore, the information deriving device may output an offer to the player defining a benefit for ongoing play. For example, the player may be allowed to make free long-distance phone calls, or to view a movie so long as there are no gaps in his play of greater than 1 minute. Assume, in one example, that the benefit is a movie. If the information deriving device server is streaming a movie to the players gaming device, or to a separate screen proximate to the players gaming device, and the information deriving device detects a gap in the players play, then the information deriving device may signal to the information deriving device server to stop the movie from playing.

In one embodiment, the information deriving device may include a phone for allowing the player to place free or discounted long distance calls, or to place calls in general.

It is worth noting again that information deriving devices, or components thereof, may be placed inside the housing of a gaming device. Casino attendants frequently have the ability to open gaming devices so as to add coins, fix jams, or make repairs. Therefore, casino attendants may be able to place an information deriving device, or component thereof, inside a gaming device. In one embodiment, light detectors may be placed at one or more reel positions on the outer surface of physical reels. Light detectors are often very inexpensive, and can take the form of, e.g., photo-resistors attached within a simple circuit. When a particular symbol is displayed, a light detector placed at the reel position of the symbol will detect the light coming in through the viewing window. The light detector can thereby signal to the processor of the information deriving device that its corresponding symbol has occurred as part of an outcome. In one embodiment, entire reels, or bands made for displaying symbols, can be manufactured by third parties so as to incorporate light detectors, or other detectors for determining the position at which a reel stops. When a gaming device is purchased from a manufacturer, the third-party reels can be swapped for those included with the gaming device.

Therefore, in one or more embodiments of this invention, an information deriving device may be operable to monitor the printing of cashless gaming receipts from receipt printers. The information deriving device may additionally be operable to recognize numerals printed on the receipt indicating the value of the receipt. Alternatively, the information deriving device may be operable to detect and read a bar code on the receipt as it is printed out. The information deriving device may then report the printing of the receipt, and the amount of the receipt. If the receipt has a unique identifier, then the information deriving device may be operable to detect such an identifier and report it as well. In this way, casinos may become aware of the monetary value of outstanding receipts. Furthermore, casinos may prevent the redemption of fraudulently printed receipts, since the printing of such receipts will not have been recorded by an information deriving device.

CONCLUSION

It is clear from the foregoing discussion that the disclosed systems and methods to facilitate the obtainment of information about game play at a gaming device represent an improvement in the art of gaming. While the methods and apparatus of the present invention have been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof.

What is claimed is:

1. A method comprising:

determining an occurrence of a near miss outcome in a play of a game at a gaming device, the near miss outcome comprising a plurality of symbols displayed on a payline such that, when one of the plurality of displayed symbols is replaced with another symbol adjacent to the one of the plurality of displayed symbols, the result is a winning outcome;

determining a message comprising an offer in response to the new miss outcome, the offer including a benefit in exchange for performing an activity, and the offer not including modifying the near miss outcome for said play of the game; and transmitting the message via a communication network to the player.

2. The method of claim 1 wherein the message is transmitted via Email.

3. The method of claim 1 wherein the message is transmitted to a PDA.

4. The method of claim 1, which includes determining the message comprising the offer only if the player has lost more than a predetermined amount of money.

5. The method of claim 1, which includes providing the benefit from a party other than an owner of the gaming device.

6. The method of claim 1, which includes providing the benefit to the player as a result of performing the activity.

7. The method of claim 1, which includes providing the benefit to the player before performance of the activity, and penalizing the player if the activity is not performed within a predetermined time.

8. The method of claim 1, which includes determining the benefit, at least in part, based on the winning outcome.

9. The method of claim 1, which includes determining the benefit after the activity is performed.

10. The method of claim 1, which includes determining the benefit before transmitting the message.

11. The method of claim 1, which includes enabling the player to select the benefit.

12. The method of claim 1, which includes requiring performance of the activity before a predetermined time or event.

13. The method of claim 1, which includes requiring beginning the activity before a predetermined time or event.

14. The method of claim 1, which includes an activity that has already been performed, and providing the benefit after verifying that the activity has already been performed.

15. The method of claim 1, which includes trying a new service as the activity.

16. An apparatus, comprising:

a processor and a memory operatively coupled to the processor and storing a program, the program and the processor together operable to:

determine an occurrence of a near miss outcome in a play of a game at a gaming device, the near miss outcome comprising a plurality of symbols displayed on a payline such that, when one of the plurality of displayed symbols is replaced with another symbol adjacent to the one of the plurality of displayed symbols, the result is a winning outcome;

determine a message comprising an offer in response to the near miss outcome, the offer including a benefit in exchange for performing an activity, and the offer not including modifying the near miss outcome for said play of the game; and transmit the message via a communication network to the player.

17. The apparatus of claim 16 wherein the message is transmitted via Email.

18. The apparatus of claim 16 wherein the message is transmitted to a PDA.

19. A non-transitory computer readable medium for directing a processor, the non-transitory computer readable medium storing instructions which, when executed by the processor, cause the processor to:

determine an occurrence of a near miss outcome in a play of a game at a gaming device, the near miss outcome comprising a plurality of symbols displayed on a payline such that, when one of the plurality of displayed symbols is replaced with another symbol adjacent to the one of the plurality of displayed symbols, the result is a winning outcome;

determine a message comprising an offer in response to the near miss outcome, the offer including a benefit in exchange for performing an activity, and the offer not including modifying the near miss outcome for said play of the game; and transmit the message via a communication network to the player.

20. A method comprising:

determining an occurrence of a near miss outcome in a play of a game at a gaming device, the near miss outcome comprising a plurality of symbols displayed on a payline such that, when one of the plurality of displayed symbols is replaced with another symbol adjacent to the one of the plurality of displayed symbols, the result is a winning outcome;

determining a benefit in response to the near miss outcome, the benefit not including modifying the near miss outcome for said play of the game;

determining a message comprising notification of the benefit; and transmitting the message via a communication network to the player.

21. The method of claim 20 wherein the benefit is determined, at least in part, based upon the benefit otherwise provided in response to the winning outcome.

22. An apparatus, comprising:

a processor and a memory operatively coupled to the processor and storing a program, the program and the processor together operable to:

determine an occurrence of a near miss outcome in a play of a game at a gaming device, the near miss outcome comprising a plurality of symbols displayed on a payline such that, when one of the plurality of displayed symbols is replaced with another symbol adjacent to the one of the plurality of displayed symbols, the result is a winning outcome;

determine a benefit in response to the near miss outcome, the benefit not including modifying the near miss outcome for said play of the game;

determine a message comprising notification of the benefit; and transmit the message via a communication network to the player.

23. The apparatus of claim 22 wherein the benefit is determined, at least in part, based upon the benefit otherwise provided in response to the winning outcome.

24. A non-transitory computer readable medium for directing a processor, the non-transitory computer readable medium storing instructions which, when executed by the processor, cause the processor to:

determine an occurrence of a near miss outcome in a play of a game at a gaming device, the near miss outcome comprising a plurality of symbols displayed on a payline such that, when one of the plurality of displayed symbols is replaced with another symbol adjacent to the one of the plurality of displayed symbols, the result is a winning outcome;

determine a benefit in response to the near miss outcome, the benefit not including modifying the near miss outcome for said play of the game;

determine a message comprising notification of the benefit; and transmit the message via a communication network to the player.

* * * * *

UNITED STATES PATENT AND TRADEMARK OFFICE

CERTIFICATE OF CORRECTION

PATENT NO. : 7,771,271 B2
APPLICATION NO. : 10/681075
DATED : August 10, 2010
INVENTOR(S) : Walker et al.

It is certified that error appears in the above-identified patent and that said Letters Patent is hereby corrected as shown below:

IN THE CLAIMS:

In Claim 1, Column 69, Line 44, replace "the result" with --a result--.

In Claim 1, Column 69, Line 52, replace "the player" with --a player--.

In Claim 16, Column 70, Line 28, replace "the result" with --a result--.

In Claim 16, Column 70, Lines 35 and 36, replace "the player" with --a player--.

In Claim 19, Column 70, Line 51, replace "the result" with --a result--.

In Claim 19, Column 70, Lines 58 and 59, replace "the player" with --a player--.

In Claim 20, Column 70, Line 66, replace "the result" with --a result--.

In Claim 20, Column 71, Line 7, replace "the player" with --a player--.

In Claim 22, Column 71, Line 20, replace "the result" with --a result--.

In Claim 22, Column 72, Lines 1 and 2, replace "the player" with --a player--.

In Claim 24, Column 72, Line 15, replace "the result" with --a result--.

In Claim 24, Column 72, Lines 23 and 24, replace "the player" with --a player--.

Signed and Sealed this

Fifth Day of October, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,771,271 B2
APPLICATION NO. : 10/681075
DATED : August 10, 2010
INVENTOR(S) : Jay S. Walker et al.

It is certified that error appears in the above-identified patent and that said Letters Patent is hereby corrected as shown below:

IN THE CLAIMS

In Claim 1, Column 69, Line 47, replace "new" with --near--.

Signed and Sealed this
Twenty-third Day of October, 2012

David J. Kappos
*Director of the United States Patent and Trademark Office*